(12) United States Patent
Allen et al.

(10) Patent No.: US 12,547,299 B1
(45) Date of Patent: Feb. 10, 2026

(54) GRAPHICAL USER INTERFACE FOR INTERACTIVE FEATURE SELECTION AND REFINEMENT IN APPLIED MODELING TASKS

(71) Applicant: JMP Statistical Discovery LLC, Cary, NC (US)

(72) Inventors: Scott D. Allen, Fairport, NY (US); Benjamin D. Barroso-Ingham, Liverpool (GB)

(73) Assignee: JMP Statistical Discovery LLC, Cary, NC (US)

( * ) Notice: Subject to any disclaimer, the term of this patent is extended or adjusted under 35 U.S.C. 154(b) by 0 days.

(21) Appl. No.: 19/259,304

(22) Filed: Jul. 3, 2025

Related U.S. Application Data

(60) Provisional application No. 63/735,490, filed on Dec. 18, 2024, provisional application No. 63/726,870, filed on Dec. 2, 2024.

(51) Int. Cl.
| | | |
|---|---|---|
| G06F 3/048 | (2013.01) | |
| *G06F 3/0482* | (2013.01) | |
| *G06F 3/04847* | (2022.01) | |
| G06F 3/01 | (2006.01) | |

(52) U.S. Cl.
CPC ........ *G06F 3/0482* (2013.01); *G06F 3/04847* (2013.01)

(58) Field of Classification Search
CPC .............. G06F 3/0482; G06F 3/04847
See application file for complete search history.

(56) References Cited

U.S. PATENT DOCUMENTS

| | | | | |
|---|---|---|---|---|
| 11,704,581 B1 * | 7/2023 | McEntire | ................. | G06N 5/04 |
| | | | | 706/11 |
| 11,906,960 B1 * | 2/2024 | Gonzalez | ........... | G05B 23/0283 |
| 12,125,067 B1 * | 10/2024 | Fogarty | ............... | G06F 18/2113 |

(Continued)

OTHER PUBLICATIONS

Multilayer Knockoff Filter: Controlled Variable Selection at Multiple Resolutions, Annals of Applied Science; by Eugene Katsevich and Chiara Sabatti; Aug. 9, 2018, pp. 50.

(Continued)

*Primary Examiner* — Nicholas Augustine
(74) *Attorney, Agent, or Firm* — Padowithz Alce; Quintin Scheitlin; Alce PLLC

(57) ABSTRACT

A system, method, and computer-program product includes displaying, via a graphical user interface, a plurality of selectable objects generated for an initial set of predictor variables in a dataset; displaying, concurrently with the set of selectable objects, the initial set of predictor variables in distinct graphical representation; receiving, via the graphical user interface, a plurality of inputs while the initial set of predictor variables are being displayed in the distinct graphical representation; and, in response to receiving the plurality of inputs, updating the distinct graphical representation and one or more other distinct graphical representations associated with the plurality of selectable objects based on a predictor strength assessment for the subset of the initial set of predictor variables. The system, method, and compute-program product may support user-guided feature reduction in applications in which it is beneficial, such as experimental design, predictive modeling, and root cause analysis.

30 Claims, 25 Drawing Sheets

(56) References Cited

U.S. PATENT DOCUMENTS

| | | | | |
|---|---|---|---|---|
| 2002/0133721 | A1* | 9/2002 | Adjaoute | G06Q 20/40 |
| | | | | 726/23 |
| 2006/0101048 | A1* | 5/2006 | Mazzagatti | G06F 16/2246 |
| 2020/0160180 | A1* | 5/2020 | Lehr | G06N 3/082 |
| 2020/0250623 | A1* | 8/2020 | Duan | G06N 3/0499 |
| 2021/0110313 | A1* | 4/2021 | Jones | G06N 20/00 |
| 2021/0334630 | A1* | 10/2021 | Lambert | G06N 3/084 |
| 2022/0138606 | A1* | 5/2022 | Pasour | G06T 11/206 |
| | | | | 706/52 |
| 2022/0199266 | A1* | 6/2022 | Achin | G16H 50/80 |
| 2023/0041773 | A1* | 2/2023 | Lekivetz | G06F 3/0482 |
| 2023/0076243 | A1* | 3/2023 | Watt | G06Q 50/16 |
| 2024/0169293 | A1* | 5/2024 | Gray | G06Q 10/0635 |

OTHER PUBLICATIONS

Robust Interference With Knockoffs, by Rina Foygel Barber; Emmanuel J Candes and Richard J Samworth, Feb. 11, 2019, pp. 28.

A Power and Prediction Analysis for Knockoffs With Lasso Satatistics, by Asaf Winstein, Rina Barber and Emmanuel Candes, Dec. 18, 2017, pp. 22.

Feature Selection With the Boruta Package; Journal of Statistical Software, Miron B Kursa and Witold R. Rudnicki; Sep. 2010, vol. 36, Issue 11, pp. 13.

Multi-Resolution Localization of Causal Variants Across Genome; Matteo Sesia, Eugene Katsevich, Stephen Bates, Emmanuel Candes, Chiara Sabatti; Stanford University, Department of Statistics, Stanford, CA 94305, USA, Nov. 14, 2019, pp. 91.

Deep Knockoffs, Yaniv Romano, Matteo Sesia; Emmanuel J Candes, Nov. 19, 2018, pp. 37.

Boruta Feature Selection Example in Python; Aaron Lee, Northwestern Data Science MS; Sep. 28, 2020; pp. 10, https://towardsdatascience.com/simple-example-using-boruta-feature-selection-in-python-8b96925d5d7a/.

Automated Feature Selection With Boruta, Aleksey Bilogur, https://www.kaggle.com/code/residentmario/automated-feature-selection-with-boruta, 2018.

Boruta Feature Selection Explained in Python, Geek Culture; Moosa Ali; May 14, 2022; pp. 15 https://medium.com/geekculture/boruta-feature-selection-explained-in-python-7ae8bf4aa1e7.

* cited by examiner

FIG. 8Q

GRAPHICAL USER INTERFACE FOR INTERACTIVE FEATURE SELECTION AND REFINEMENT IN APPLIED MODELING TASKS

CROSS-REFERENCE TO RELATED APPLICATIONS

This application claims the benefit of priority to U.S. Patent Application No. 63/735,490, filed on Dec. 18, 2024, and U.S. Patent Application No. 63/726,870, file on Dec. 2, 2024, each incorporated herein by reference in their entirety for all purposes.

TECHNICAL FIELD

The embodiments described herein relate generally to data analytics and, more specifically, to software tools and graphical user interfaces (GUIs) that enable interactive assessment and refinement of predictor variables for enhanced development of statistical and machine learning models as well as user-friendly software platforms for complex data analysis tasks and advanced data processing evaluations.

BACKGROUND

Predictor selection refers to the process of identifying which input variables in a dataset are most relevant for building predictive models. Effective predictor selection may improve model accuracy, reduce overfitting, and decrease computational complexity by eliminating irrelevant or redundant inputs. Traditional approaches, such as the Boruta Method, attempt to automate this process by introducing randomized control variables (e.g., shadow variables) to estimate baseline contribution levels. However, such methods may prematurely discard predictors that have growing statistical importance across training iterations, potentially resulting in underfitting. Additionally, these techniques may lack transparency or user input mechanisms for refining predictor selection in subsequent modeling phases. The present disclosure describes systems and methods that improve predictor selection by enabling the preservation of predictors with growing statistical importance and utilizing graphical user interfaces that allow evaluation and refinement of predictor selections in real time to enhance model accuracy and robustness.

BRIEF SUMMARY OF THE INVENTION(S)

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

In some embodiments, a computer-program product may include a non-transitory machine-readable storage medium storing computer instructions that, when executed by one or more processors, perform operations comprising: displaying, via a graphical user interface, a plurality of selectable objects generated for an initial set of predictor variables in a dataset; displaying, concurrently with the plurality of selectable objects, the initial set of predictor variables in a distinct graphical representation associated with one of the plurality of selectable objects currently selected in the graphical user interface; receiving, via the graphical user interface, a plurality of inputs while the initial set of predictor variables are being displayed in the distinct graphical representation, wherein the plurality of inputs: select a subset of the initial set of predictor variables at the distinct graphical representation, add the subset of the initial set of predictor variables to a predictor selection list maintained in the graphical user interface, and initiate a predictor strength assessment for the subset of the initial set of predictor variables added to the predictor selection list; and in response to receiving the plurality of inputs, updating the distinct graphical representation and one or more other distinct graphical representations associated with the plurality of selectable objects based on the predictor strength assessment for the subset of the initial set of predictor variables.

In some embodiments, the computer instructions, when executed by the one or more processors, perform operations further comprising: performing a predictor strength assessment for the initial set of predictor variables in response to receiving a plurality of second inputs, and generating the graphical user interface after performing the predictor strength assessment for the initial set of predictor variables.

In some embodiments, performing the predictor strength assessment for the initial set of predictor variables includes: adding, to the dataset, a set of shadow columns corresponding to the initial set of predictor variables, training a first decision tree model using the initial set of predictor variables and the set of shadow columns, computing a first plurality of portion values for the initial set of predictor variables and the set of shadow columns based on split events in the first decision tree model, training one or more additional decision tree models using the initial set of predictor variables and one or more updated sets of shadow columns generated by reshuffling values in the set of shadow columns one or more times, computing one or more additional sets of portion values for the initial set of predictor variables and the one or more updated sets of shadow columns based on split events in the one or more additional decision tree models, and computing an initial set of predictor strength classifications for the initial set of predictor variables by at least using the first plurality of portion values and the one or more additional sets of portion values.

In some embodiments, computing the initial set of predictor strength classifications for the initial set of predictor variables includes: computing a set of mean portion values for the initial set of predictor variables by pooling the first plurality of portion values and the one or more additional sets of portion values, and computing a predictive strength of the initial set of predictor variables by assessing the set of mean portion values against one or more predictor significance criteria.

In some embodiments, computing the initial set of predictor strength classifications for the initial set of predictor variables includes: computing a set of mean portion values for the initial set of predictor variables by pooling the first plurality of portion values and the one or more additional sets of portion values, and detecting, from the first plurality of portion values and the one or more additional sets of portion values, a maximum shadow column that has a maximum portion value among the set of shadow columns, and computing a predictive strength of the initial set of predictor variables by assessing the set of mean portion values against one or more quantile thresholds associated with the maximum shadow column.

In some embodiments, computing the initial set of predictor strength classifications for the initial set of predictor variables includes: computing a plurality of comparison values by performing one or more pairwise comparisons between a respective predictor variable in the initial set of predictor variables and a respective shadow column in the set of shadow columns corresponding to the respective predictor variable, and computing a predictive strength of the initial set of predictor variables by assessing the plurality of comparison values against one or more predictor significance thresholds.

In some embodiments, the dataset includes a column corresponding to a respective predictor variable of the initial set of predictor variables, a respective shadow column of the set of shadow columns corresponds to the respective predictor variable and includes a randomized permutation of values in the column, a respective portion value of the first plurality of portion values represents a proportion of the split events in the first decision tree model that correspond to the respective predictor variable, a respective shadow column in the one or more updated sets of shadow columns includes a second randomized permutation of the values in the column, and the one or more additional sets of portion values includes a second portion value of the respective predictor variable that represents a proportion of the split events that correspond to the respective predictor variable in one of the one or more additional decision tree models.

In some embodiments, the plurality of second inputs specify one or more of: a first column of the dataset as a response variable, a plurality of other columns of the dataset as the initial set of predictor variables, a target type of a decision tree model to train on the response variable and the initial set of predictor variables, a number of decision trees of the target type of the decision tree model to train on the response variable and the initial set of predictor variables, a number of random uniform columns to add to the dataset before training the number of decision trees of the decision tree model, a value for one or more configurable hyperparameters of the target type of the decision tree model, and a type of shadow column parameter to use in classifying a predictive strength of the initial set of predictor variables.

In some embodiments, the type of shadow column parameter corresponds to one of: a max shadow column parameter that assesses a predictive strength of a respective predictor variable in the initial set of predictor variables by comparing a portion value of the respective predictor variable to a portion value of a shadow column of the dataset having a maximum portion value among a set of shadow columns in the dataset, a mean shadow column parameter that assess the predictive strength of the respective predictor variable by comparing the portion value of the respective predictor variable to a mean portion value of the set of shadow columns in the dataset, and a minimum shadow column parameter that assesses the predictive strength of the respective predictor variable by comparing the portion value of the respective predictor variable to a portion value of a shadow column of the dataset having a minimum portion value among the set of shadow columns in the dataset.

In some embodiments, the one of the plurality of selectable objects currently selected in the graphical user interface corresponds to a predictor overview selectable object, and the distinct graphical representation associated with the predictor overview selectable object includes a plurality of predictor strength rows and one or more shadow column rows corresponding to the initial set of predictor variables.

In some embodiments, the plurality of predictor strength rows and the one or more shadow column rows correspond to a respective column in the dataset, and a respective row of the plurality of predictor strength rows and the one or more shadow column rows includes one or more of: a name of a predictor variable associated with the respective column, a type of the respective column in the dataset, a strength classification of the predictor variable associated with the respective column, and a mean portion value of the predictor variable associated with the respective column.

In some embodiments, the computer instructions, when executed by the one or more processors, perform operations comprising: displaying the dataset concurrently with the distinct graphical representation associated with the one of the plurality of selectable objects currently selected in the graphical user interface; and in response to the plurality of inputs selecting the subset of the initial set of predictor variables at the distinct graphical representation, visually highlighting a subset of columns in the dataset that correspond to the subset of the initial set of predictor variables.

In some embodiments, the one of the plurality of selectable objects currently selected in the graphical user interface corresponds to a one-way control-based selectable object, and the distinct graphical representation associated with the one-way control-based selectable object displays results of a one-way analysis between the initial set of predictor variables and a respective shadow column of the dataset.

In some embodiments, displaying the results of the one-way analysis between the initial set of predictor variables and the respective shadow column of the dataset includes displaying: a y-axis that includes a range of portion values, an x-axis that includes the initial set of predictor variables and one or more shadow columns in the dataset, including the respective shadow column of the dataset, a set of box plot graphical markers representing a distribution of portion values for the initial set of predictor variables and the one or more shadow columns in the dataset, and a reference band spanning a second range of portion values for the respective shadow column of the dataset.

In some embodiments, a respective box plot graphical marker of the set of box plot graphical markers represents the distribution of portion values for a respective predictor variable of the initial set of predictor variables and visually indicates one or more of: a minimum portion value for the respective predictor variable across a set of trained decision trees, a first quartile portion value for the respective predictor variable across the set of trained decision trees corresponding to a 25th percentile of portion values for the respective predictor variable, a second quartile portion value for the respective predictor variable across the set of trained decision trees corresponding to a 50th percentile of portion values for the respective predictor variable, a third quartile portion value for the respective predictor variable across the set of trained decision trees corresponding to a 75th percentile of portion values for the respective predictor variable, and a maximum portion value for the respective predictor variable across the set of trained decision trees.

In some embodiments, the respective shadow column has a maximum portion value among the set of trained decision trees, and a respective box plot graphical marker of the set of box plot graphical markers represents the distribution of portion values for the respective predictor variable and is displayed with visual emphasis indicating that: the respective predictor variable is a strong predictor when at least a portion value of the respective predictor variable is greater than a first quartile value of the respective shadow column corresponding to a 75th percentile of portion values for the respective shadow column, the respective predictor variable is a medium predictor when at least the portion value of the respective predictor variable is between a second quartile of the respective shadow column and the first quartile of the respective shadow column, wherein the second quartile corresponds to a 25th percentile of portion values for the respective shadow column, and the respective predictor variable is a weak predictor when at least the portion value of the respective predictor variable is less than the second quartile of the respective shadow column.

In some embodiments, the graphical user interface includes a filter selection panel comprising a plurality of selected filter options, and the computer instructions, when executed by the one or more processors, perform operations comprising: receiving, via the filter selection panel, one or more second inputs for changing the plurality of selected filter options to include a first respective filter option associated with a first predictor category and exclude a second respective filter option associated with a second predictor category, and in response to receiving the one or more second inputs: ceasing displaying, in the distinct graphical representation, a second subset of predictor variables that are associated with the second predictor category, and adding, to the distinct graphical representation, a third subset of predictor variables that are associated with the first predictor category.

In some embodiments, the computer instructions, when executed by the one or more processors, perform operations further comprising: in response to receiving the one or more second inputs: rescaling the distinct graphical representation based at least on ceasing display of the second subset of predictor variables in the distinct graphical representation.

In some embodiments, the plurality of selectable objects correspond to a plurality of selectable tabs, the one of the plurality of selectable objects correspond to a respective selectable tab of the plurality of selectable tabs, the graphical user interface includes a plurality of tab containers associated with the plurality of selectable tabs, and a respective tab container associated with the respective selectable tab includes: the distinct graphical representation, and one or more expandable sections configured to display data underpinning the distinct graphical representation.

In some embodiments, the one of the plurality of selectable objects currently selected in the graphical user interface corresponds to a predictor-to-shadow difference selectable object, and the distinct graphical representation associated with the predictor-to-shadow difference selectable object includes: a plurality of predictor variable-to-shadow comparison rows, and a dot plot representing differences between the initial set of predictor variables and a plurality of shadow columns corresponding to the initial set of predictor variables.

In some embodiments, a respective predictor variable-to-shadow comparison row of the plurality of predictor variable-to-shadow comparison rows corresponds to a respective predictor variable of the initial set of predictor variables and includes one or more of: a name of the respective predictor variable, a name of a shadow column in the dataset corresponding to the respective predictor variable, a strength classification of the respective predictor variable, a significance score that represents whether a difference between a portion value of the respective predictor variable and a portion value of the shadow column is statistically significant, and a difference value indicating a magnitude of the difference between the portion value of the respective predictor variable and the portion value of the shadow column.

In some embodiments, the strength classification of the respective predictor variable corresponds to: a strong predictor classification when the significance score is less than a pre-defined threshold and the portion value of the respective predictor variable is greater than a first quartile of a max shadow column of the dataset, wherein the first quartile corresponds to a 75th percentile of portion values of the max shadow column, a medium predictor classification when the significance score is greater than the pre-defined threshold and the portion value of the respective predictor variable is between a second quartile and the first quartile of the max shadow column of the dataset, wherein the second quartile corresponds to a 25th percentile of portion values of the max shadow column, and a weak predictor classification when the significance score is less than the pre-defined threshold and the portion value of the respective predictor variable is less than the second quartile of the max shadow column of the dataset.

In some embodiments, the computer instructions, when executed by the one or more processors, perform operations further comprising: receiving, via the graphical user interface, a second input for transitioning to a second selectable object of the plurality of selectable objects, and in response to receiving the second input: ceasing displaying the distinct graphical representation associated with the one of the plurality of selectable objects currently selected in the graphical user interface, and beginning display of a distinct graphical representation associated with the second selectable object.

In some embodiments, the one of the plurality of selectable objects currently selected in the graphical user interface corresponds to a progress selectable object, and the distinct graphical representation associated with the progress selectable object displays a portion value of the initial set of predictor variables across a first number of training runs.

In some embodiments, the first number of training runs are performed in response to receiving a request to perform an assessment of predictor strength for the initial set of predictor variables, a second number of training runs are performed in response to performing the assessment of predictor strength for the subset of the initial set of predictor variables, and updating the distinct graphical representation in response to receiving the plurality of inputs includes: maintaining display of the portion value of the initial set of predictor variables across the first number of training runs, and adding, to the distinct graphical representation, a portion value of the subset of the initial set of predictor variables across the second number of training iterations.

In some embodiments, the distinct graphical representation corresponds to a line graph and includes a plurality of trend lines corresponding to the initial set of predictor variables, and a respective trend line of the plurality of trend lines corresponds to a respective predictor variable of the initial set of predictor variables and includes: a first portion representing changes in the portion value of the respective predictor variable across the first number of training runs, and a second portion representing changes in the portion value of the respective predictor variable across the second number of training runs.

In some embodiments, the first portion of the respective trend line has a first color to indicate that the respective predictor variable has a first strength across the first number of training runs, and the second portion of the respective trending line has a second color, different from the first color, to indicate that the respective predictor variable has a second strength across the second number of training runs.

In some embodiments, the respective trend line includes the second portion when the respective predictor variable is included in the subset of the initial set of predictor variables, and the respective trend line does not include the second portion when the respective predictor variable is not included in the subset of the initial set of predictor variables.

In some embodiments, a computer-implemented method may comprise: displaying, via a graphical user interface, a plurality of selectable objects generated for an initial set of predictor variables in a dataset; displaying, concurrently with the plurality of selectable objects, the initial set of predictor variables in a distinct graphical representation associated with one of the plurality of selectable objects currently selected in the graphical user interface; receiving, via the graphical user interface, a plurality of inputs while the initial set of predictor variables are being displayed in the distinct graphical representation, wherein the plurality of inputs: select a subset of the initial set of predictor variables at the distinct graphical representation, add the subset of the initial set of predictor variables to a predictor selection list maintained in the graphical user interface, and initiate a predictor strength assessment for the subset of the initial set of predictor variables added to the predictor selection list; and in response to receiving the plurality of inputs, updating the distinct graphical representation and one or more other distinct graphical representations associated with the plurality of selectable objects based on the predictor strength assessment for the subset of the initial set of predictor variables.

In some embodiments, a computer-implemented system may comprise: one or more processors; a memory; and a computer-readable medium operably coupled to the one or more processors, the computer-readable medium having computer-readable instructions stored thereon that, when executed by the one or more processors, cause a computing device to perform operations comprising: displaying, via a graphical user interface, a plurality of selectable objects generated for an initial set of predictor variables in a dataset; displaying, concurrently with the plurality of selectable objects, the initial set of predictor variables in a distinct graphical representation associated with one of the plurality of selectable objects currently selected in the graphical user interface; receiving, via the graphical user interface, a plurality of inputs while the initial set of predictor variables are being displayed in the distinct graphical representation, wherein the plurality of inputs: select a subset of the initial set of predictor variables at the distinct graphical representation, add the subset of the initial set of predictor variables to a predictor selection list maintained in the graphical user interface, and initiate a predictor strength assessment for the subset of the initial set of predictor variables added to the predictor selection list; and in response to receiving the plurality of inputs, updating the distinct graphical representation and one or more other distinct graphical representations associated with the plurality of selectable objects based on the predictor strength assessment for the subset of the initial set of predictor variables.

DESCRIPTION OF THE PREFERRED EMBODIMENTS

The following description of the preferred embodiments of the inventions are not intended to limit the inventions to these preferred embodiments, but rather to enable any person skilled in the art to make and use these inventions.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Example Systems

Systems depicted in some of the figures may be provided in various configurations. In some embodiments, the systems may be configured as a distributed system where one or more components of the system are distributed across one or more networks in a cloud computing system.

Figure 1:
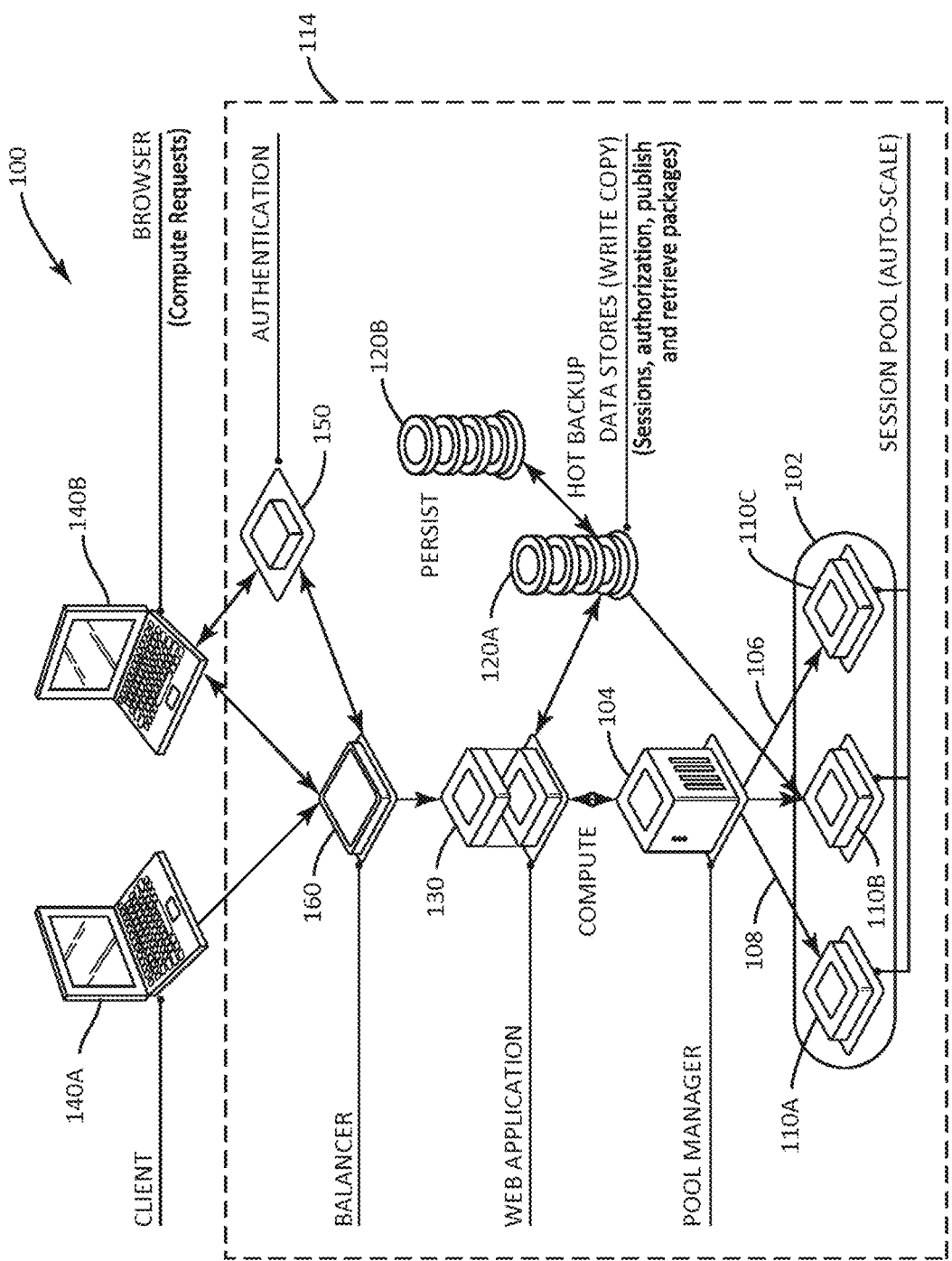
FIG. 1 illustrates an example network, including an example set of devices communicating with each other, according to at least one embodiment of the present technology.

FIG. 1 illustrates an example network 100 including an example set of devices communicating with each other (e.g., over one or more of an exchange system or a network), according to embodiments of the present technology. Network 100 includes network devices configured to communicate with a variety of types of client devices, for example, client devices 140, over a variety of types of communication channels. A client device 140 may be configured to communicate over a public or private network (e.g., client device 140B is configured to support a browser for computing requests or providing authentication).

Network devices and client devices can transmit a communication over a network 100. Network 100 may include one or more of different types of networks, including a wireless network, a wired network, or a combination of a wired and wireless network. Examples of suitable networks include the Internet, a personal area network, a local area network (LAN), a wide area network (WAN), a wireless local area network (WLAN), cloud network, or a cellular network. A wireless network may include a wireless interface or combination of wireless interfaces. As an example, a network in the one or more networks may include a short-range communication channel, such as a Bluetooth or a Bluetooth Low Energy channel. A wired network may include a wired interface. The wired and/or wireless networks may be implemented using routers, access points, base stations, bridges, gateways, or the like, to connect devices in the network. The one or more networks can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS), or other available protocols such as according to an Open Systems Interaction model. In addition, data and/or transactional details may be encrypted. Networks may include other devices for infrastructure for the network. For example, a cloud network may include cloud infrastructure system on demand. As another example, one or more client devices may utilize an Internet of Things (IoT) infrastructure where things (e.g., machines, devices, phones, sensors) can be connected to networks and the data from these things can be collected and processed within the things and/or external to the things. IoT may be implemented with various infrastructure such as for accessibility (technologies that get data and move it), embed-ability (devices with embedded sensors), and IoT services. Industries in the IoT space may include automotive (connected car), manufacturing (connected factory), smart cities, energy and retail.

Network devices and client devices can be different types of devices or components of devices. For example, client device 140 is shown as a laptop and balancer 160 is shown as a processor. Client devices and network devices could be other types of devices or components of other types of devices such as a mobile phone, laptop computer, tablet computer, temperature sensor, motion sensor, and audio sensor. Additionally, or alternatively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, and flow rate sensors. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current. The sensors may be mounted to various components used as part of a variety of different types of systems (e.g., an oil drilling operation). The network devices may detect and record data related to the environment that it monitors, and transmit that data to network 100.

As noted, one type of system that may include various sensors that collect data to be processed and/or transmitted to a computing environment (not shown) according to certain embodiments includes an oil drilling system. For example, the one or more drilling operation sensors may include, for example, surface sensors that measure a standpipe pressure, a surface torque, and a rotation speed of a drill pipe, and downhole sensors that measure a rotation speed of a bit and fluid densities. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, for example, the rate of penetration and pump pressure may also be stored and used for modeling, prediction, or classification.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device or client device may include a home automation switch that may be coupled with a home appliance. In another embodiment, a network or client device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment (e.g., computing environment or another computing environment not shown) according to certain embodiments includes a manufacturing environment (e.g., manufacturing products or energy). A variety of different network devices may be included in an energy pool, such as various devices within one or more power plants, energy farms (e.g., wind farm, and solar farm) energy storage facilities, factories, homes and businesses of consumers. One or more of such devices may include one or more sensors that detect energy gain or loss, electrical input or output or loss, and a variety of other efficiencies. These sensors may collect data to inform users of how the energy pool, and individual devices within the pool, may be functioning and how they may be made more efficient. In a manufacturing environment, image data can be taken of the manufacturing process or other readings of manufacturing equipment. For example, in a semiconductor manufacturing environment, images can be used to track, for example, process points (e.g., movement from a bonding site to a packaging site), and process parameters (e.g., bonding force, electrical properties across a bond of an integrated circuit).

Network device sensors may also perform processing on data it collects before transmitting the data to a computing environment, or before deciding whether to transmit data to a computing environment. For example, network devices may determine whether data collected meets certain rules, for example by comparing data or values calculated from the data and comparing that data to one or more thresholds. The network device may use this data and/or comparisons to determine if the data should be transmitted to a computing environment for further use or processing.

Devices in computing environment 114 may include specialized computers, servers, or other machines that are configured to individually and/or collectively process large amounts of data (e.g., using a session pool 102). The computing environment 114 may also include storage devices (e.g., data stores 120) that include one or more databases of structured data, such as data organized in one or more hierarchies, or unstructured data. The databases may communicate with the processing devices within computing environment 114 to distribute data to them and store data used in the computing environment 114. Computing environment 114 may collect, analyze and/or store data from or pertaining to communications, client device operations, client rules, and/or user-associated actions stored at one or more devices in computing environment 114. Such data may influence communication routing to the devices within computing environment 114, and how data is stored or processed within computing environment 114, among other actions.

Network 100 may also include one or more network-attached data stores 120. Network-attached data stores 120 are used to store data to be processed by the computing environment 114 as well as any intermediate or final data generated by the computing system in non-volatile memory. For instance, data stores 120 can perform functions such as writing and copying data and can provide data storage for network functions such as sessions, authorization, publishing and retrieving packages. In certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores 120 may store a variety of different types of data organized in a variety of different ways and from a variety of different sources. For example, network-attached data stores 120 may include storage other than primary storage located within computing environment 114 that is directly accessible by processors located therein. Network-attached data stores 120 may include secondary, tertiary, auxiliary, or back-up storage (e.g., data storage 120B), such as large hard drives, servers, and virtual memory, among other types. Storage devices may include portable or non-portable storage devices, optical storage devices, and various other mediums capable of storing and containing data (e.g., computer a machine-readable storage medium or computer-readable storage medium such as computer readable medium 210 in FIG. 2).

Furthermore, the data stores may hold a variety of different types of data. For example, network-attached data stores 120 may hold unstructured (e.g., raw) data, such as manufacturing data (e.g., a database containing records identifying products being manufactured with parameter data for each product, such as performance metrics or criteria) or product sales databases (e.g., a database containing individual data records identifying details of individual product performance).

The unstructured data may be presented to the computing environment 114 in different forms such as a flat file or a conglomerate of data records and may have data values and accompanying time stamps. The computing environment 114 may be used to analyze the unstructured data in a variety of ways to determine the best way to structure (e.g., hierarchically) that data, such that the structured data is tailored to a type of further analysis on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Other devices can further be used to influence communication routing and/or processing between devices within computing environment 114 and with devices outside of computing environment 114. For example, as shown in FIG. 1, computing environment 114 may include a device 130 supporting a web application. Thus, computing environment 114 can retrieve data of interest, such as client information (e.g., product information, client rules, etc.), technical product details, news, current or predicted weather, and so on. Balancer 160 can be used to balance and direct load within the computing environment 114. Authentication device 150 can be used to provide authentication or other security protocols for a client device, user or group accessing computing environment 114.

In addition to computing environment 114 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from sensors as the sensors continuously sense, monitor and track changes in their environments. Devices within computing environment 114 may also perform pre-analysis on data it receives to determine if the data received should be processed as part of an ongoing project. The data received and collected by computing environment 114, no matter what the source or method or timing of receipt, may be processed over a period of time for a client to determine results data based on the client's needs and rules.

FIG. 1 includes a pool of devices with a pool manager 104 and session pool 102. Network 100 includes a variety of pool managers (e.g., pool manager 104) and worker nodes 110 (e.g., devices, servers, or server farms of session pool 102), according to embodiments of the present technology. Devices of session pool 102 are communicatively connected (e.g., via communication path 108 and communication path 106). Therefore, the pool manager may transmit information (e.g., related to the session pool 102 or notifications), to and receive information from each other. Although only one pool manager 104 is shown in FIG. 1, the network 100 may include more pool managers or a different kind of device manager (e.g., a dedicated resource manager).

Session pool 102 includes one or more worker nodes (e.g., worker node 110A). Shown in FIG. 1 are three worker nodes 110A-C merely for illustration, more or less worker nodes could be present. For instance, the pool manager 104 may itself be a worker node and may not need further worker nodes to complete a task. A given worker node could include dedicated computing resources or allocated computing resources as needed to perform operations as directed by the pool manager 104. The number of worker nodes included in a session pool 102 may be dependent, for example, upon how large the project or data set is being processed by the session pool 102, the capacity of each worker node, and the time designated for the session pool 102 to complete the project. Each worker node within the session pool 102 may be connected (wired or wirelessly, and directly or indirectly) to pool manager 104. Therefore, each worker node may receive information from the pool manager 104 (e.g., an instruction to perform work on a project) and may transmit information to the pool manager 104 (e.g., a result from work performed on a project). Furthermore, worker nodes 110 may communicate with each other (either directly or indirectly). For example, worker nodes 110 may transmit data between each other related to a job being performed or an individual task within a job being performed by that worker node. However, in certain embodiments, worker nodes 110 may not, for example, be connected (communicatively or otherwise) to certain other worker nodes. In an embodiment, worker nodes may only be able to communicate with the pool manager 104 that controls it, and may not be able to communicate with other worker nodes in the session pool 102.

The pool manager 104 may connect with other devices of network 100 or an external device (e.g., a pool user, such as a server or computer). For example, a server or computer may connect to pool manager 104 and may transmit a project or job to the node. The project may include a data set. The data set may be of any size. Once the pool manager 104 receives such a project including a large data set, the pool manager 104 may distribute the data set or projects related to the data set to be performed by worker nodes 110. Alternatively, for a project including a large data set, the data set may be received or stored by a machine other than a pool manager 104 or worker node 110 (e.g., a Hadoop data node).

Pool manager may maintain knowledge of the status of the worker nodes 110 in the session pool 102 (i.e., status information), accept work requests from clients, subdivide the work across worker nodes 110, and coordinate the worker nodes 110, among other responsibilities. Worker nodes 110 may accept work requests from a pool manager 104 and provide the pool manager 104 with results of the work performed by the worker nodes 110. A session pool 102 may be started from a single node (e.g., a machine, computer, server, etc.). This first node may be assigned or may start as the primary pool manager 104 that will control any additional nodes that enter the session pool 102.

When a project is submitted for execution (e.g., by a client or a pool manager 104), it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A pool manager may be designated as the primary pool manager among multiple pool managers. A server, computer or other external device may connect to the primary pool manager. Once the pool manager receives a project, the primary pool manager may distribute portions of the project to its worker nodes for execution. For example, when a project is initiated on session pool 102, primary pool manager 104 controls the work to be performed for the project to complete the project as requested or instructed. The primary pool manager may distribute work to the worker nodes 110 based on various factors, such as which subsets or portions of projects may be completed most efficiently and in the correct amount of time. For example, a worker node may perform analysis on a portion of data that is already local (e.g., stored on) the worker node. The primary pool manager also coordinates and processes the results of the work performed by each worker node after each worker node executes and completes its job. For example, the primary pool manager may receive a result from one or more worker nodes, and the pool manager may organize (e.g., collect and assemble) the results received and compile them to produce a complete result for the project received from the end user.

Any remaining pool manager (not shown) may be assigned as backup pool manager for the project. In an embodiment, backup pool manager may not control any portion of the project. Instead, backup pool manager may serve as a backup for the primary pool manager and take over as primary pool manager if the primary pool manager were to fail.

To add another node or machine to the session pool 102, the primary pool manager may open a pair of listening sockets, for example. A socket may be used to accept work requests from clients, and the second socket may be used to accept connections from other pool nodes. The primary pool manager may be provided with a list of other nodes (e.g., other machines, computers, servers) that will participate in the pool, and the role that each node will fill in the pool. Upon startup of the primary pool manager (e.g., the first node on the pool), the primary pool manager may use a network protocol to start the server process on every other node in the session pool 102. Command line parameters, for example, may inform each node of one or more pieces of information, such as: the role that the node will have in the pool, the host name of the primary pool manager, and the port number on which the primary pool manager is accepting connections from peer nodes. The information may also be provided in a configuration file, transmitted over a secure shell tunnel, and recovered from a configuration server. While the other machines in the pool may not initially know about the configuration of the pool, that information may also be sent to each other node by the primary pool manager. Updates of the pool information may also be subsequently sent to those nodes.

For any pool manager other than the primary pool manager added to the pool, the pool manager may open multiple sockets. For example, the first socket may accept work requests from clients, the second socket may accept connections from other pool members, and the third socket may connect (e.g., permanently) to the primary pool manager. When a pool manager (e.g., primary pool manager) receives a connection from another pool manager, it first checks to see if the peer node is in the list of configured nodes in the pool. If it is not on the list, the pool manager may clear the connection. If it is on the list, it may then attempt to authenticate the connection. If authentication is successful, the authenticating node may transmit information to its peer, such as the port number on which a node is listening for connections, the host name of the node, and information about how to authenticate the node, among other information. When a node, such as the new pool manager, receives information about another active node, it will check to see if it already has a connection to that other node. If it does not have a connection to that node, it may then establish a connection to that pool manager.

Any worker node added to the pool may establish a connection to the primary pool manager and any other pool manager on the pool. After establishing the connection, it may authenticate itself to the pool (e.g., any pool manager, including both primary and backup, or a server or user controlling the pool). After successful authentication, the worker node may accept configuration information from the pool manager.

When a node joins a session pool 102 (e.g., when the node is powered on or connected to an existing node on the pool or both), the node is assigned (e.g., by an operating system of the pool) an identifier (e.g., a universally unique identifier (UUID)). This identifier may help other nodes and external entities (devices, users, etc.) to identify the node and distinguish it from other nodes. When a node is connected to the pool, the node may share its identifier with the other nodes in the pool. Since each node may share its identifier, each node may know the identifier of every other node on the pool. Identifiers may also designate a hierarchy of each of the nodes (e.g., backup pool manager) within the pool. For example, the identifiers of each of the backup pool manager may be stored in a list of backup pool manager to indicate an order in which the backup pool manager will take over for a failed primary pool manager to become a new primary pool manager. However, a hierarchy of nodes may also be determined using methods other than using the unique identifiers of the nodes. For example, the hierarchy may be predetermined, or may be assigned based on other predetermined factors.

The pool may add new machines at any time (e.g., initiated from any pool manager). Upon adding a new node to the pool, the pool manager may first add the new node to its table of pool nodes. The pool manager may also then notify every other pool manager about the new node. The nodes receiving the notification may acknowledge that they have updated their configuration information.

Primary pool manager 104 may, for example, transmit one or more communications to backup pool manager or other control or worker nodes within the session pool 102). Such communications may be sent using protocols such as periodically, at fixed time intervals, or between known fixed stages of the project's execution. The communications transmitted by primary pool manager 104 may be of varied types and may include a variety of types of information. For example, primary pool manager 104 may transmit snapshots (e.g., status information) of the session pool 102 so that backup pool manager 104 always has a recent snapshot of the session pool 102. The snapshot or pool status may include, for example, the structure of the pool (including, for example, the worker nodes in the pool, unique identifiers of the nodes, or their relationships with the primary pool manager) and the status of a project (including, for example, the status of each worker node's portion of the project). The snapshot may also include analysis or results received from worker nodes in the session pool 102. The backup pool manager may receive and store the backup data received from the primary pool manager. The backup pool manager may transmit a request for such a snapshot (or other information) from the primary pool manager, or the primary pool manager may send such information periodically to the backup pool manager.

As noted, the backup data may allow the backup pool manager to take over as primary pool manager if the primary pool manager fails without requiring the pool to start the project over from scratch. If the primary pool manager fails, the backup pool manager that will take over as primary pool manager may retrieve the most recent version of the snapshot received from the primary pool manager and use the snapshot to continue the project from the stage of the project indicated by the backup data. This may prevent failure of the project as a whole.

A backup pool manager may use various methods to determine that the primary pool manager has failed. In one example of such a method, the primary pool manager may transmit (e.g., periodically) a communication to the backup pool manager that indicates that the primary pool manager is working and has not failed, such as a heartbeat communication. The backup pool manager may determine that the primary pool manager has failed if the backup pool manager has not received a heartbeat communication for a certain predetermined period of time. Alternatively, a backup pool manager may also receive a communication from the primary pool manager itself (before it failed) or from a worker node that the primary pool manager has failed, for example because the primary pool manager has failed to communicate with the worker node.

Different methods may be performed to determine which backup pool manager of a set of backup pool manager will take over for failed primary pool manager 104 and become the new primary pool manager. For example, the new primary pool manager may be chosen based on a ranking or "hierarchy" of backup pool manager based on their unique identifiers. In an alternative embodiment, a backup pool manager may be assigned to be the new primary pool manager by another device in the session pool 102 or from an external device (e.g., a system infrastructure or an end user, such as a server or computer, controlling the session pool 102). In another alternative embodiment, the backup pool manager that takes over as the new primary pool manager may be designated based on bandwidth or other statistics about the session pool 102.

A worker node within the session pool 102 may also fail. If a worker node fails, work being performed by the failed worker node may be redistributed amongst the operational worker nodes. In an alternative embodiment, the primary pool manager may transmit a communication to each of the operable worker nodes still on the session pool 102 that each of the worker nodes should purposefully fail also. After each of the worker nodes fail, they may each retrieve their most recent saved checkpoint of their status and re-start the project from that checkpoint to minimize lost progress on the project being executed.

Figure 2:
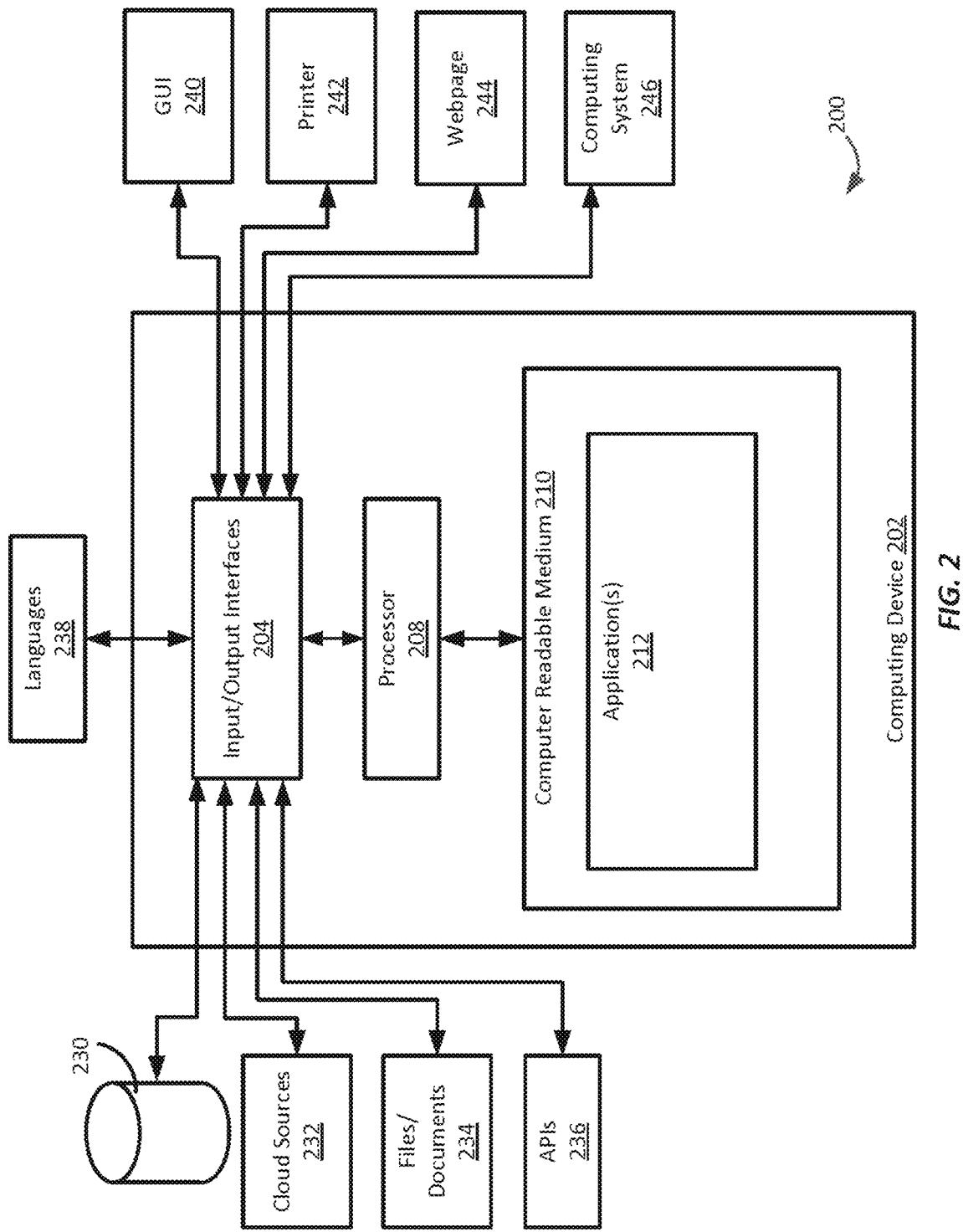
FIG. 2 illustrates a block diagram that provides an illustration of the hardware components of a computing system, according to at least one embodiment of the present technology.

While each device in FIG. 1 is shown as a single device, it will be appreciated that multiple devices may instead be used. FIG. 2 shows an example computing structure for a device in FIG. 2. FIG. 2 includes a computing device 202. The computing device 202 has a computer-readable medium 210 and a processor 208. Computer-readable medium 210 is an electronic holding place or storage for information so the information can be accessed by processor 208. The computer readable medium 210 is a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including, for example, memory sharing, message passing, token passing, and network transmission. Computer-readable medium 210 can include, but is not limited to, any type of random-access memory (RAM), any type of read only memory (ROM), any type of flash memory, etc. such as magnetic storage devices (e.g., hard disk, floppy disk, magnetic strips), optical disks (e.g., compact disc (CD), digital versatile disc (DVD)), smart cards, flash memory devices, etc.

Processor 208 executes instructions (e.g., stored at the computer-readable medium 210). The instructions can be carried out by a special purpose computer, logic circuits, or hardware circuits. In one or more embodiments, processor 208 is implemented in hardware and/or firmware. Processor 208 executes an instruction, meaning it performs or controls the operations called for by that instruction. The term "execution" is the process of running an application or the carrying out of the operation called for by an instruction. The instructions can be written using one or more programming language, scripting language, assembly language, etc. Processor 208 in one or more embodiments can retrieve a set of instructions from a permanent memory device and copy the instructions in an executable form to a temporary memory device that is generally some form of RAM, for example. Processor 208 operably couples with components of computing device 202 (e.g., input/output interface 204 and with computer readable medium 210) to receive, to send, and to process information.

For instance, in one or more embodiments, computing device 202 sends and/or receives information from one or more of databases 230, cloud sources 232, application programming interfaces 236 (API's), graphical user interfaces 240 (GUIs), printers 242, webpages 244, and computing systems 246. The input/output interface 204 may be configured to receive languages 238 (e.g., to communicate with other computing systems 246) or specific electronic files or documents 234 (e.g., inputs for building models or designing experiments). The input/output interface 204 may be a single interface (e.g., an output interface only to output reports to a printer 242), multiple interface (e.g., a graphical user interface 240 may be interactive and send and receive data over input/output interface 204), or a set of interfaces (e.g., to connect with multiple devices).

In one or more embodiments, computer-readable medium 210 stores instructions for execution by processor 208. In one or more embodiments, one or more applications stored on computer-readable medium 210 are implemented in software (e.g., computer-readable and/or computer-executable instructions) stored in computer-readable medium 210 and accessible by processor 208 for execution of the instructions.

Figure 3:
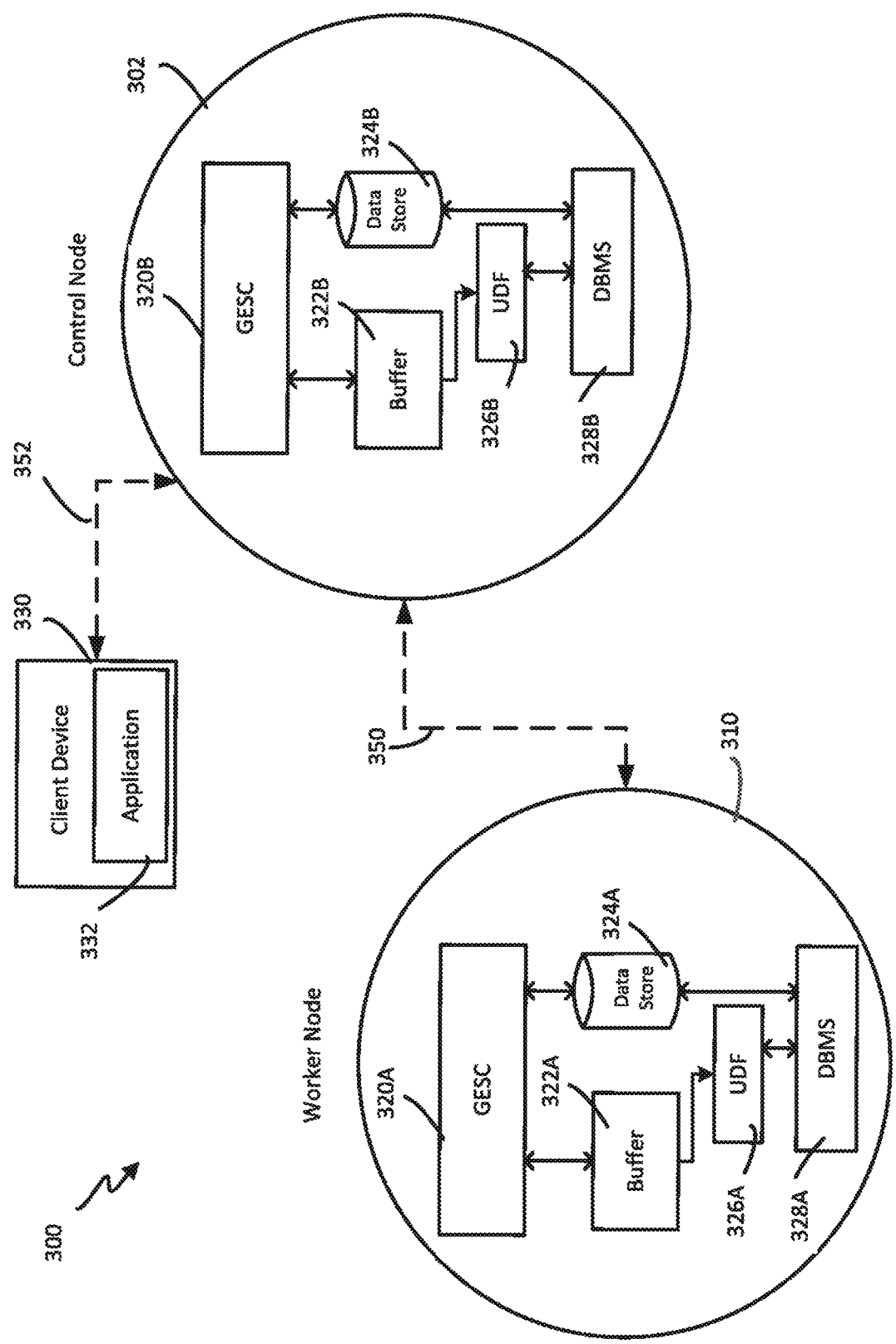
FIG. 3 illustrates a portion of a communications grid computing system, including a control node and a worker node, according to at least one embodiment of the present technology.

FIG. 3 illustrates a system 300 including a control node (e.g., pool manager 104 of FIG. 1) and a worker node (e.g., worker nodes 110 of FIG. 1), according to embodiments of the present technology. System 300 includes one control node (control node 302) and one worker node (worker node 310) for purposes of illustration but may include more worker and/or control node. The control node 302 is communicatively connected to worker node 310 via communication path 350. Therefore, control node 302 may transmit information (e.g., related to the session pool 102 or notifications), to and receive information from worker node 310 via path 350.

System 300 includes data processing nodes (e.g., control node 302 and worker node 310). Control node 302 and worker node 310 can include multi-core data processors. Each control node 302 and worker node 310 in this example includes a grid-enabled software component (GESC) 320 that executes on the data processor associated with that node and interfaces with buffer memory 322 also associated with that node. Each control node 302 and worker node 310 in this example includes a database management software (DBMS) 328 that executes on a database server (not shown) at control node 302 and on a database server (not shown) at worker node 310.

Each control node 302 and worker node 310 in this example also includes a data storage 324. Data storage 324, similar to network-attached data stores 120 in FIG. 1, are used to store data to be processed by the nodes in the computing environment. Data storage 324 may also store any intermediate or final data generated by the computing system after being processed, for example in non-volatile memory. However, in certain embodiments, the configuration of the system 300 allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the pool receives queries (e.g., ad hoc) from a client device 330 and when responses, which are generated by processing large amounts of data, need to be generated quickly or on-the-fly. In such a situation, the pool may be configured to retain the data within memory so that responses can be generated at different levels of detail and so that a client may interactively query against this information.

Each control node 302 and worker node 310 in this example also includes a user-defined function (UDF) 326. The UDF 326 provides a mechanism for the DBMS 328 to transfer data to or receive data from the database stored in the data storage 324 that are managed by the DBMS. For example, UDF 326 can be invoked by the DBMS 328 to provide data to the GESC 320 for processing. The UDF 326 may establish a socket connection (not shown) with the GESC 320 to transfer the data. Alternatively, the UDF 326 can transfer data to the GESC 320 by writing data to shared memory accessible by both the UDF 326 and the GESC 320.

The GESC 320 at the control node 302 and worker node 310 may be connected via a network. Therefore, control node 302 and worker node 310 can communicate with each other via the network using a predetermined communication protocol such as, for example, the Message Passing Interface (MPI). Each GESC 320 can engage in point-to-point communication with the GESC at another node or in collective communication with multiple GESCs via the network. The GESC 320 at each node may contain identical (or nearly identical) software instructions. Each control node 302 and worker node 310 may be configured to operate as either a pool manager or a worker node. The GESC 320B at the control node 302 can communicate, over a communication path 352, with a client device 330. More specifically, control node 302 may communicate with client application 332 hosted by the client device 330 to receive queries and to respond to those queries after processing large amounts of data.

DBMS 328 may control the creation, maintenance, and use of database or data structure (not shown) within control node 302 and worker node 310. The database may organize data stored in data storage 324. The DBMS 328 at control node 302 may accept requests for data and transfer the appropriate data for the request. With such a process, collections of data may be distributed across multiple physical locations. In this example, each control node 302 and worker node 310 stores a portion of the total data managed by the management system in its associated data storage 324.

Furthermore, the DBMS 328 may be responsible for protecting against data loss using replication techniques. Replication includes providing a backup copy of data stored on one node on one or more other nodes. Therefore, if one node fails, the data from the failed node can be recovered from a replicated copy residing at another node. Data or status information for each node in the session pool 102 may also be shared with each node on the pool.

Figure 4:
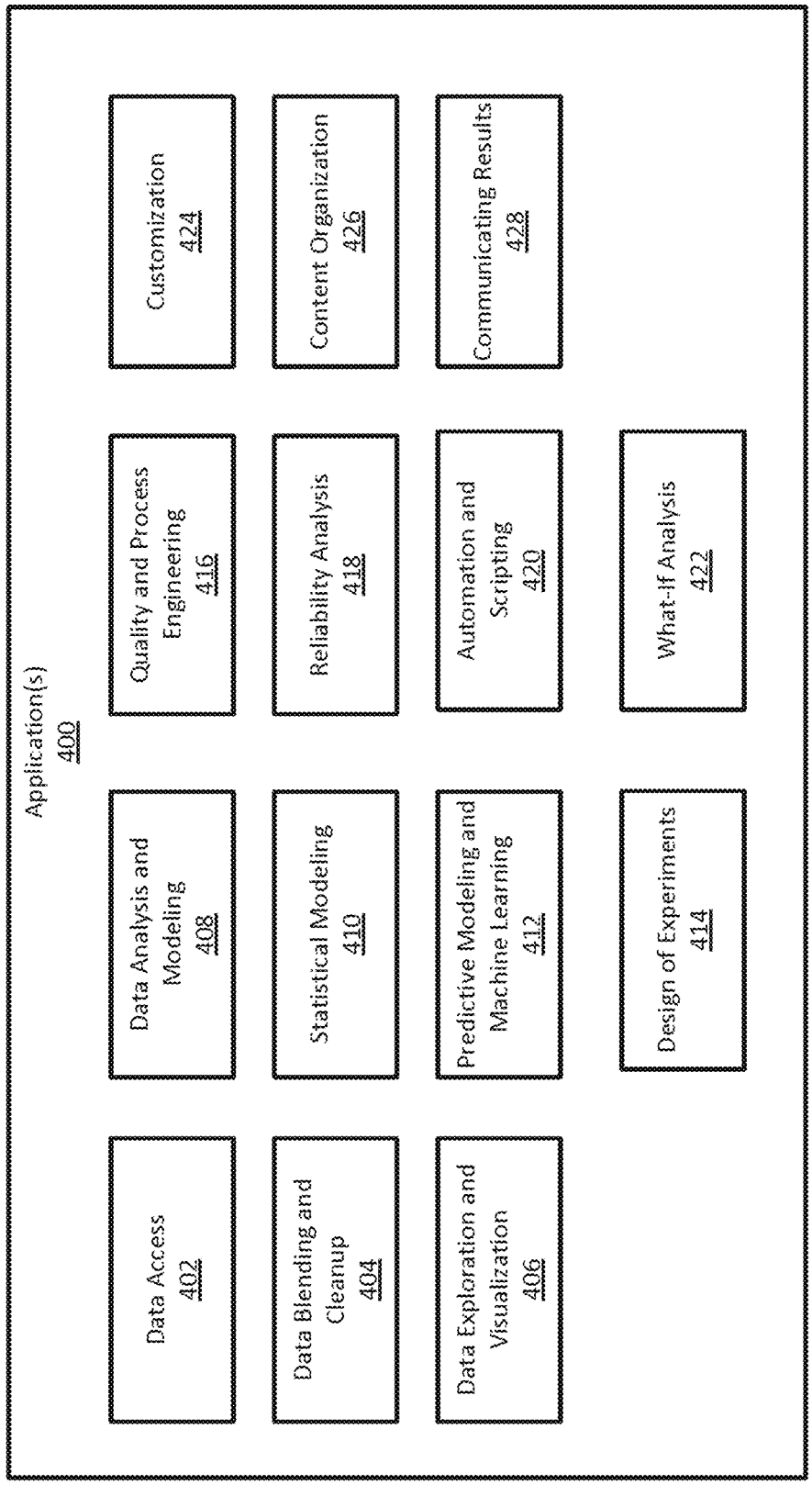
FIG. 4 illustrates a block diagram of example applications, according to at least one embodiment of the present technology.

FIG. 4 provides example applications 400 (e.g., applications executed by a computing device 202, worker node 310, or control node 302) for performing one or more tasks or operations.

For example, data access operations 402 can be used for accessing data from different sources (e.g., importing and/or reading Excel files, flat files, relational databases, APIs, R, Python, and SAS® files and databases). For instance, data can be imported for data visualization, exploration and analysis. Data can be formatted or optimized. For instance, data blending and cleanup operations 404 can be used to remove complexity (e.g., in text, images and functions data) and for screening data (e.g., screening data for outliers, entry errors, missing values and other inconsistencies that can compromise data analysis). This can be useful for visual and interactive tools. Data can also be transformed, blended, grouped, filtered, merged into a single table or into subsets, or otherwise arranged for a particular scenario.

In one or more embodiments, one or more applications 400 include data exploration and visualization operations 406 that can be used to support plot and profiler tools. For instance, plot tools can be used to create data plots (e.g., to plot data to spot patterns and patterns that do not fit a trend). Some example plots include bubble plots, scatter plots (matrix and 3D), parallel plots, cell plots, contour plots, ternary plots, and surface plots. Profilers are tools that can be used to create a specialized set of plots in which changing one plot changes the other plots. For instance, profiling is an approach to generate visualizations of response surfaces by seeing what would happen if a user changed just one or two factors at a time. Profiler tools can be used to create interactive profiles of data (e.g., to explore and graph data dynamically and uncover hidden relationships between graphed data or interface with linked data, to interpret and understand the fit of equations to data, and to find factor values to optimize responses). Some example profiler tools include prediction profiler, contour profiler, surface profiler, mixture profiler, custom profiler, and excel profiler. A prediction profiler can be used to show vertical slices across each factor, holding other factors at a current value. A contour profiler allows horizontal slices showing contour lines for two factors at a time. A surface profiler generates three-dimensional plots for two factors at a time, or contour surface plot for 3 factors at a time. A mixture profiler is a contour profiler for mixture of factors. A custom profiler is a numerical optimizer. An excel profiler allows for visualization of models or formulas stored in electronic worksheets. Accordingly, profiler tools can allow for one or more of simulation, surface visualization, optimization, and desirability studies. Graphs (e.g., from plot or profiler tools) can be exported to electronic or print reports for presenting findings. Further, data exploration and visualization operations 406 can include text exploration such as computer extraction of symbols, characters, words and phrases; or computer visualization such as to organize symbols, characters, words and phrases to uncover information regarding a text or classify the text.

In one or more embodiments, one or more applications 400 include data analysis and modeling operations 408 can be used to analyze one or many variables or factors in linked analysis. Analysis results may be linked with specific graphs designed for different types of data or metrics (e.g., graphs related to histograms, regression modeling and distribution fitting). Data analysis and modeling can be performed real-time (or just-in-time). For instance, applications 400 can included statistical modeling operations 410. For instance, statistical modeling operations 410 can be used for a diversity of modeling tasks such as univariate, multivariate and multifactor. Data can be transformed from its collected form (e.g., text or functional form) and data can be used for building models for better insights (e.g., discovery trends or patterns in data). As another example, one or more applications 400 can include predictive modeling and machine learning operations 412 to build models using predictive modeling techniques, such as regression, neural networks and decision trees. The operations 412 can be used to fit multiple predictive models and determine the best performing model with model screening. Validation (e.g., cross-validation and k-fold cross-validation) can be used (e.g., to prevent over-fitting or to select a best model). Machine learning methods can be used by the user without having to write code and tune algorithms. Examples of machine learning techniques are described in more detail with respect to FIGS. 5 and 6.

In one or more embodiments, one or more applications 400 include design of experiments (DOE) operations 414 used to create designs for experiments that provide test conditions for one or more factors tested in the experiment. For example, the design of experiments operations 414 can be used to create optimally designed experiments, efficient experiments to meet constraints, process limitations and budget, and/or screening designs to untangle important effects between multiple factors. DOE operations 414 can also be used for evaluating designs (e.g., design diagnostic measures such as efficiency metrics).

In one or more embodiments, one or more applications 400 include quality and process engineering operations 416 to track and visualize quality and processes. For instance, the quality and process engineering operations 416 can generate charts to explore root causes of quality or process problems (e.g., causes of variation in manufacturing processes and drill down into problem processes). Additionally, or alternatively, they can be used to generate notifications for metrics that exceed a threshold such as an out-of-control signal or a control chart warning. Additionally, or alternatively, they can be used to study the capability and performance of one or more variables to identify processes that are not meeting user-defined goals. Objective data from processes or consumer data can be used to release better products and react to market trends.

In one or more embodiments, one or more applications 400 include reliability analysis operations 418. For example, in manufacturing, reliability analysis tools can be used to prevent failure, improve warranty or product performance, find and address important design vulnerabilities, and pinpoint defects in materials or processes. Reliability analysis tools can also be used to determine how to reduce or improve these issues (e.g., by identifying trends and outliers in data and model predictions). What-if Analysis operations 422 can be used to demonstrate patterns of predicted responses and the effect of each factor on the response with scenario analysis. For example, a graphical user interface can be used for a user to put in different inputs, assumptions or constraints for a system and observe responses or effects. For instance, in a measurement system analysis analyzing whether parts would be in-specification, different estimated variances between parts and operators testing the parts could be varied to determine the effect on modeled output for the measurement system analysis.

In one or more embodiments, one or more applications 400 include automation and scripting operations 420. For example, automation can allow code-free access for a user to automation routines all the way up to completely customized applications (e.g., code free access to SAS®, MATLAB®, Python® and R routines). For example, a design created for experiments can be automated such that automatic testing is performed for the design.

In one or more embodiments, one or more applications 400 include operations for greater user control and interaction. For instance, customization operations 424 can be used for user customization (e.g., mass customizations, and customizations of graphics, statistics, and default views). As another example, content organization operations 426 can be used to organize data (e.g., translate statistical results to a simplified view to communicate findings and organize, summarize, and document content to better aid the accountability and reproducibility of projects). As another example, the communicating results operations 428 can be used for presentation of results, models, or other output from one or more applications 400 (e.g., presented in print, graphical user interface, or web-based versions).

In one or more embodiments, fewer, different, and additional components can be incorporated into computing device 202. In one or more embodiments, the input/output interface has more than one interface that uses the same or different interface technology.

In one or more embodiments, the one or more applications 400 can be integrated with other analytic or computing tools not specifically shown here. For instance, one or more applications are implemented using or integrated with one or more software tools such as JMPR, Base SAS, SAS® Enterprise Miner™, SAS/STAT®, SAS® High Performance Analytics Server, SAS® Visual Data Mining and Machine Learning, SAS® LASR™ SAS® In-Database Products, SAS® Scalable Performance Data Engine, SAS® Cloud Analytic Services, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, and SAS/IML®.

Figure 5:
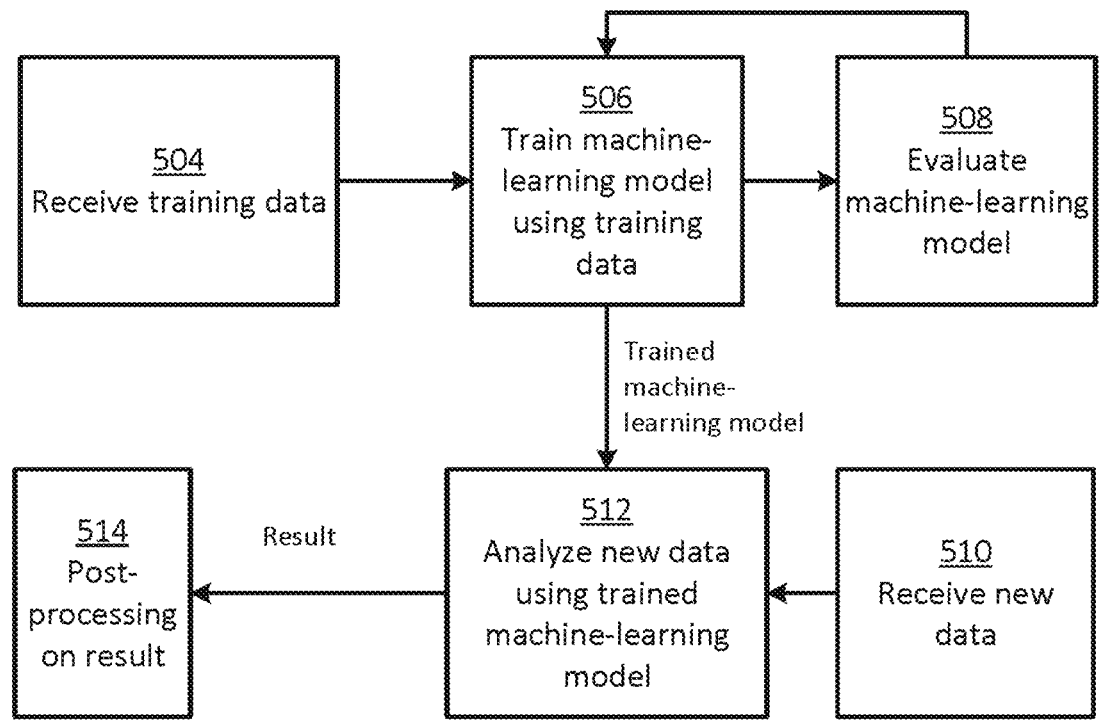
FIG. 5 illustrates a flow chart of an example of a process for generating and using a machine-learning model, according to at least one embodiment of the present technology.

One or more embodiments are useful for generating and using machine-learning models. FIG. 5 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector operator (LASSO) classifiers, and support vector machines; (iv) clusterers, such as k-means clustering, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models construction can be at least partially automated (e.g., with little or no human involvement) in a training process. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 5.

In block 504, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 506, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 508, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 506, where the machine-learning model can be further trained using additional training data or otherwise modified to improve accuracy. If the machine-learning model has an adequate degree of accuracy for the particular task, the process can continue to block 510.

In block 510, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 512, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 514, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 6:
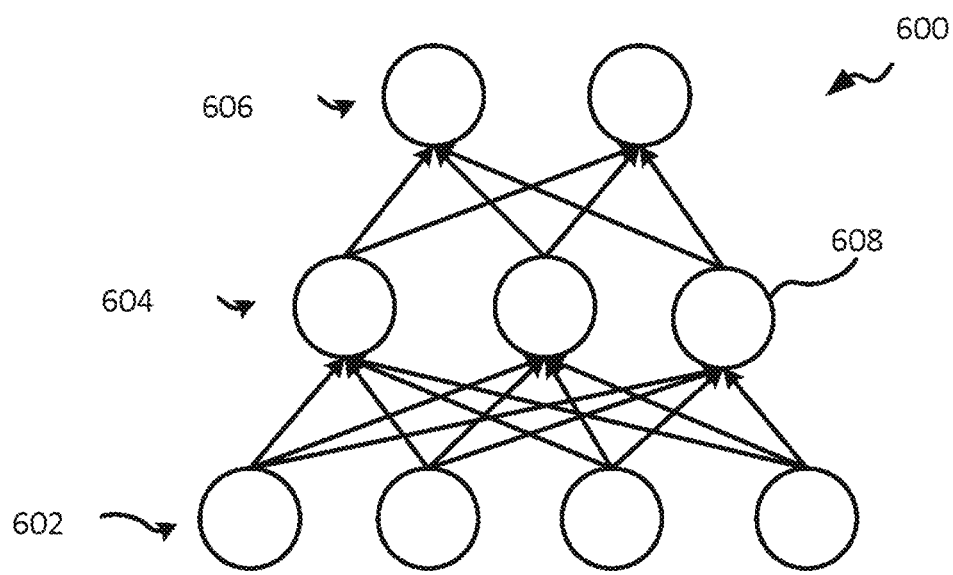
FIG. 6 illustrates an example of a machine-learning model as a neural network, according to at least one embodiment of the present technology.

A more specific example of a machine-learning model is the neural network 600 shown in FIG. 6. The neural network 600 is represented as multiple layers of interconnected neurons, such as neuron 608, that can exchange data between one another. The layers include an input layer 602 for receiving input data, a hidden layer 604, and an output layer 606 for providing a result. The hidden layer 604 is referred to as hidden because it may not be directly observable or have its input directly accessible during the normal functioning of the neural network 600. Although the neural network 600 is shown as having a specific number of layers and neurons for exemplary purposes, the neural network 600 can have any number and combination of layers, and each layer can have any number and combination of neurons.

The neurons and connections between the neurons can have numeric weights, which can be tuned during training. For example, training data can be provided to the input layer 602 of the neural network 600, and the neural network 600 can use the training data to tune one or more numeric weights of the neural network 600. In some examples, the neural network 600 can be trained using backpropagation. Backpropagation can include determining a gradient of a particular numeric weight based on a difference between an actual output of the neural network 600 and a desired output of the neural network 600. Based on the gradient, one or more numeric weights of the neural network 600 can be updated to reduce the difference, thereby increasing the accuracy of the neural network 600. This process can be repeated multiple times to train the neural network 600. For example, this process can be repeated hundreds or thousands of times to train the neural network 600.

In some examples, the neural network 600 is a feed-forward neural network. In a feed-forward neural network, every neuron only propagates an output value to a subsequent layer of the neural network 600. For example, data may only move one direction (forward) from one neuron to the next neuron in a feed-forward neural network.

In other examples, the neural network 600 is a recurrent neural network. A recurrent neural network can include one or more feedback loops, allowing data to propagate in both forward and backward through the neural network 600. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 600 operates by receiving a vector of numbers from one layer; transforming the vector of numbers into a new vector of numbers using a matrix of numeric weights, a nonlinearity, or both; and providing the new vector of numbers to a subsequent layer of the neural network 600. Each subsequent layer of the neural network 600 can repeat this process until the neural network 600 outputs a final result at the output layer 606. For example, the neural network 600 can receive a vector of numbers as an input at the input layer 602. The neural network 600 can multiply the vector of numbers by a matrix of numeric weights to determine a weighted vector. The matrix of numeric weights can be tuned during the training of the neural network 600. The neural network 600 can transform the weighted vector using a nonlinearity, such as a sigmoid tangent or the hyperbolic tangent. In some examples, the nonlinearity can include a rectified linear unit, which can be expressed using the following equation:

$$y = \max(x, 0)$$

where y is the output and x is an input value from the weighted vector. The transformed output can be supplied to a subsequent layer, such as the hidden layer 604, of the neural network 600. The subsequent layer of the neural network 600 can receive the transformed output, multiply the transformed output by a matrix of numeric weights and a nonlinearity, and provide the result to yet another layer of the neural network 600. This process continues until the neural network 600 outputs a final result at the output layer 606.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the session pool 102 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. Furthermore, these processors may also be employed in heterogeneous computing architectures with a number of and a variety of different types of cores, engines, nodes, and/or layers to achieve various energy efficiencies, chip-level thermal processing considerations, processing speed improvements, data communication speed improvements, and/or data efficiency targets and improvements throughout various parts of the system when compared to a homogeneous computing architecture that employs CPUs for general purpose computing.

Associated Processes

Predictor selection may refer to a process of identifying which variables (i.e., predictor variables, predictors, features) in a dataset are most relevant to use as inputs for a machine learning or statistical model and using only the most relevant variables to train and predict an output (i.e., a response variable, a prediction) of the model. The predictor variables that are most relevant may be those that have the most influence on the structure or predictive accuracy of the model. The quantitative measure used to determine the relevancy may be referred to as the contribution of a predictor variable. Performing predictor selection may reduce overfitting by pruning out any predictor variables most likely to contribute to noise (e.g., those that have a weak or not statistical relationship with the response variable). Additionally, machine learning or statistical models with fewer predictor variables may have a reduced size and/or may use fewer memory or processing resources during training or prediction as compared to models with more predictor variables.

Some computer systems may perform predictor selection by identifying, from the dataset, a response variable and a set of candidate predictor variables and evaluating associated columns of the dataset (e.g., a response column for the response variable and predictor columns of the candidate predictor variables) through one or more modeling techniques (e.g., decision trees) to determine the relative contribution of each of the candidate predictor variables to the model's predictive accuracy. Upon determining the relative contribution, the computer systems may select the predictor variables with a highest degree of contribution. For instance, the computer systems may select the predictor variables whose contribution exceeds a particular baseline threshold or range (e.g., may perform a quantile-based comparison). In some examples, the computer systems may then iterate on the results, re-evaluating the selected predictor variables to prune the selected predictor variables further.

One technique for establishing the threshold or range is to determine the relative contribution of a variable modeling random noise, which may be referred to as a random variable, and to use the relative contribution of the random variable to determine the threshold or range. However, such approaches may involve using heuristics when generating a distribution for the random variable rather than an empirical approach and may thus risk underfitting if too many predictor variables are cut out or overfitting if too many predictor variables are retained. Another technique for establishing the threshold or range is using the Boruta Method, which may involve creating one or more shadow variables (e.g., a variable whose associated column of data is a randomized permutation of the data of a predictor column) and to use an aggregate of the contributions of the one or more shadow variables to determine a threshold or range.

However, some of the predictor variables that fail to exceed the threshold or range determined by the Boruta Method may have statistical significance. For instance, some predictor variables may have a contribution that exceeds the contribution of their respective shadow variables despite being within or below the threshold or range determined by the Boruta Method. Such predictor variables, if selected for a next round of training runs, may end up being identified as statistically significant. However, the Boruta Method may cut out these predictor variables before their significance is established. Accordingly, performing the Boruta Method may result in underfitting, which may decrease a model's accuracy and/or may result in a longer latency associated with training the model to get to a particular degree of accuracy.

By contrast, the techniques described herein may ensure preservation of predictor variables whose relative contribution grows over each round of training runs. For instance, the system described herein may perform a predictor strength assessment in which one or more decision tree models are trained using predictor variables and their associated shadow columns. The corresponding contribution of the predictor variables and their corresponding shadow columns may be computed and a baseline range may be established based on one of the shadow columns (e.g., a maximum shadow column, a minimum shadow column) or an aggregate thereof (e.g., a mean shadow column. Predictor variables whose mean exceeds, is within, or below the baseline range may be placed into a first strength classification category (e.g., "Strong"), second strength classification category (e.g., "Medium"), and a third strength classification category (e.g., "Weak"). Predictor variables within the second strength classification category may be compared against their shadow column to determine if the contribution associated with the predictor variable exceeds its shadow column by above a threshold amount. Predictor variables within the first strength classification category or within the second strength classification category but with a contribution exceeding a corresponding shadow column above a threshold amount may be selected for a next round of training runs.

Further, the techniques described herein may provide for a graphical user interface that displays information about the contribution of each predictor variable and user interface control elements that enable the set of predictor variables to be selected via user input for use in a next round of training runs. The Boruta Method, by contrast, may automatically prune predictor variables before proceeding to a next round of training runs. Accordingly, the graphical user interface may facilitate fine-tuning of a decision model via user input, whereas the Boruta Method may lack such capabilities. Additionally, the techniques described herein may provide additional advantages over conventional techniques. For instance, the system described herein may utilize multiple statistical assessment techniques for classifying predictor variables, such as quantile-based comparisons and pairwise tests, enabling preservation of predictor variables that may be prematurely discarded according to a single statistical assessment technique (e.g., the Boruta Method).

Additional advantages of the techniques described herein may include improvement of conventional predictor selection procedures by incorporating statistical methods and interactive user control that facilitates preservation of predictor variables with small but statistically significant contributions. For instance, rather than solely utilizing aggregate thresholds to eliminate predictor variables with lower contributions, the system described herein may apply statistical tests such as Student's t-tests to identify predictor variables whose contribution, despite having a similar or lower magnitude relative to that of a maximum shadow column, is significantly different from the shadow column generated for that predictor variable. Retaining such variables may reduce a likelihood of underfitting. Further, the classification of predictor variables into distinct strength categories (e.g., "Strong", "Medium", and "Weak") may convey more granular insight than aggregate scoring alone and may enable user facilitation in retaining or discarding predictor variables based on contextual or domain-specific considerations. Such techniques may differentiate the present disclosure from the Boruta method, which may discard predictor variables by using a single statistical approach and without user input.

Additionally, the predictor strength assessment described herein may operate in an iterative manner, enabling users to inspect interim results, refine predictor variable selections, and reinitiate assessments without reconfiguring parameters utilized in the predictor strength assessment. Accordingly, the system may provide a semi-automated framework that reduces repetitive user operations, decreases computational redundancy, and improves efficiency while navigating increasingly large datasets. These improvements may be advantageous in research and development or manufacturing, in which reduction of a dimensionality of experimental factors or isolation of root causes of system behaviors are desired.

It should be noted that the techniques described herein may be implemented as part of a software-based tool used (e.g., by technical professionals, such as data scientists) in the development, testing, and refinement of statistical or machine learning models. The users of the software tool may have specialized technical expertise (e.g., expertise in statistics, machine learning) that enable them to use the software tool to select predictor variables for use in various practical applications (e.g., modeling tasks, root cause analysis). The software tool may aid the users by providing display elements that delineate the contributions of predictor variables relative to relevant baselines (e.g., shadow columns), enabling improved interpretability and transparency. Additionally, the software tool may provide control elements that allow users to iteratively prune predictor variables within the graphical user interface without performing reconfiguration of all parameters between predictor strength assessments, enabling a more simplified workflow. Further, the software tool may include control elements that enable dataset columns to automatically be imported into the software tool and may, in some examples, be automatically configured to export the dataset columns corresponding to each of a final, pruned set of predictor variables to one or more software platforms or applications configured to perform additional tasks (e.g., predictive modeling, experimental factor analysis, or root cause analysis), thus reducing manual and potentially error-prone overhead associated with moving dataset columns from one application or platform to another.

The software tool may be deployed in various scenarios in which predictive modeling and/or experimental factor analysis are used. For instance, in manufacturing environments, the system may be used to isolate contributing factors for product defects, quality issues, or process variation, thereby supporting root cause analysis and corrective action planning. Additionally, in pharmaceutical and biomedical research, the system may be applied to assess experimental factors that influence clinical outcomes.

Figure 7:
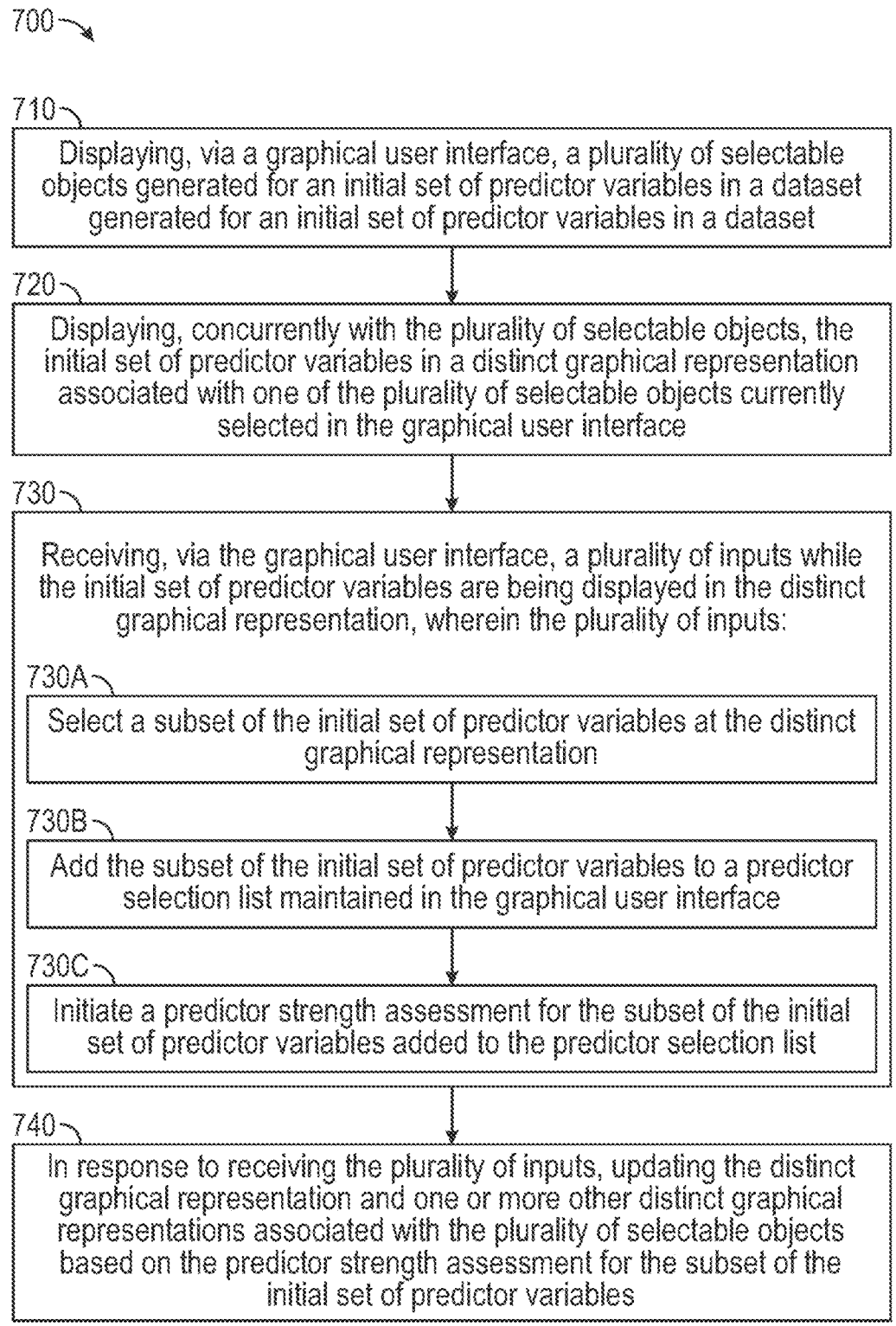
FIG. 7 illustrates an example method for enabling interactive predictor strength assessment and refinement according to at least one embodiment of the present technology.

FIG. 7 illustrates one embodiment of method 700. It shall be appreciated that other embodiments contemplated within the scope of the present disclosure may involve more processes, fewer processes, different processes, or a different order of processes than illustrated in FIG. 7. It should be noted that a computer-program product may include a non-transitory machine-readable storage medium storing computer instructions that, when executed by one or more operations, may perform operations corresponding to the processes and sub-processes of method 700. Additionally, or alternatively, a computer-implemented method may include operations corresponding to processes and sub-processes of 700. Additionally, or alternatively, a computer-implemented system may include one or more processors, a memory, and a computer-readable medium operably coupled to the one or more processors, the computer-readable medium having computer-readable instructions stored thereon that, when executed by the one or more processors, cause a computing device to perform operations corresponding to the processes and sub-processes of method 700.

As shown in FIG. 7, process 710 of method 700 may display, via a graphical user interface, a plurality of selectable objects generated for an initial set of predictor variables in a dataset. The term "graphical user interface" may refer to a visual and interactive environment rendered by a computing system that enables the viewing and manipulation of analytical data. The term "plurality of selectable objects" may refer to a set of interactive visual components (e.g., multiple user interface control elements, such as tabs, tiles, buttons, or icons) displayed on the graphical user interface that enables navigation between different analytical views. Each selectable object may be associated with a respective analytical view, where the term "analytical view" may refer to a graphical representation within the user interface that presents analytical data related to the initial set of predictor variables.

The term "predictor variables" may refer to a set of independent input variables represented as one or more columns in a structured dataset, each of which may be evaluated for a potential relationship to an associated response variable. Additionally, the term "dataset" may refer to an organized collection of data values structured in tabular form, where each row may represent an individual observation or instance, and each column may correspond to a specific variable or feature. A dataset that includes predictor variables may include a respective column for each predictor variable as well as a column for the response variable. It should be noted, without deviating from the scope of the present disclosure, that the dataset may have a different form (e.g., swapping the roles of columns and rows).

Implementing process 710 may include the system or service retrieving the dataset that includes data for the initial set of predictor variables, extracting observation data for the initial set of predictor variables from the dataset, performing a predictor strength assessment for the initial set of predictor variables in response to receiving a set of initial inputs, and generating (e.g., rendering) the graphical user interface in response to performing the predictor strength assessment. Retrieving the dataset may include accessing a data structure (e.g., a database, a data table, a structured file) stored locally or remotely using one or more user-supplied or predefined configuration parameters. Extracting the observation data from the dataset may include identifying the column headers corresponding to the predictor variables and putting the observation data for each column whose column header is associated with a predictor variable into one or more data structures accessible during the predictor strength assessment.

The term "predictor strength" may refer to a quantitative measure of a relative contribution of a predictor variable in predicting a response variable within a dataset. A predictor strength assessment may be a computational process used to evaluate the predictor strength of each predictor variable within a specified set of predictor variables (e.g., the initial set of predictor variables). In some examples, predictor strength classifications (e.g., "Strong", "Medium", or "Weak") may be derived from statistical comparisons, such as the results of a Dunnett's test, where the statistical significance of each predictor variable's contribution is evaluated relative to a control (e.g., a shadow column). For instance, a predictor variable may be classified as "Strong" if its contribution is statistically greater than that of the control, "Medium" if it is not statistically different, and "Weak" if it is statistically lower. Receiving the set of initial inputs may include receiving (e.g., via the graphical user interface), user input that provides or modifies one or more configuration parameters. In such examples, performing the predictor strength assessment based on receiving the set of initial inputs may include performing the predictor strength assessment using the provided or modified configuration parameter values.

Performing a predictor strength assessment may include adding, to the dataset, a set of shadow columns corresponding to the initial set of predictor variables. The term "shadow column" may refer to an additional column added to the dataset that is associated with a particular predictor variable and includes simulated observed data that serves as a statistical control for evaluating predictor strength. In some examples, a shadow column may have a randomized permutation of observed data in the corresponding predictor variable column such that the univariate distribution (e.g., man, variance) is preserved. Alternatively, a shadow column may include synthetically generated values drawn from a distribution that approximates the statistical profile of the corresponding predictor variable (e.g., a normal distribution with the same mean and standard deviation).

Adding a set of shadow columns to the data set may involve allocating new columns in the dataset structure and populating each column with values derived via randomized permutation of the associated predictor variable column or distribution sampling as described herein. Each shadow column may be named or tagged to maintain a definable correspondence with its associated predictor variable. Without deviating from the scope of the present disclosure, there may be examples in which multiple shadow columns may be generated per predictor variable.

Additionally, performing the predictor strength assessment may include training a first decision tree model using the initial set of predictor variables and the set of shadow columns. The term "decision tree model" may refer to a supervised machine learning model that recursively partitions a dataset into subsets based on values of input variables, forming a structure of decision nodes and branches used to output predictions or classifications. A decision tree model may correspond to a single decision tree or, in some examples, may include an ensemble of multiple decision trees, such as a bootstrap forest, in which each decision tree of the ensemble may be trained on a random resampling of the observed data within the dataset. Training a decision tree model may include evaluating candidate split points (e.g., candidate split events) for a set of predictor variables and the corresponding set of shadow columns and selecting the candidate split points that optimize a splitting criterion (e.g., Gini impurity, information gain).

Performing the predictor strength assessment may further include computing a first set of portion values for the initial set of predictor variables and the set of shadow columns based on split events in the first decision tree model. The term "split event" may refer to a decision point within a decision tree at which the dataset is partitioned based on the value of a particular variable (e.g., either a predictor variable or a shadow column). Each split event may correspond to a node in the decision tree where a variable is selected to divide the data into child nodes to optimize a splitting criterion. The term "portion value" may refer to a numerical value that represents the proportion or frequency which a particular variable (e.g., a variable from the set of predictor variables or the set of shadow columns) is used to perform split events relative to all split events across the decision tree model.

Computing a set of portion values may include traversing the structure of a trained decision tree model and tallying the number of times each variable (e.g., each predictor variable or each shadow column variable) appears as a split variable in the trained decision tree model. In the case where the decision tree model is a single decision tree, the portion value for a given variable may be computed as the ratio of the number of split events involving that predictor variable to the total number of nodes in the tree (e.g., excluding leaf nodes). In the case where the decision tree model includes multiple decision trees, the portion value may be computed as an aggregate (e.g., a mean or normalized sum) of the split frequencies for that variable across all decision trees in the model.

Performing the predictor strength assessment may additionally include training one or more additional decision tree models using the initial set of predictor variables and one or more updated sets of shadow columns generated by reshuffling values in the set of shadow columns one or more times or regenerating the set of shadow columns using distribution sampling one or more times. Further, performing the predictor strength assessment may include computing one or more additional sets of portion values for the initial set of predictor variables and the one or more updated sets of shadow columns based on split events in the one or more additional decision tree models.

Performing the predictor strength assessment may also include computing an initial set of predictor strength classifications for the initial set of predictor variables by at least using the first set of portion values and the one or more additional sets of portions values. The term "predictor strength classifications" may refer to categorical labels assigned to predictor variables (e.g., "strong", "medium", "weak") based on a comparative analysis of their observed behavior during the predictor strength assessment process.

A first example of computing an initial set of predictor strength classifications may include computing a set of mean portion values for the initial set of predictor variables by pooling the first set of portion values and the one or more additional sets of portion values and computing a predictive strength of the initial set of predictor variables by assessing the set of mean portion values against one or more predictor significance criteria. The term "mean portion value" may refer to an average of the portion values computed for a given predictor variable across multiple decision tree models (e.g., each trained using different permutations or instances of shadow columns). The term "predictor significance criteria" may refer to one or more thresholds used to determine whether a predictor variable's mean portion value is indicative of a meaningful contribution to a response variable. For instance, a predictor variable may be assigned a "strong" classification if its mean portion value exceeds a defined upper threshold (e.g., above 0.20), a medium classification if the value falls between the defined upper threshold and a defined lower threshold (e.g., between 0.05 and 0.20), and "weak" classification if the mean portion value falls below a defined lower threshold (e.g., below 0.05). The upper threshold and lower threshold may be configured via user input or may be determined automatically.

A second example of computing an initial set of predictor strength classifications may include computing a set of mean portion values for the initial set of predictor variables by pooling the first set of portion values the one or more additional sets of portion values; detecting, from the first set of portion values and the one or more additional sets of portion values, a maximum shadow column that has a maximum portion value among the set of shadow columns; and computing a predictive strength of the initial set of predictor variables by assessing the set of mean portion values against one or more quantile thresholds associated with the maximum shadow column. The term "maximum shadow column" may refer to the shadow column whose mean or maximum portion value is highest among all shadow columns used across the decision tree models. The term "quantile thresholds" may refer to statistical boundary values (e.g., the 25th percentile, the 75th percentile) derived from the distribution of portion values associated with the maximum shadow column and used as reference points for classification. For example, a predictor variable may be classified as "strong" if its mean portion value is greater than the 75th percentile of the maximum shadow column's distribution, "medium" if it falls between the 25th and 75th percentiles, and "weak" if it is below the 25th percentile. It should be noted that the median shadow column, the minimum shadow column, or a mean shadow column (e.g., a shadow column representing a mean of some or all shadow columns) may be used without deviating from the scope of the present disclosure.

A third example of computing an initial set of predictor strength classifications may include computing a set of comparison values by performing one or more pairwise comparisons between a respective predictor variable in the initial set of predictor variables and a respective shadow column in the set of shadow columns corresponding to the respective predictor variable and computing a predictive strength of the initial set of predictor variables by assessing the set of comparison values against one or more predictor significance thresholds. The term "comparison value" may refer to a statistical metric representing a difference in behavior between a predictor variable and its corresponding shadow column. For example, the comparison value may be a difference in mean portion values or a result of a significance test (e.g., a t-test, such as Student's t-test). The term "predictor significance threshold" may refer to a criterion, such as a p-value cutoff (e.g., 0.05), used to determine whether a difference is statistically significant. For instance, a predictor variable may be classified as "strong" if the comparison value indicates a statistically significant difference (e.g., greater than 0.05) and the predictor's mean portion value exceeds that of its shadow column, "medium" if no significant difference is detected, and "weak" if the comparison value indicates a statistically significant difference (e.g., greater than 0.05) and the predictor's mean portion value is below that of its shadow column.

In a fourth example of computing an initial set of predictor strength classifications, a predictor variable may be classified as "strong" if it has a Dunnett's p-value less than a threshold (e.g., 0.05) and/or has a mean difference greater than the 75th quantile of portion values of a maximum shadow column; may be classified as "medium" if it has a Dunnett's p-value greater than the threshold and/or has a mean difference between the 25th and 75th quantile of the portion values of the maximum shadow column; and may be classified as "weak" if it has a Dunnett's p-value less than the threshold and/or has a mean difference lower than the 25th quantile of the portion values of the maximum shadow column.

In some examples, the one or more configuration parameters used in performing the predictor strength assessment may specify one or more of a first column of the dataset as a response variable, a set of other columns of the dataset as the initial set of predictor variables, a target type of a decision tree model to train on the response variable and the initial set of predictor variables, and a number of decision trees of the target type of the decision tree model to train on the response variable and the initial set of predictor variables. The one or more configuration parameters may further include a number of random uniform columns to add to the dataset before training the number of decision trees of the decision tree model. The phrase "random uniform columns" may refer to synthetic columns added to the dataset containing values drawn from a uniform distribution, which may act as an additional baseline for comparison during the predictor strength assessment (e.g., along with or instead of a shadow column). Additionally, the one or more configuration parameters may include a value for one or more configurable hyperparameters of the target type of the decision tree model. The term "configurable hyperparameters" may refer to tunable settings for the decision tree models. Examples of configurable hyperparameters may include, but not be limited to, tree depth, minimum split size, or number of variables considered per split.

Additionally, or alternatively, the one or more configuration parameters may include a type of shadow column parameter to use in classifying a predictive strength of the initial set of predictor variables. The shadow column parameter may correspond to a max shadow column parameter (i.e., a maximum shadow column parameter) that assesses a predictive strength of a respective predictor variable in the initial set of predictor variables by comparing a portion value of the respective predictor variable to a portion value of a shadow column of the dataset having a maximum portion value among a set of shadow columns in the dataset. In other examples, the shadow column parameter may correspond to a mean shadow column parameter that assesses the predictive strength of the respective predictor variable by comparing the portion value of the respective predictor variable to a mean portion value of the set of shadow columns in the dataset. In yet other examples, the shadow column parameter may correspond to a minimum shadow column parameter that assesses the predictive strength of the respective predictor variable by comparing the portion value of the respective predictor variable to a portion value of a shadow column of the dataset having a minimum portion value among the set of shadow columns in the dataset.

Figure 8A:
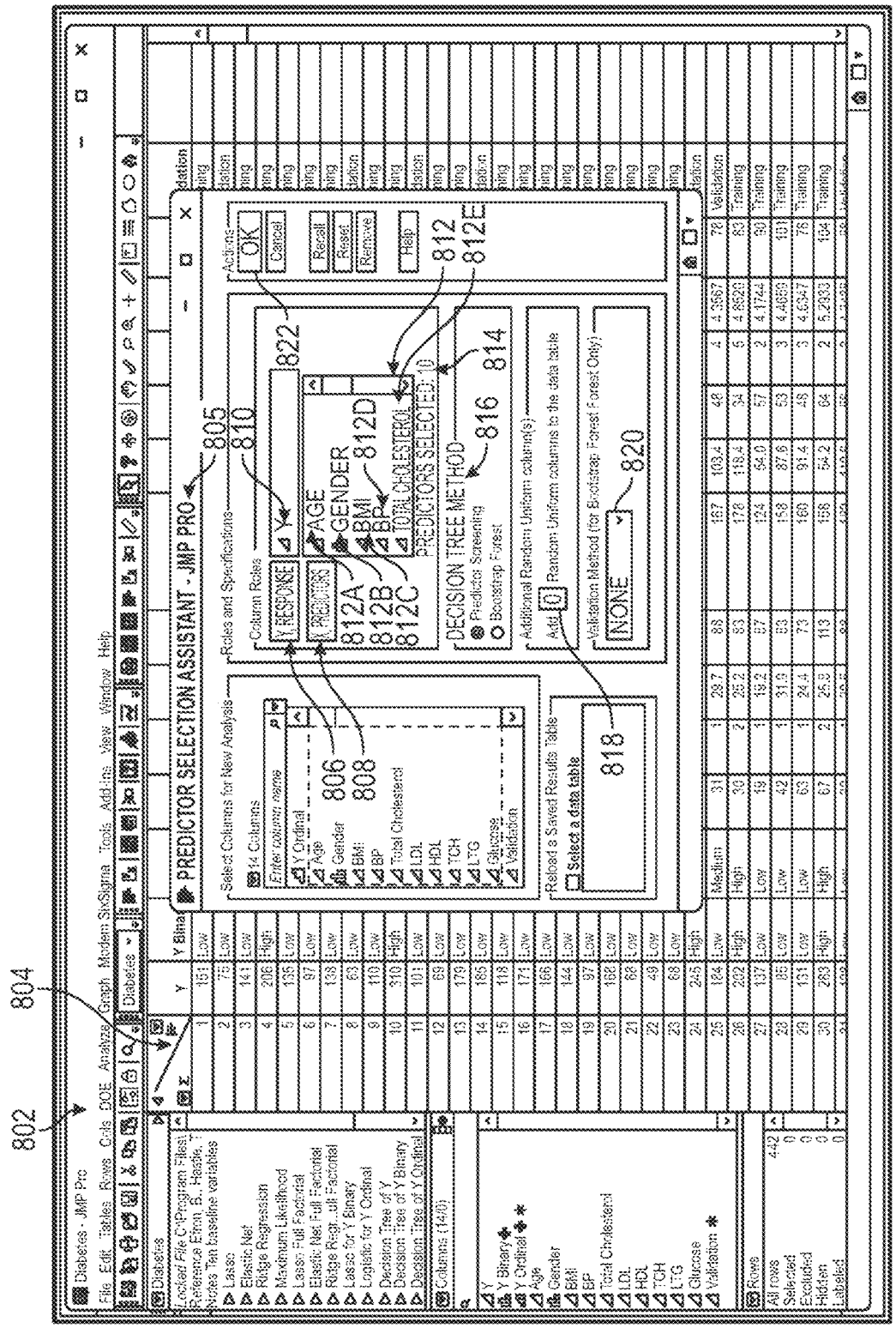
FIGS. 8A through 8Q illustrate example graphical user interfaces for enabling interactive predictor strength assessment and refinement according to at least one embodiment of the present technology.
Figure 8B:
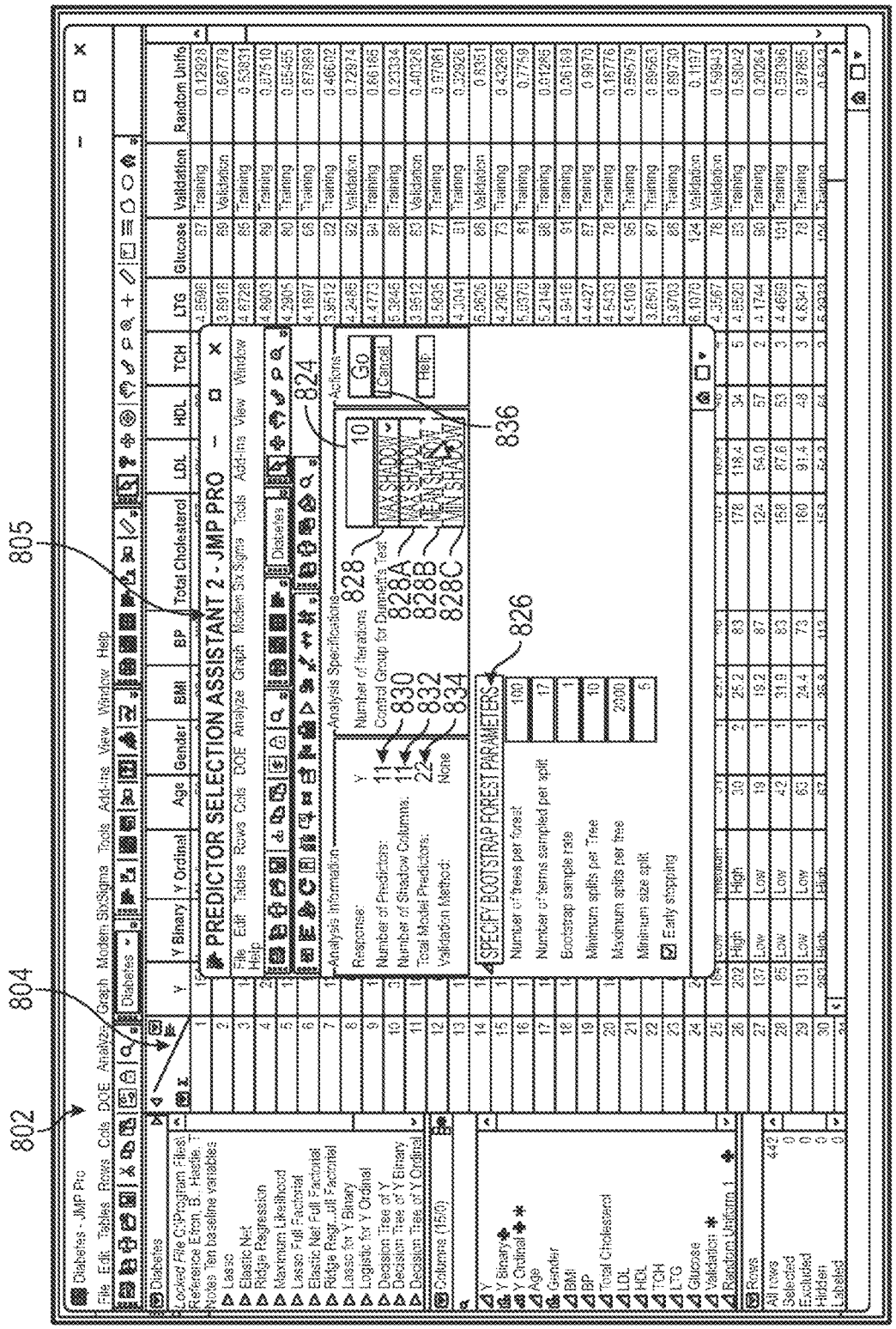

FIGS. 8A and 8B may depict a non-limiting example of a graphical user interface 805 configured to set up and execute a predictor strength assessment for a set of predictor variables. An application 802 may display a dataset 804 with a first column corresponding to a response variable and one or more second columns corresponding to predictor variables. The application 802 may additionally include a user interface control element that may be activated or triggered to generate user interface 805.

User interface 805 may enable configuration of one or more configuration parameters. For instance, when loading user interface 805, the graphical user interface 802 may be configured to automatically identify each of the columns within dataset 804 as well as a corresponding column header and may provide a set of user interface selection elements to the user interface 805, where each user interface selection element corresponds to a respective column of the dataset 804. One of the columns ("Y") may be selected as the response variable by activating (e.g., highlighting, clicking) the corresponding user interface selection element and providing a following input (e.g., via clicking) to user interface control element 806 (e.g., while the user interface element is highlighted). The selected response variable 810 may then be displayed within a first user interface display element. Similarly, one or more of the columns (e.g., "Age", "Gender", "BMI", "BP", and "Total Cholesterol") may be selected as predictor variables by activating (e.g., highlighting, clicking) each of the corresponding user interface selection elements and providing a following input (e.g., via clicking) to user interface control element 808. The selected predictor variables 812 may be displayed within a second user interface display element. In the present example, the selected predictor variables may include age 812A, gender 812B, BMI 812C, BP 812D, and total cholesterol 812E. Upon selection of the predictor variables 812, the user interface 805 may update a user interface textual element 814 to indicate how many predictor variables 812 have been selected (e.g., how many have been added via user interface control element 808).

The user interface 805 may further enable configuration of additional configuration parameters. For instance, the user interface 805 may include a set of user interface selection elements for selecting a decision tree method 816 (e.g., bootstrap forest, predictor screening); a user interface input element for specifying a number of random uniform columns 818 to add to dataset 804; and a validation method 820 (e.g., in the case where bootstrap forest is selected). After configuration of the one or more configuration parameters occurs, activation of user interface control element 822 may transition user interface 805 from the user interface view of FIG. 8A to the user interface view of FIG. 8B.

The user interface view of FIG. 8B may include user interface textual elements configured to display information about the predictor strength assessment. For instance, the user interface 805 may display a first textual element 830 indicating a number of selected predictor variables 812 (e.g., selected via user interface control element 808); a second textual element 832 indicating a number of shadow columns to generate for the selected predictor variables 812 (e.g., a same number as the number of selected predictor variables 812); and a third textual element 834 indicator a total number of model predictors (e.g., the number of selected predictor variables 812 summed to the number of shadow columns). The user interface 805 may further display information about the response variable (e.g., an ID of the response variable) and/or an indication of a validation method or lack thereof.

Further, the user interface 805 may provide a set of user interface input elements 826 for specifying model-specific configuration parameters. For instance, in the case where bootstrap forest is selected as the decision tree method 816, the set of user interface input elements 826 may include one or more of a first user interface input element for configuring a number of decision trees per bootstrap forest, a second user interface input element for indicating a number of terms sampled per split event, a third user interface input element for indicating a bootstrap sample rate, a fourth user interface input element for indicating a minimum number of split events per decision tree, a fifth user interface input element for indicating a maximum number of split events per decision tree, or a sixth user interface input element for indicating a minimum size split.

Additionally, the user interface 805 may provide a user interface input element 824 for indicating a number of iterations (e.g., training runs) and a set of user interface selection elements 828 for selecting a type of shadow column parameter to use as a control for a one-way analysis (e.g., a Dunnett's test). For instance, the set of user interface selection elements 828 may include a first user interface selection element 828A for selecting a maximum shadow column parameter for the analysis, a second user interface selection element 828B for selecting a mean shadow column parameter for the analysis, and a third user interface selection element 828C for selecting a minimum shadow column parameter for the analysis. Upon configuration of one or more of the model-specific configuration parameters, the number of iterations, and/or the shadow column parameter, activation of user interface control element 836 may trigger the predictor strength assessment to run and may transition user interface 805 from the user interface view of FIG. 8B to the user interface view of FIG. 8C.

Without deviating from the scope of the present disclosure, the graphical user interface and the corresponding predictor strength assessment functionality may be implemented as an add-in (e.g., a plug-in) to an application (e.g., application 802). The term "add-in" may refer to a modular software extension that enhances or augments the native capabilities of an application by incorporating additional user interface components, processing functionality, or visualization elements.

As shown in FIG. 7, process 720 of method 700 may display, concurrently with the plurality of selectable objects, the initial set of predictor variables in a distinct graphical representation associated with one of the plurality of selectable objects currently selected in the graphical user interface. The term "graphical representation" may refer to a visual arrangement or layout rendered within the graphical user interface that presents data or metadata related to the predictor variables (and associated analysis) in a structured, interactive, and interpretable format. Such a representation may include, for example, a tabular display, bar graph, box plot, dot plot, line graph, or other data visualization configured to reflect results from a predictor strength assessment performed on the initial set of predictor variables. The graphical representation may be configured to visually display metrics related to the initial set of predictor variables such as portion values, predictor strength classifications, and/or comparison values. The graphical representation being associated with one of the plurality of selectable objects may refer to a condition in which a specific selectable object of the plurality has been activated or highlighted via user input. The initial set of predictor variables being displayed concurrently with the plurality of selectable objects may refer to the graphical user interface displaying the graphical user interface and the set of selectable objects at the same time.

Figure 8C:
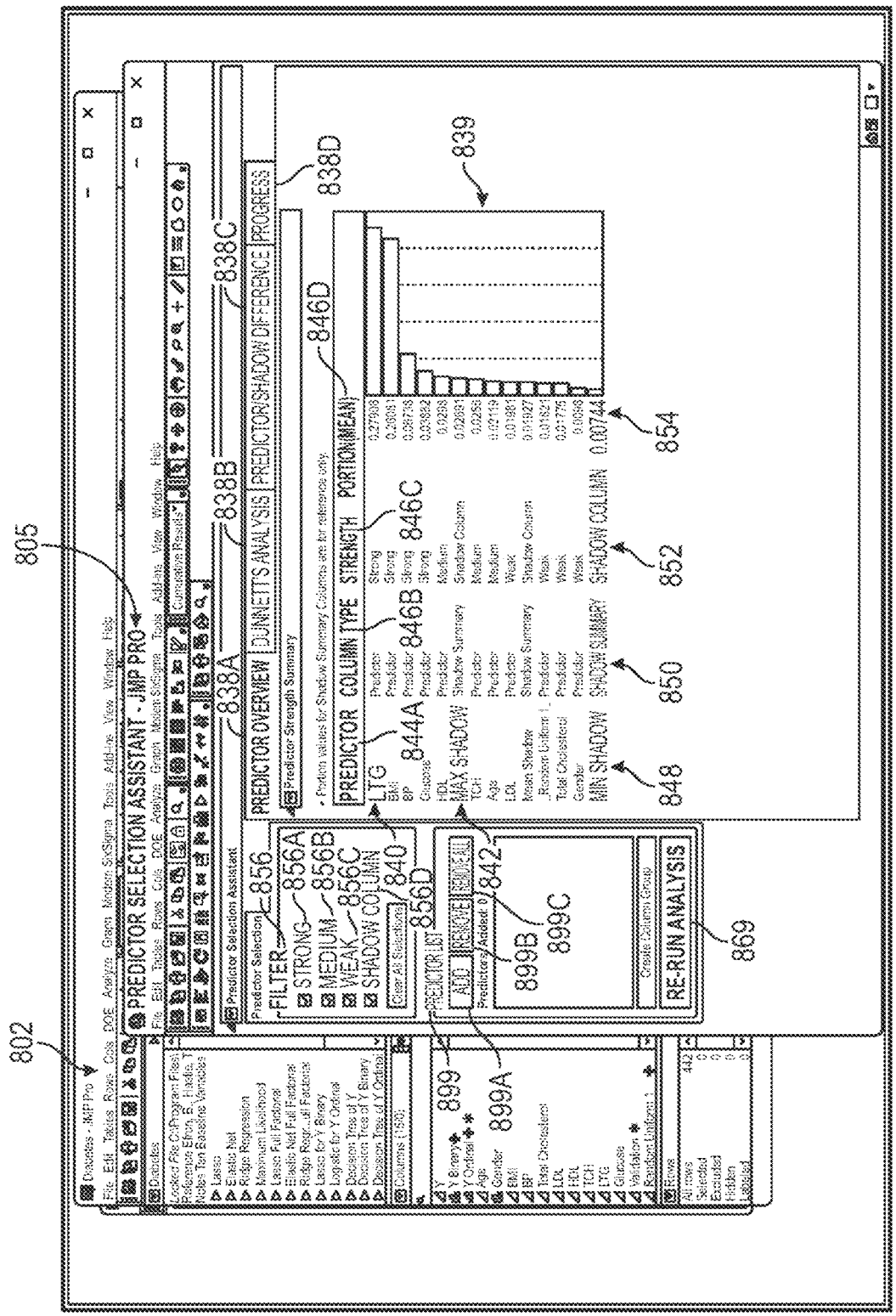

In a non-limiting example, as described with reference to FIGS. 8C through 8P, a user interface 805 may display a plurality of selectable objects that include first selectable object 838A, second selectable object 838B, third selectable object 838C, and fourth selectable object 838D. When the first selectable object 838A is activated (e.g., clicked, toggled), the user interface view of FIGS. 8C, 8D, 8G, 8H, and/or 8P may be generated. When the second selectable object 838B is activated (e.g., clicked, toggled), the user interface view of FIGS. 8E, 8F, and/or 8M may be generated. When the third selectable object 838C is activated (e.g., clicked, toggled), the user interface view of FIGS. 8I, 8J, and/or 8L may be generated. When the fourth selectable object 838D is activated (e.g., clicked, toggled), the user interface view of FIG. 8K, N, and/or 8O may be generated. Concurrently with displaying the plurality of selectable objects, the user interface 805 may display a distinct graphical representation associated with one of the plurality of selectable objects. For instance, graphical representation 839 may be linked to selectable object 838A, graphical representation 841 may be linked to selectable object 838B, graphical representation 882 may be linked to selectable object 838C, and graphical representation 888 may be linked to selectable object 838D.

It should be noted that a user input provided to the graphical user interface may enable a transition from a first selectable object of the plurality of selectable objects to a second selectable object of the plurality of selectable objects. In response to such user input, the graphical user interface may cease displaying the distinct graphical representation associated with the first selectable object and may begin display of a distinct graphical representation associated with the second selectable object. For instance, in a non-limiting example as described with reference to FIGS. 8C and 8E, if first selectable object 838A is initially selected and a user input (e.g., a click) is received that selects selectable object 838B, then the graphical user interface 805 may cease display distinct graphical representation 839 as depicted in FIG. 8C and may begin displaying distinct graphical representation 841 as depicted in FIG. 8E.

In some examples, the one of the plurality of selectable objects currently selected in the graphical user interface may correspond to a predictor overview selectable object, and the distinct graphical representation associated with the predictor overview selectable object may include a set of predictor strength rows and one or more shadow column rows corresponding to the initial set of predictor variables. The term "predictor overview selectable object" may refer to a selectable element in the graphical user interface (e.g., a tab or button) that, when selected, causes the graphical user interface to display a summary view of predictor strength assessment results. The term "predictor strength row" may refer to a visual row within a tabular or matrix-style display that presents predictor-specific metadata (e.g., a variable ID, a column type, a strength classification, a computed portion value) derived from the predictor strength assessment. The term "shadow column row" may refer to a similarly structured row corresponding to a shadow column associated with a predictor variable.

In a non-limiting example, as described with reference to FIGS. 8C and 8D, the corresponding user interface view may depict a summary view of predictor strength assessment results and may include a selectable object 838A, which may be an example of a predictor overview selectable object as described herein. The distinct graphical representation 839 associated with the selectable object 838A may include one or more predictor strength rows 840 and one or more shadow column rows 842. The distinct graphical representation 839 may include, for each predictor strength row 840 and each shadow column row 842, a corresponding variable ID 844A within a variable column 848, a corresponding column type 846B within a type column 850, a corresponding strength classification 846C within a strength column 852, and a corresponding portion value 846D (e.g., or a mean thereof) within a portion column 854. Generating the user interface view of FIGS. 8C and 8D may occur, for instance, by activating the user interface control element 822 of FIG. 8B or selecting selectable object 838A while another selectable object of the set of selectable objects is active.

Each variable ID 844A within the variable column 848 may be associated with a predictor variable within dataset 804 ("LTG, BMI, BP, Glucose, HDL, TCH, Age, LDL, Total Cholesterol, Gender), a generated random uniform column (_Random_Uniform_1, specified via user interface input element 818 of FIG. 18A), or a generated shadow column (e.g., Max Shadow corresponding to a max shadow parameter, Mean shadow corresponding to a mean shadow parameter, Min Shadow corresponding to a min shadow parameter). Each column type 846B within type column 850 may indicate whether the corresponding row is a predictor strength row 840 (e.g., "Predictor") or a shadow column row 842 (e.g., "Shadow Summary"). Each strength classification 846C within strength column 852 may indicate, for a predictor strength row 840, which predictor strength classification (e.g., Strong, Medium, Weak) was assigned to a corresponding predictor variable during the predictor strength assessment. For a shadow column row 842, the corresponding strength classification 846C may indicate that the corresponding row is a shadow column row 842 (e.g., "Shadow Column"). Each portion value 846D may indicate the portion value (e.g., or an aggregate thereof) computed during the predictor strength assessment.

In the present example, the one or more predictor strength rows 840 and the one or more shadow column rows 842 may be ordered in decreasing order according to their portion values. However, it should be noted that the one or more predictor strength rows 840 and the one or more shadow column rows 842 may be ordered according to their variable ID (e.g., in alphabetical order), their column type, or their strength classification without deviating from the scope of the present disclosure. The ordering may occur when a header for variable column 848, type column 850, strength column 852, or portion column 854 are selected. Additionally, it should be noted that the distinct graphical representation 839 may include a graphical plot (e.g., a bar graph) illustrating a proportion of the portion values for the one or more predictor strength rows 840 and/or shadow column rows 842 relative to each other.

In some examples, the one of the plurality of selectable objects currently selected in the graphical user interface may correspond to a one-way control-based selectable object, and the distinct graphical representation associated with the one-way control-based selectable object may display results of a one-way analysis between the initial set of predictor variables and a respective shadow column of the dataset. The term "one-way control-based selectable object" may refer to a selectable element in the graphical user interface (e.g., a tab or button) that, when selected, causes the graphical user interface to display a view illustrating a comparison a comparison between each predictor variable and a control variable (e.g., a shadow column).

The graphical representation may include a y-axis that displays a range of portion values and an x-axis that lists the evaluated set of predictor variables and the one or more shadow columns. Additionally, the graphical representation may include a set of box plot graphical markers that represent the distribution of portion values across decision tree models for each predictor variable and/or shadow column. Each box plot graphical marker may indicate a minimum portion value, a first quartile portion value (e.g., the 25th percentile), a second quartile portion value (e.g., the median or 50th percentile), a third quartile portion value (e.g., the 75th percentile), and a maximum portion value. The shadow column acting as the control variable may have an x-axis reference band spanning the defined quantile range along the y-axis for the shadow column (e.g., between the 25th and 75th percentile). In some examples, the reference band may span beyond the defined quantile range (e.g., may have a span equal to a 50th percentile value of the shadow column added or subtracted by a predefined constant).

In a non-limiting example, as described with reference to FIGS. 8E and 8F, the corresponding user interface view may depict the results of a one-way analysis (e.g., a Dunnett's Analysis) performed during the predictor strength assessment and may include a selectable object 838B, which may be an example of a one-way control-based selectable object as described herein. The graphical representation 841 may include a y-axis 860 (e.g., "Portion") that displays a range of portion values and an x-axis 862 (e.g., "Term") that lists the evaluated set of predictor variables and the one or more shadow columns (e.g., "LTG", "BMI", "BP", "Glucose", "HDL", "Max Shadow", "TCH", "Age", "LDL", "Mean Shadow", "_Random Uniform_1", "Total Cholesterol", "Gender" and "Min Shadow"). In some examples, the set of predictor variables and the one or more shadow columns may be ordered according to whichever predictor variable or shadow column has the highest maximum portion value, highest mean portion value, or highest minimum portion value.

Each of the set of predictor variables and the one or more shadow columns may have an associated boxplot marker indicating quantile information for the corresponding computed portion values. For instance, a first box plot marker 864A may be depicted in the graphical representation 841 for a first predictor variable ("LTG"), a second box plot marker 864B may be depicted in the graphical representation 841 for a second predictor variable ("BMI"), a third box plot marker 864C may be depicted in the graphical representation 841 for a third predictor variable ("BP"), a fourth box plot marker 864D may be depicted in the graphical representation 841 for a fourth predictor variable ("Glucose"), a fifth box plot marker 864E may be depicted in the graphical representation 841 for a fifth predictor variable (e.g., "HDL"), a sixth box plot marker 864F may be depicted in the graphical representation 841 for a first shadow column (e.g., "Max Shadow"), a seventh box plot marker 864G may be depicted in the graphical representation for a sixth predictor variable ("TCH"), an eighth box plot marker 864H may be depicted in the graphical representation for a seventh predictor variable ("Age"), a ninth box plot marker 864I may be depicted in the graphical representation for an eighth predictor variable ("LDL"), a tenth box plot marker 864J may be depicted in the graphical representation 841 for a second shadow column (e.g., "Mean Shadow"), an eleventh box plot marker 864K may be depicted in the graphical representation 841 for a ninth predictor variable (e.g., "_Random Uniform 1_"), a twelfth box plot marker 864L may be depicted in the graphical representation 841 for a tenth predictor variable ("Total Cholesterol"), a thirteenth box plot marker 864M may be depicted in the graphical representation 841 for an eleventh predictor variable ("Gender") and a fourteenth box plot marker 864N may be depicted in the graphical representation 841 for a third shadow column (e.g., "Min Shadow"). The graphical representation 841 may further have a reference band 866.

Each of the box-plot markers may be categorized according to their predictor strength classifications. Such categorization may be visually depicted by differentiating box-plot markers in different categories (e.g., different colors, shades, shapes, sizes). For instance, box-plot markers 864A, 864B, 864C, and 864D may be associated with predictor variables classified as "Strong" (e.g., having a mean portion value above reference band 866) and may accordingly have a first color 866B. Box-plot markers 864E, 864G, and 864H may have been associated with predictor variables classified as "Medium" (e.g., having a mean portion value within reference band 866) and may accordingly have a second color 866C. Box-plot markers 864I, 864K, 864L, and 864M may be associated with predictor variables classified as "Weak" (e.g., having a mean portion value below reference band 866) and may accordingly have a third color 866D. Box-plot markers 864F, 864J, and 864N may be associated with shadow columns and may accordingly have a fourth color 866E. Each of the box plot markers may have a corresponding box plot represented by portion 866A.

In some examples, the graphical user interface may include a filter selection panel including a set of selected filter options. In such examples, the distinct graphical representation may be updated based on filter adjustments received via the panel. The term "filter selection panel" may refer to an interactive user interface component that enables selective inclusion or exclusion of subsets of predictor variables from the display of the graphical user interface. The term "filter option" may refer to a selectable control or criterion that corresponds to a specific predictor category, such as a classification label (e.g., "Strong", "Medium", and "Weak"). The system or service providing the graphical user interface may be configured to receive one or more inputs via the filter selection panel, where each input may specify a modification to an active filter set (e.g., adding a first respective filter option associated with a first predictor category or removing a second respective filter option associated with a second predictor category). In response to receiving the one or more input, the system or service may update the graphical representation by ceasing display of predictor variables associated with the second predictor category and/or adding predictor variables associated with the first predictor category. Additionally, the system or service may rescale the distinct graphical representation based on ceasing the display of the predictor variables associated with the second predictor category.

In a non-limiting example, as described with reference to FIGS. 8E and 8F, the graphical user interface 805 may display a filter selection panel 856 including a set of selected filter options, such as first filter option 856A, second filter option 856B, third filter option 856C, and fourth filter option 856D. First filter option 856A may correspond to a first predictor category associated with a first predictor strength classification (e.g., "Strong"); second filter option 856B may correspond to a second predictor category associated with a second predictor strength classification (e.g., "Medium"); and third filter option 856C may correspond to a third predictor category associated with a third predictor strength classification (e.g., "Weak"). Fourth filter option 856D may correspond to a fourth predictor category associated with some or each of the shadow columns.

Figure 8D:
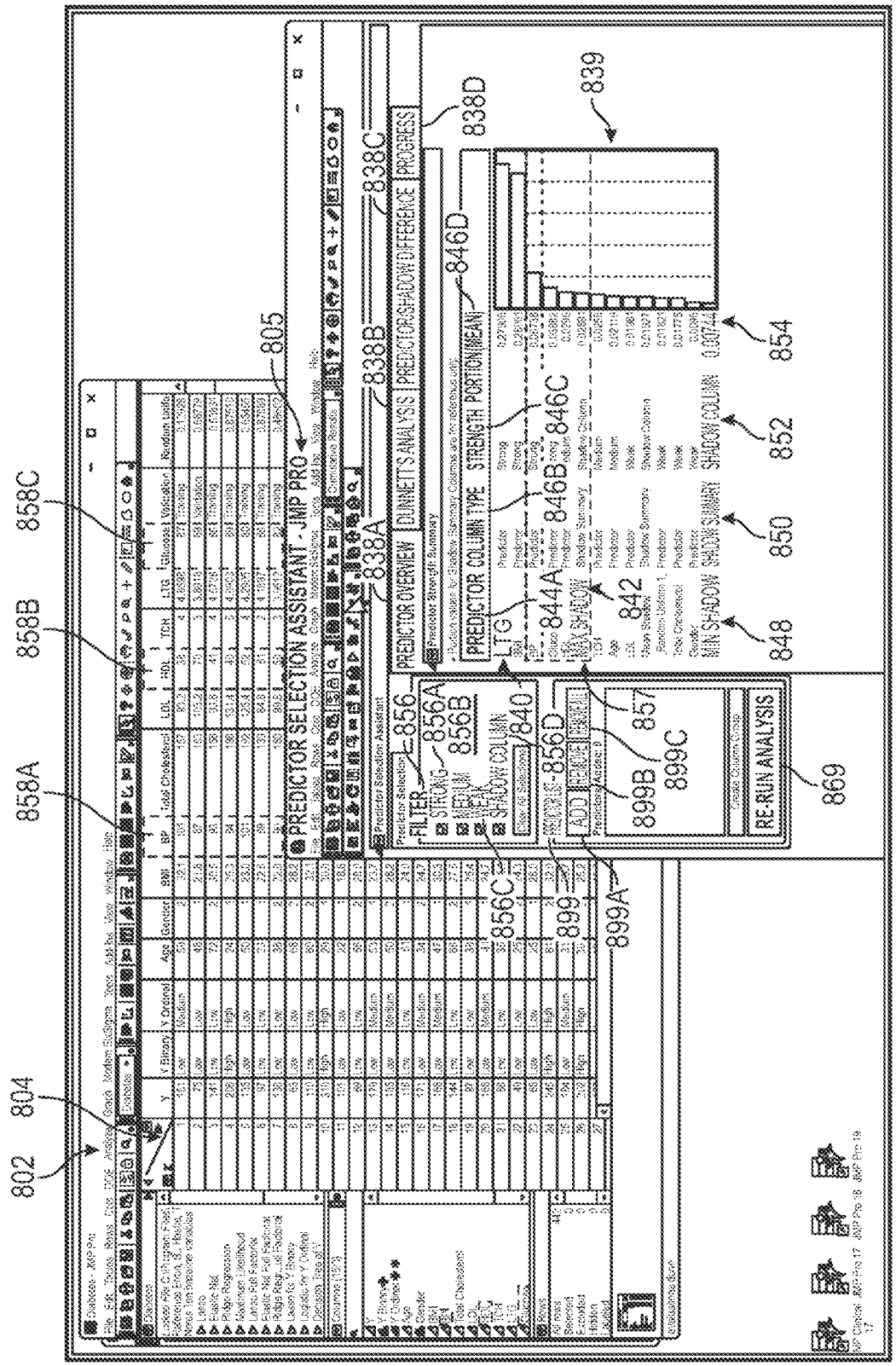
Figure 8E:
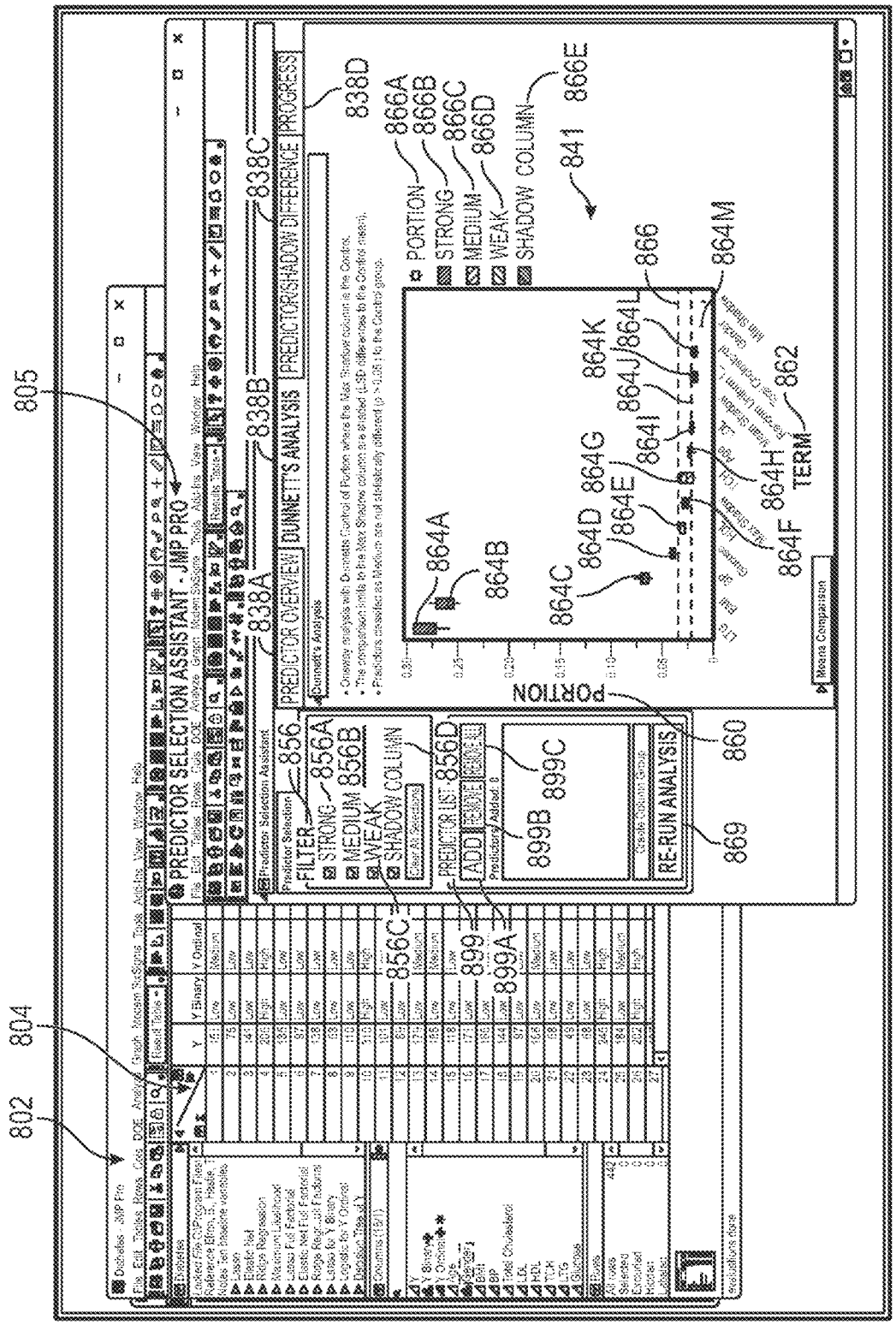
Figure 8F:
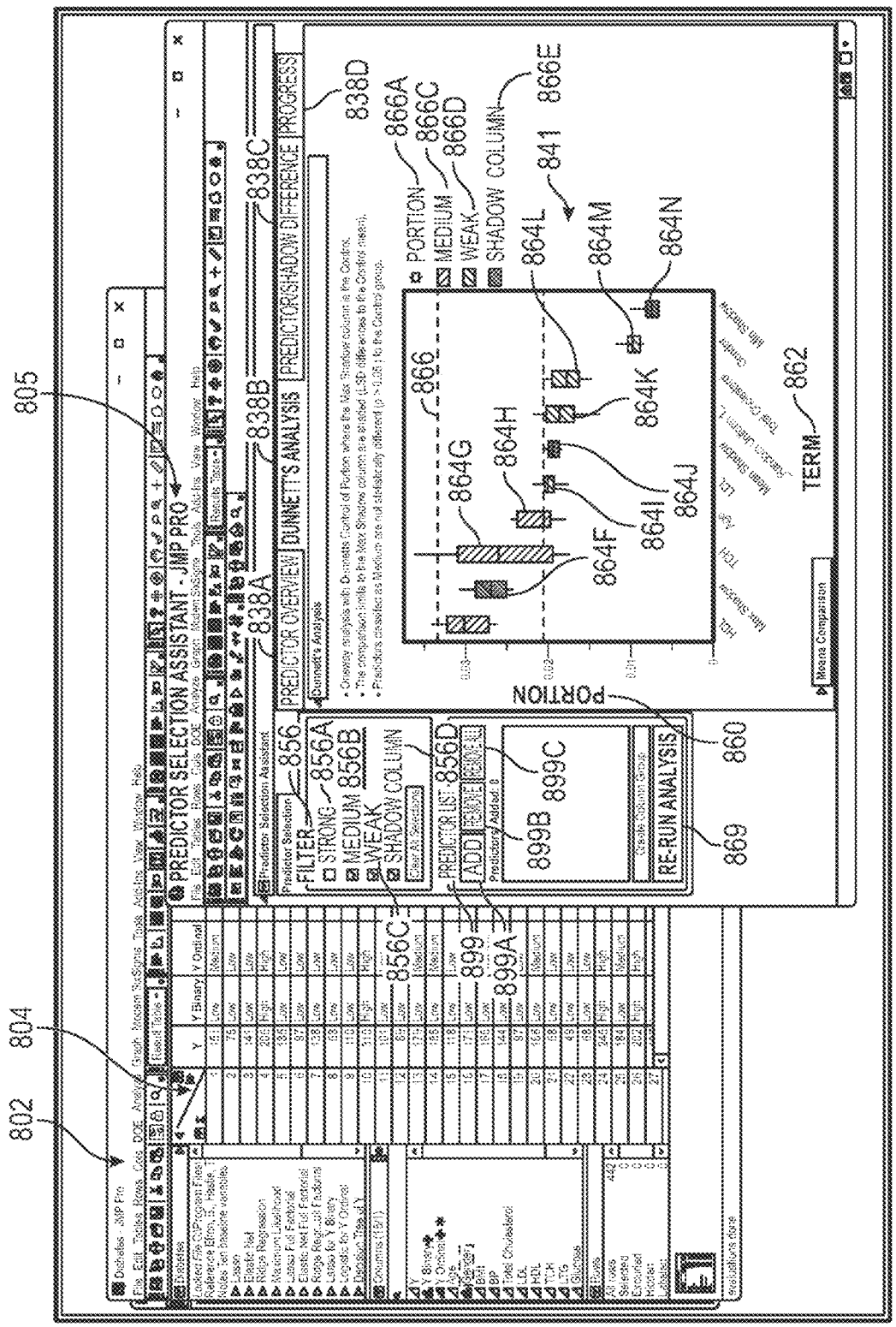

Initially, as depicted in FIG. 8F, only filter options 856B, 856C, and 856D may be activated. Accordingly, graph representation 841 may include box plot markers corresponding to the second predictor category, the third predictor category, and the fourth predictor category (e.g., box plot markers 864F through 864N), but may exclude box plot markers corresponding to the first predictor category (e.g., box plot markers 864A through 864E). Upon activating filter option 856A, graph representation 841 may be updated to include the box plot markers corresponding to the first predictor category and the graphical representation may be rescaled (e.g., broadened) in order to depict all of the box plot markers (e.g., the user interface view of FIG. 8F may transition to the user interface view of FIG. 8E). If filter option 856A is deactivated after being deactivated, graph representation 841 may be updated to exclude the box plot markers corresponding to the first predictor category and the graphical representation may be rescaled (e.g., narrowed) in order to depict only the box plot markers corresponding to the second through the fourth predictor categories. It should be noted that interacting with the filter panel may have similar effects on graphical representations associated with other selectable objects.

In some examples, the one of the plurality of selectable objects currently selected in the graphical user interface may correspond to a predictor-to-shadow difference selectable object, and the distinct graphical representation associated with the predictor-to-shadow difference selectable object may include a set of predictor variable-to-shadow comparison rows and a dot plot representing difference between the initial set of predictor variables and a set of shadow columns corresponding to those predictor variables. The term "predictor-to-shadow difference selectable object" may refer to a selectable element in the graphical user interface (e.g., a tab or button) that, when selected, causes the graphical user interface to display a view illustrating a comparison between each predictor variable and its corresponding shadow column.

Each predictor variable-to-shadow comparison row may represent a unique pairwise comparison between a predictor variable and its corresponding shadow column and may include one or more of a name or ID of a predictor variable, a name or ID of a corresponding shadow column, a strength classification (e.g., "Strong", "Medium", "Weak"), a significance score, or a difference value. The term "significance score" may refer to a numerical value derived from a statistical test (e.g., a t-test) that indicates whether a difference in portion values between a predictor variable and its corresponding shadow column is statistically significant (e.g., a p-value). The term "difference value" may refer to an absolute or signed difference between a portion value of predictor value and a portion value of its corresponding shadow column.

Figure 8G:
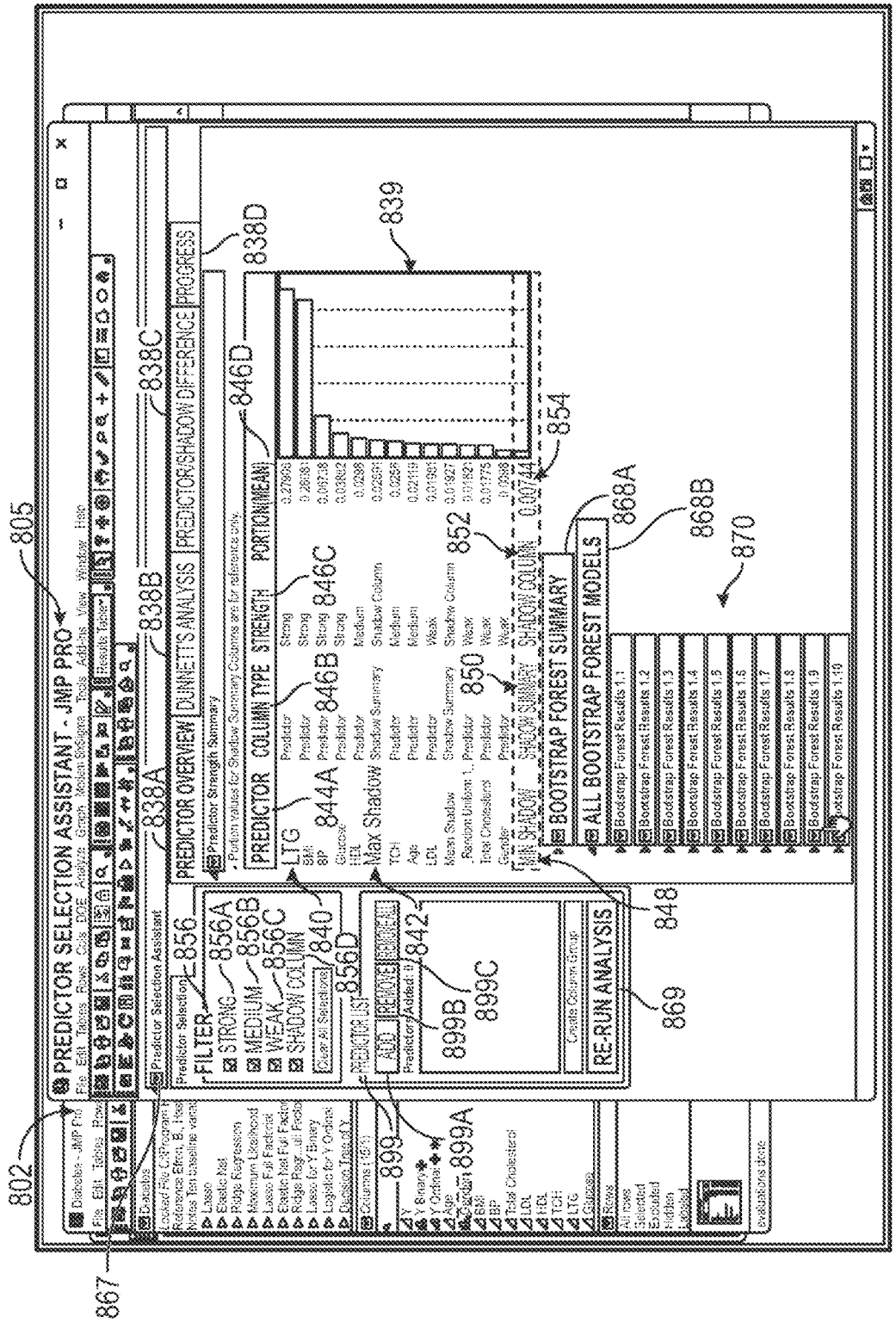
Figure 8H:
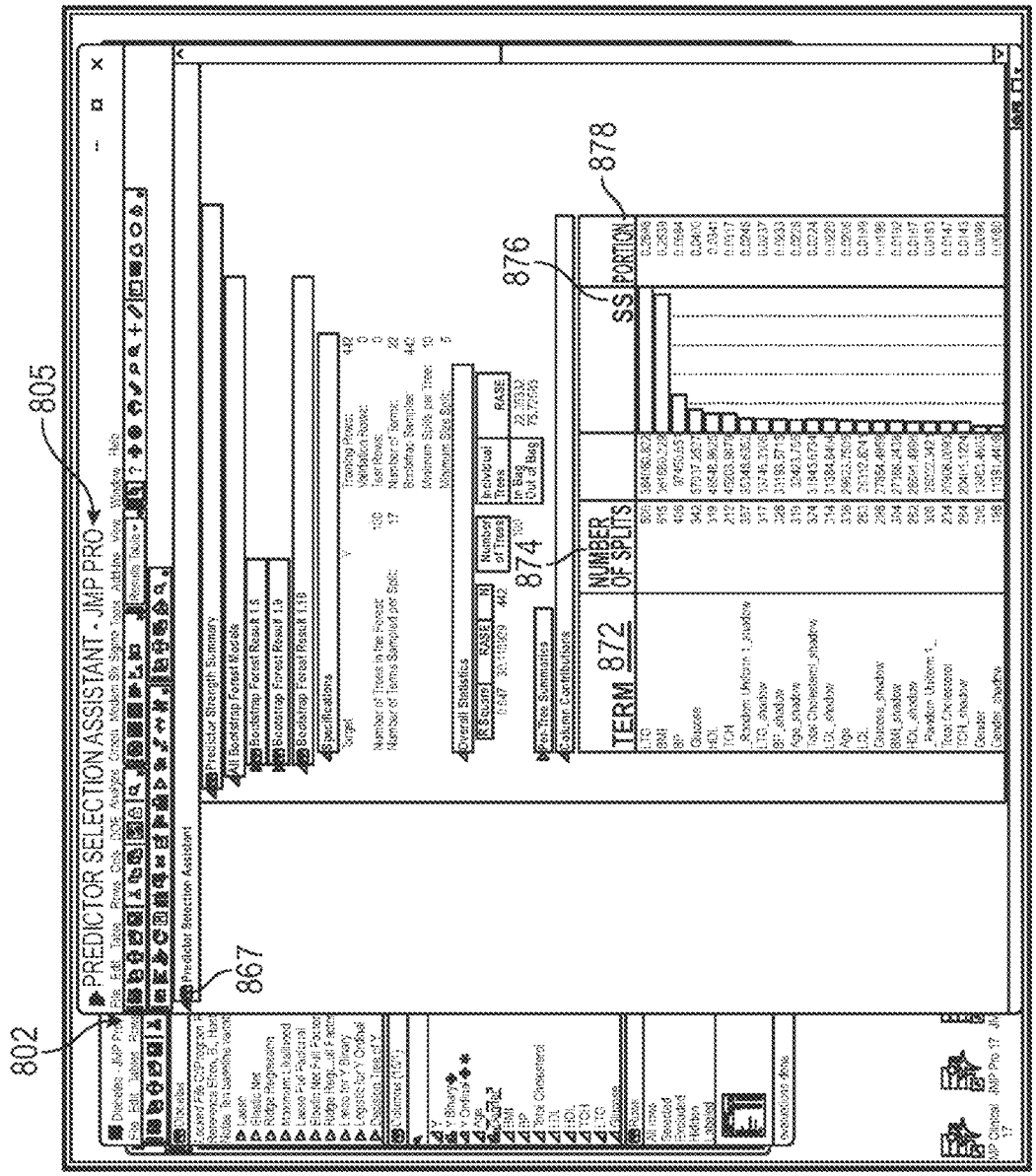
Figure 8I:
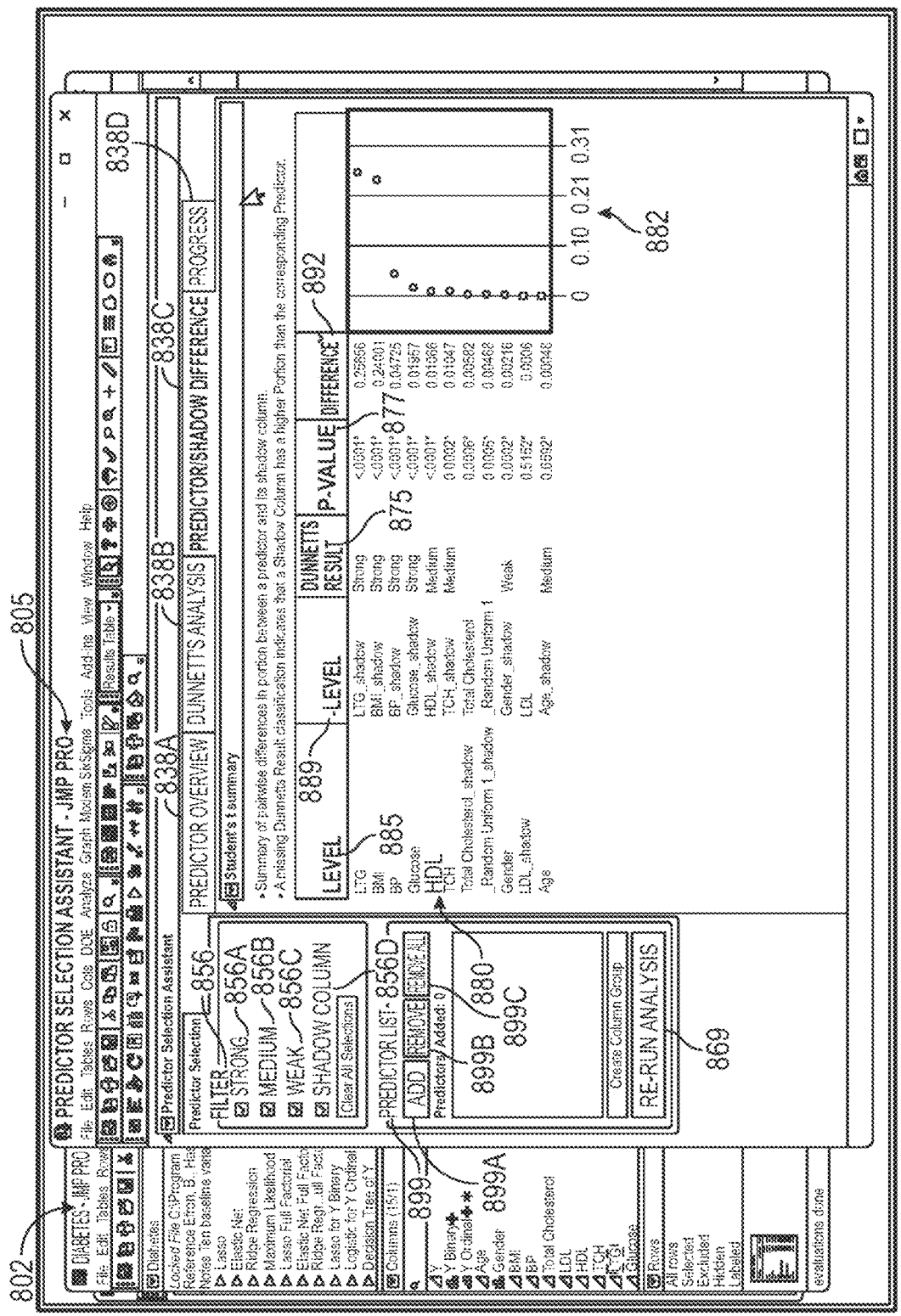

In a non-limiting example, as described with reference to FIG. 8I, the corresponding user interface view may depict the results of a predictor variable-to-shadow comparison (e.g., a Student's t-test) performed during the predictor strength assessment and may include a selectable object 838C, which may be an example of a predictor-to-shadow difference selectable object as described herein. The distinct graphical representation 882 may include a set of predictor variable-to-shadow comparison rows 880 and a dot plot representing a difference between predictor variables and their corresponding shadow column.

Each predictor variable-to-shadow comparison row 880 may include a name or ID of a predictor variable (e.g., "LTG", "BMI", "BP", "Glucose", "HDL", TCH", "Total Cholesterol", "_Random Uniform_1", "Gender", "LDL", and "Age") and a name or ID of a corresponding shadow column (e.g., "LTG_shadow", "BMI_shadow", "BP_shadow", "Glucose_shadow", "HDL_shadow", "TCH_shadow", "Total Cholesterol_shadow", "Random Uniform 1_shadow", "Gender_shadow", "LDL_shadow", and "Age_shadow"). One of the name or ID of the predictor variable and the name or ID of the corresponding shadow column may be indicated in column 885 (e.g., "Level") and the other may be indicated in column 889 (e.g., "-Level"). The name or ID indicated in column 885 may correspond to whichever of a predictor variable or a shadow column has a higher mean portion. For instance, if a predictor variable has a higher mean portion, it may be listed in column 885 and its shadow column may be listed in column 889. However, if the shadow column has a higher mean portion, it may be listed in column 885 and its predictor variable may be listed in in column 885. Each predictor variable-to-shadow comparison row 880 may further include a strength classification 875 (e.g., "Dunnetts Result"), a significance score 877 ("p-Value"), and a difference score 892 (e.g., "Difference").

Figure 8J:
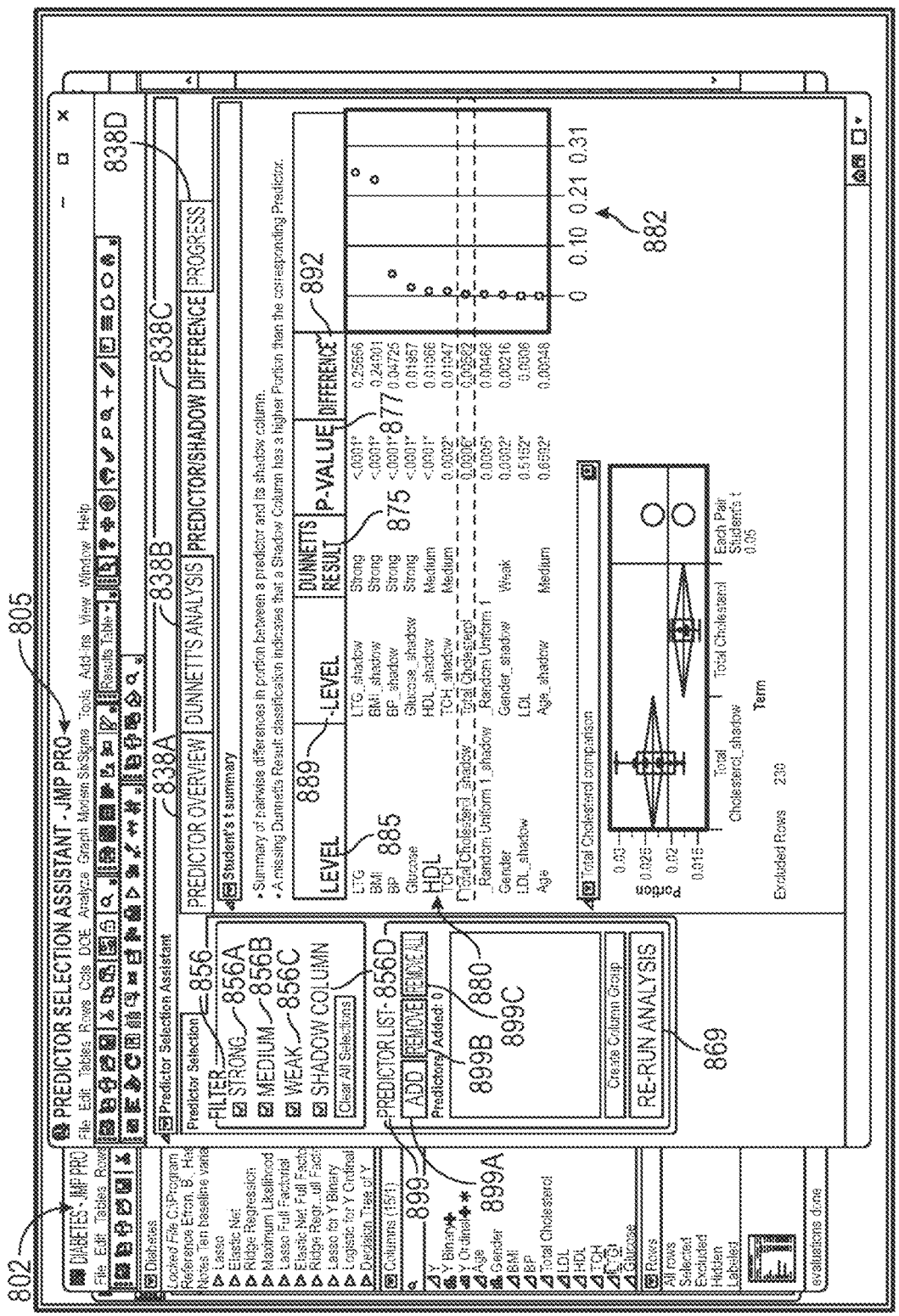

FIG. 8J may depict a non-limiting example of a comparison graph displayed in response to selection of a predictor variable-to-shadow comparison row 880. For instance, user input (e.g., clicking) may be provided to a predictor variable-to-shadow comparison row 880 and a comparison graph may be generated within graphical user interface 805 that displays a box plot marker for a predictor variable, a box plot marker for its corresponding shadow column, and plotted t-values for each of the predictor variable and its corresponding shadow column.

In some examples, the one of the plurality of selectable objects currently selected in the graphical user interface may correspond to a progress selectable object, and the distinct graphical representation associated with the progress selectable object may display a portion value of the initial set of predictor variables across a first number of training runs. The term "progress selectable object" may refer to a selectable element in the graphical user interface (e.g., a tab or button) that, when selected, causes the graphical user interface to display a view illustrating how predictor variable performance evolves over multiple iterations of model training (e.g., over multiple training runs). The graphical representation (e.g., which may also be referred to as a progress view) may, in some examples, be a time-series graph (e.g., a line graph) with an x-axis representing training iterations (e.g., or training runs) and a y-axis indicating portion values for individual predictor variables. The term "training runs" may refer to one or more repeated executions of a decision tree model.

In a non-limiting example, as described with reference to FIG. 8K, the corresponding user interface view may depict how predictor variable performance evolves over time with additional training runs and may include a selectable object 838D, which may be an example of a progress selectable object as described herein. The user interface view of FIG. 8K may include a graphical representation 888 in the form of a line graph with an x-axis representing training iterations and a y-axis indicating portion values for predictor variables. In the present example, the x-axis may illustrate that 10 training runs 886 (e.g., 10 training iterations) were performed over a single training round 884 corresponding to the initial set of predictor variables. Predictor variables with a first predictor strength classification (e.g., "Strong") may be depicted with lines 886A that have a first color or format; predictor variables with a second predictor strength classification (e.g., "Medium") may be depicted with lines 886B that have a second color or format; and predictor variables with a third predictor strength classification (e.g., "Weak") may be depicted with lines 886C that have a third color or format. Shadow columns may have their portion values illustrated with lines 886D that have a fourth color or format. It should be further noted that the In some examples, the plurality of selectable objects may correspond to a set of selectable tabs, where each tab is associated with a distinct analytical view. The one of the plurality of selectable objects currently selected may correspond to a respective selectable tab of the set of selectable tabs and the graphical user interface may include a set of tab containers associated with the set of selectable tabs. The term "selectable tab" may refer to an interactive user interface element that enables activation of a specific view within the graphical user interface. Each tab container may serve as a bounded visual region that includes content specific to the selected tab. For instance, a respective tab container associated with a selected tab may include a distinct graphical representation and one or more expandable sections configured to display data associated with the graphical representation.

In a non-limiting example, as described with reference to FIGS. 8C, 8G, and 8H, each of selectable objects 838A, 838B, 838C, and 838D may be an example of a selectable tab of a set of tabs. The graphical user interface 805 may include a respective tab container within which the distinct graphical representation is included (e.g., graphical representation 839 for selector object 838A). When user input is provided to user interface control element 867, a menu may be displayed that further user input may be used to generate expandable sections within the tab container, such as expandable sections 868A and 868B. Expandable section 868A may provide a bootstrap forest summary and expandable section 868B may provide information about each bootstrap forest model that was utilized (e.g., may include bootstrap forest result expandable sections 870).

Selecting a bootstrap forest result expandable section 870 may reveal additional expandable sections associated with the corresponding bootstrap forest result, where the additional expandable sections may include information related to specifications, statistical values (e.g., overall statistics), per-tree summaries, and/or column contributions. The additional expandable section corresponding to the specifications may include information about a target response variable, a number of trees in a bootstrap forest, a number of terms sampled per split, a number of training rows, a number of validation rows, a number of test rows, a number of terms, a number of bootstrap samples, a number of minimum splits per tree, a minimum split size, or a combination thereof. The additional expandable section corresponding to the overall statistics may include information related to a coefficient of determination (e.g., "RSquare"), a root average squared error (RASE) for the bootstrap forest model, a number of bootstrap samples (e.g., "N"), a number of trees in the bootstrap forest, a RASE value for in Bag bootstrap trees, and a RASE value for Out of Bag bootstrap trees. The additional expandable section corresponding to the column contributions may include a set of rows, where each row corresponds to a respective predictor variable or its associated shadow column. Each row may include a variable ID 872 related to a predictor variable or its associated shadow column (e.g., "Term") as well as a number of event splits 874, a significance score 876, and a portion value 878 (e.g., a mean portion value) associated with the predictor variable or shadow column indicated by the variable ID 872.

As shown in FIG. 7, process 730 of method 700 may receive, via the graphical user interface, a plurality of inputs while the initial set of predictor variables are being displayed in the distinct graphical representation. The term "plurality of inputs" may refer to a set of user inputs submitted through the graphical user interface and may include one or more of mouse clicks, keyboard entries, touch gestures, or voice commands. Such inputs may enable selection of a subset of predictor variables for a repeated predictor strength assessment and may include actions related to selection and confirmation of the subset and/or to a request to rerun the predictor strength assessment for the selected subset. The inputs may be processed in real time while the graphical representation for the initial set of predictor variables is displayed (e.g., the graphical representation may only be updated once user input requesting the rerunning of the predictor strength assessment is received).

As shown in FIG. 7, sub-process 730A of process 730 may include the plurality of inputs selecting a subset of the initial set of predictor variables at the distinct graphical representation. The selection may be performed within the graphical representation rendered in the graphical user interface. For instance, a set of user inputs (e.g., clicks) may be provided to a subset of predictor strength rows to mark these rows as selected. In a non-limiting example, as described with reference to FIGS. 8I and 8L, user input may be applied (e.g., via cursor 891) to predictor variable-to-shadow comparison rows 880, resulting in selected rows 890 corresponding to a subset of the initial set of predictor variables (e.g., "LTG", "BMI"). It should be noted that similar techniques may be performed to select the subset via predictor strength rows 840 (e.g., as depicted in FIG. 8C) or via interaction with any of box plot markers 864A through 864N.

In some examples, sub-process 730A of process 730 may include visually highlighting the corresponding columns in the dataset in response to selection of predictor variables within the graphical representation. In such examples, the graphical user interface may concurrently display the dataset along with the distinct graphical representation associated with the currently selected selectable object. Alternatively, without deviating from the scope of the present disclosure, the dataset may be displayed in a separate window from the graphical user interface.

In a non-limiting example, as depicted in FIG. 8D, providing user input to the predictor strength rows 840 and shadow column rows 842 (e.g., via clicking) may trigger the corresponding columns within dataset 804 to be highlighted. For instance, after providing user input to predictor strength rows 840 associated with a first predictor variable (e.g., "BP"), a second predictor variable (e.g., "Glucose"), and a third predictor variable (e.g., "HDL"), columns 858A, 858C, and 858B, respectively, may be highlighted within application 802. Additionally, the selected predictor strength rows 840 may be highlighted and displayed as highlighted rows 857. Similarly, a shadow column may be highlighted in the application 802 after user input is provided to a corresponding shadow row 842. Additionally, the shadow row 842 may be highlighted and displayed as a highlighted row 857.

As shown in FIG. 7, sub-process 730B of process 730 may include the plurality of inputs adding the subset of the initial set of predictor variables to a predictor selection list maintained in the graphical user interface. The term "predictor selection list" may refer to a data structure (e.g., visualized within the graphical user interface) that stores references to predictor variables selected via sub-process 730A. The predictor selection list may be displayed as a panel, column, or section of the graphical user interface. Adding the subset of the initial set of predictor variables to the predictor selection list may include, upon selecting the subset of the initial set of predictor variables, providing user input to a user interface control element of the graphical user interface that triggers an updating of the predictor selection list. In a non-limiting example, as described with reference to FIGS. 8C and 8L, upon selected rows 890 being identified, user input may be provided (e.g., via cursor 891) to a user interface control element 899A within a predictor list panel 899 that adds references to the predictor variables associated with the selected rows 890 to the predictor selection list 887. The predictor selection list 887 may display textual elements including an ID of each added predictor variable. It should be noted that additional user input may be provided to remove a predictor variable (e.g., via user interface control element 899B) or to remove all the predictor variables (e.g., via user interface control element 899C) from the predictor selection list 887.

As shown in FIG. 7, sub-process 730C of process 730 may include the plurality of inputs initiating a predictor strength assessment for the subset of the initial set of predictor variables added to the predictor selection list. Initiating the predictor strength assessment may refer to triggering a computational procedure that evaluates the selected subset of predictor variables for their relative contribution or importance (e.g., their predictor strength) with respect to a designated response variable. To initiate the predictor strength assessment, user input may be provided to a user interface control element that requests initiation of the predictor strength assessment for the subset of the initial set of predictor variables. Performing the strength assessment for the subset of the initial set of predictor variables may include generating updated shadow columns corresponding to the selected subset, training one or more decision tree models using the selected predictor variables and associated shadow columns, and computing portion values and classification metrics as described herein. In a non-limiting example as described with reference to FIGS. 8L and 8M, user input may be provided (e.g., via cursor 891) to a user interface control element 869 that triggers initiation of the predictor strength assessment for the subset of predictor variables indicated by the predictor selection list 887.

In some examples, the graphical user interface may facilitate automatic reconfiguration of the predictor strength assessment based on the subset of predictor variables selected and added to the predictor selection list. For instance, upon receiving user input to initiate the re-execution (e.g., at step 730C), the system may automatically retrieve previously defined configuration parameters (e.g., a type of decision tree model, hyperparameter values, a number of training runs, shadow column settings) and apply these parameters to the selected subset without requesting re-configuration by a user. Further, user interaction with visual elements of the predictor strength assessment (e.g., box plot elements, dot plot elements, rows of corresponding tables) may transmit predictor variable selections to a data management layer that may automatically perform reloading of corresponding predictor columns from the dataset. By automating these portions of the re-execution process, the system may reduce processing latency, eliminate redundant user input, and improve utilization of system resources. Further, such automatic interaction between the graphical representation and the dataset may yield technical improvements to the computing environment, including one or more of decreased processor load, reduced graphical interface refresh cycles, or extended battery life (e.g., in portable computing systems).

As shown in FIG. 7, process 740 of method 700 may update, in response to receiving the plurality of inputs, the distinct graphical representation and one or more other distinct graphical representations associated with the plurality of selectable objects based on the predictor strength assessment for the subset of the initial set of predictor variables. Updating the distinct graphical representation may include modifying a currently visible analytical view (e.g., a graph or a table) to reflect newly computed portion values, strength classifications, or significance scores resulting from the predictor strength assessment on the subset of the initial set of predictor variables. Updating the one or more other distinct graphical representations may include refreshing additional views (e.g., those associated with other selectable objects other than the currently selected one).

Figure 8K:
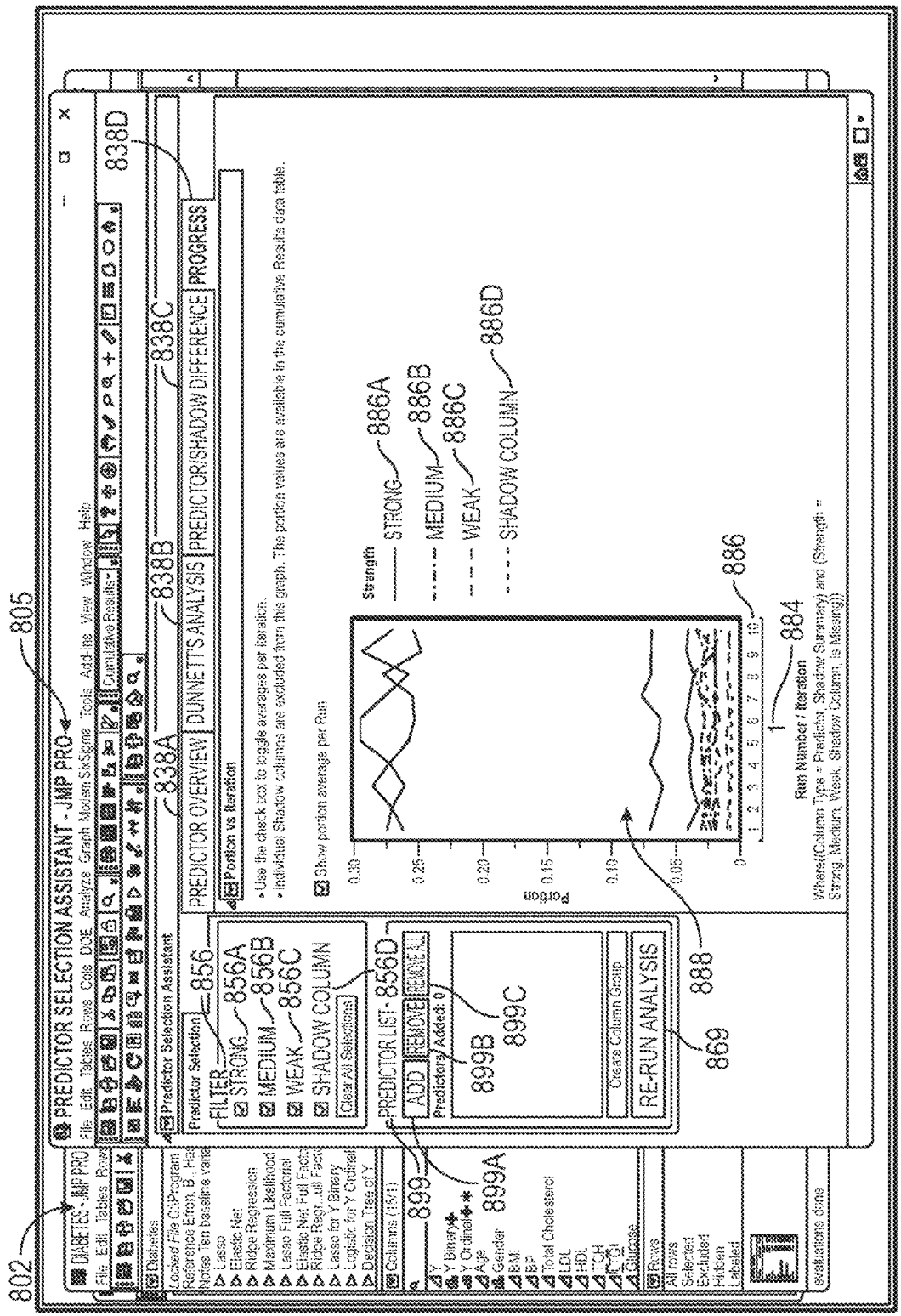
Figure 8L:
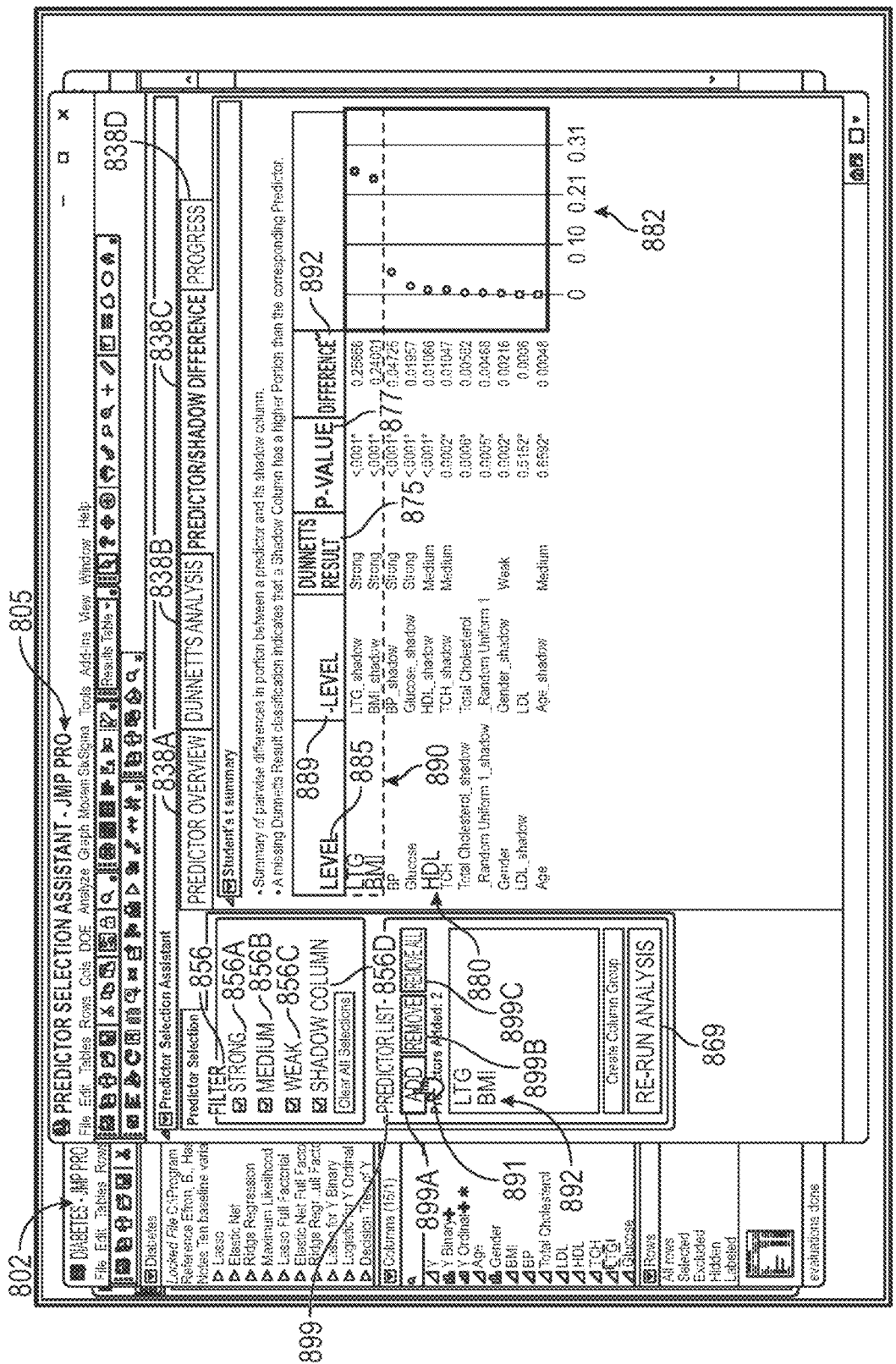
Figure 8M:
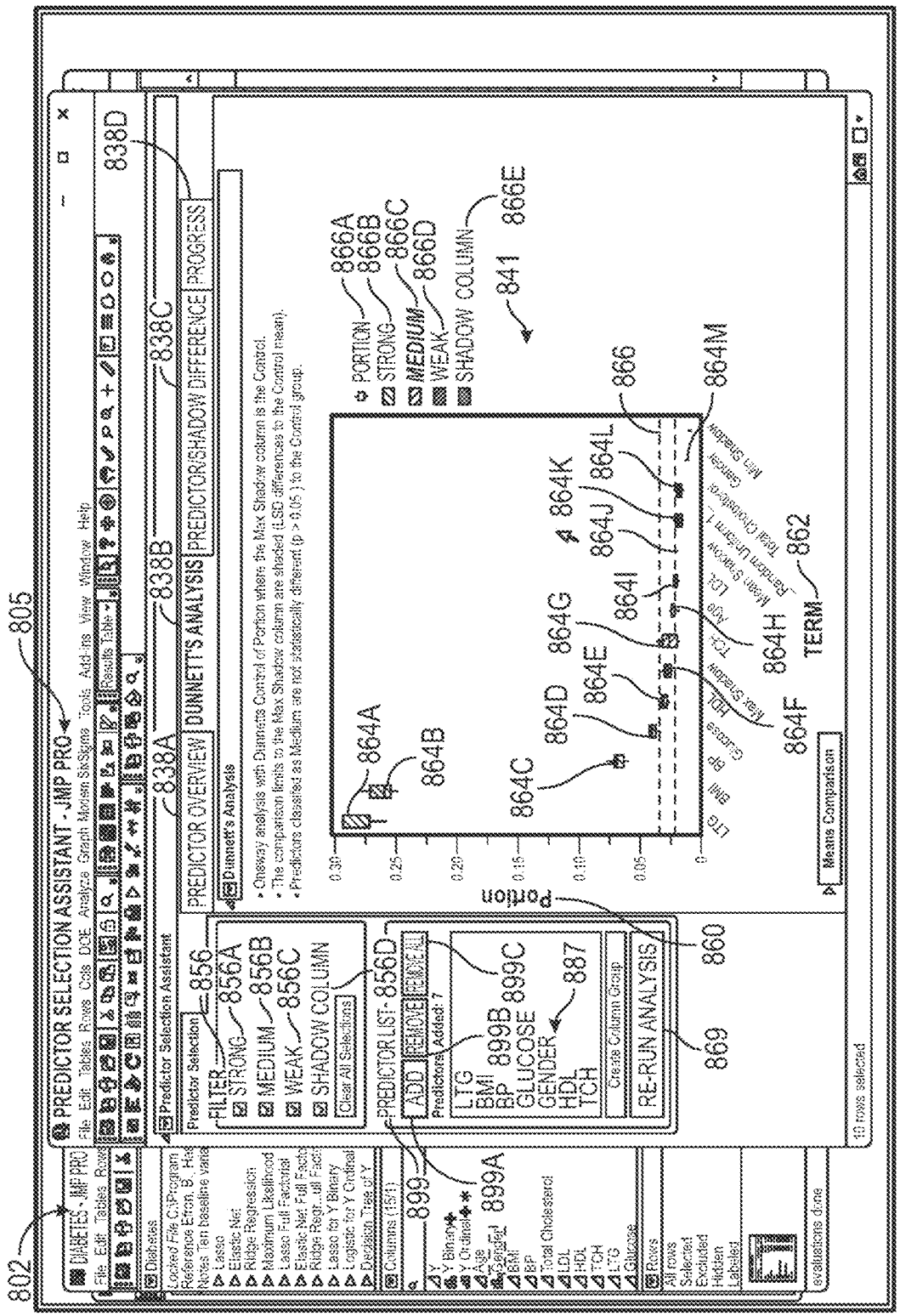
Figure 8N:
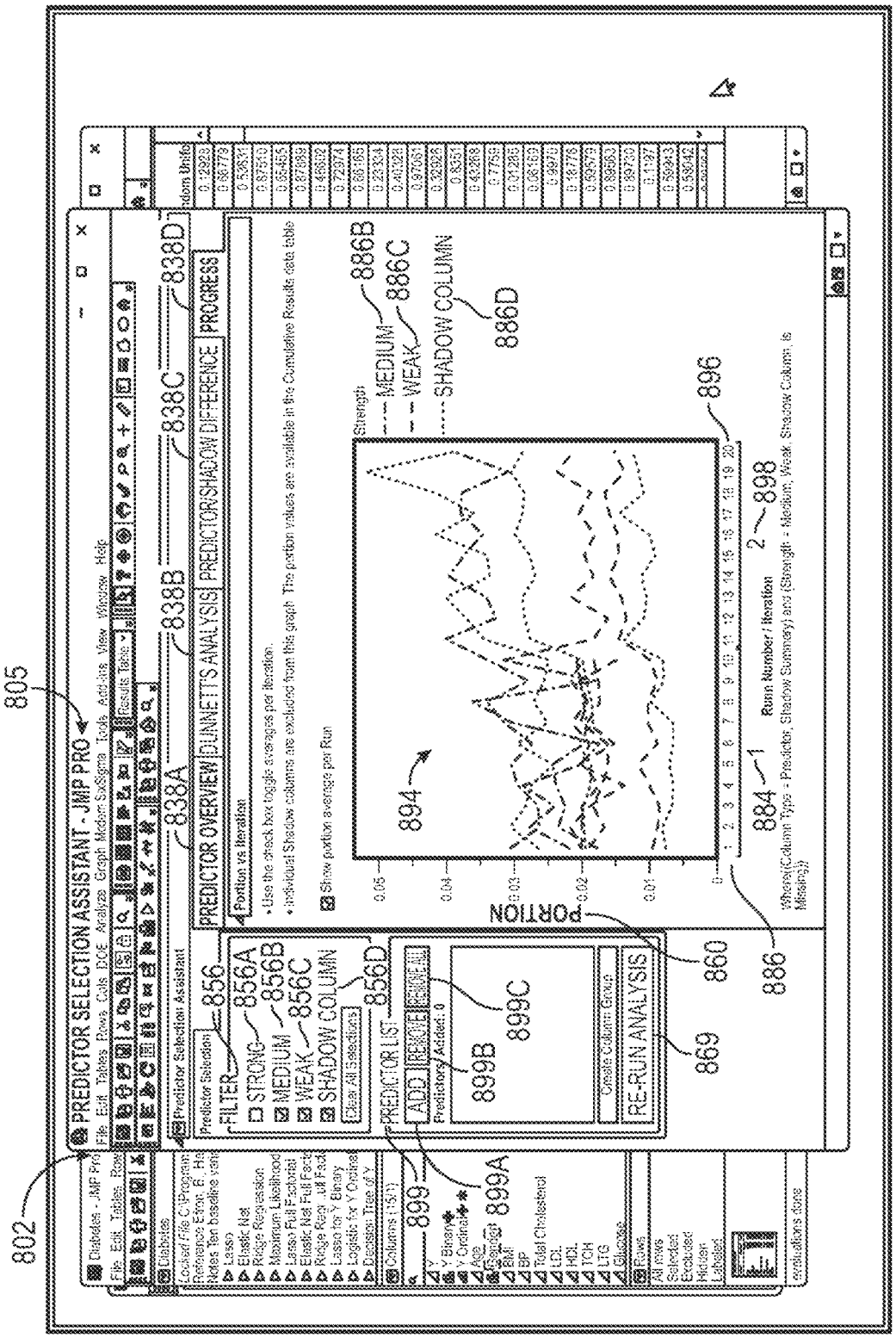
Figure 8O:
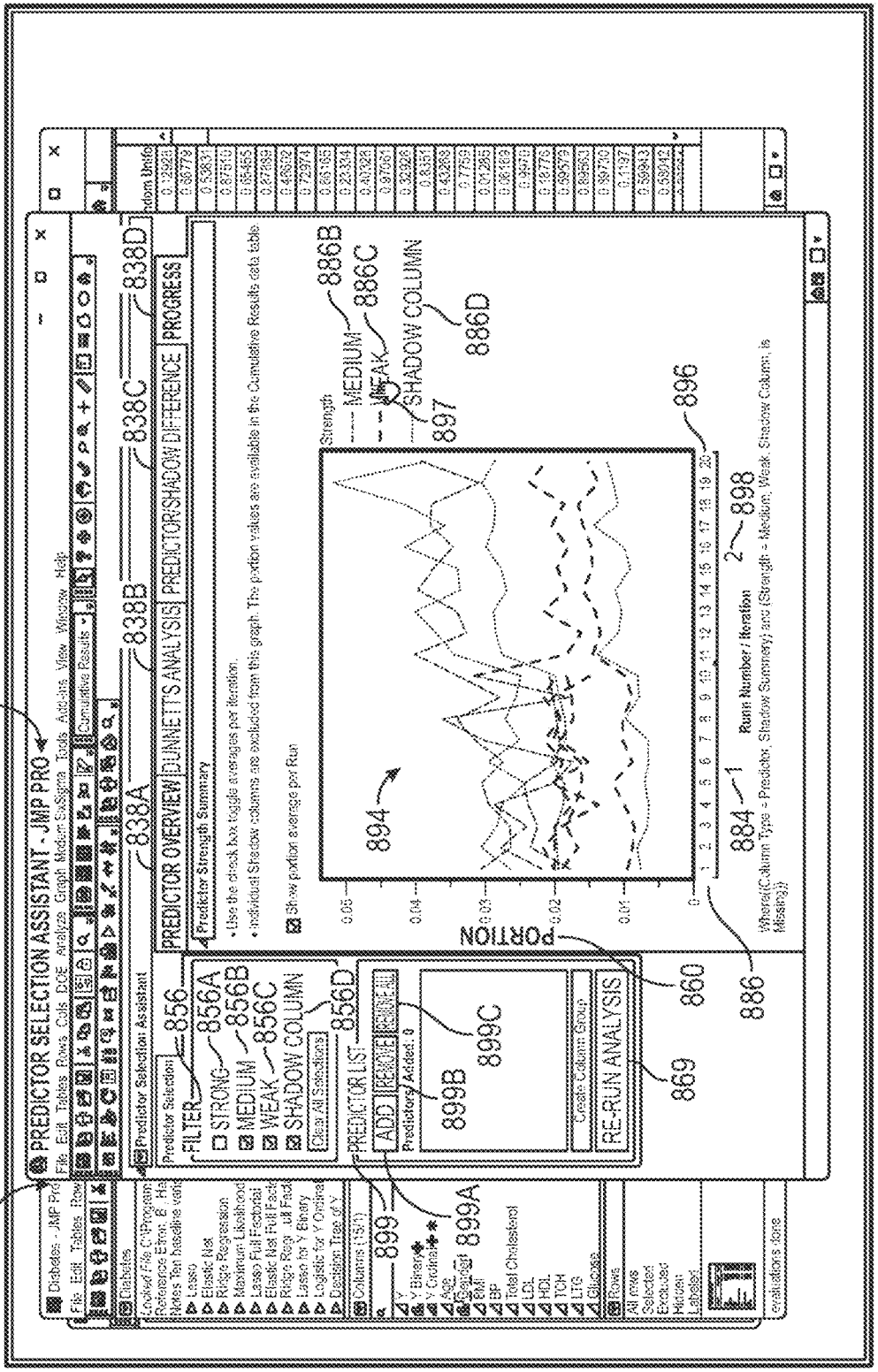
Figure 8P:
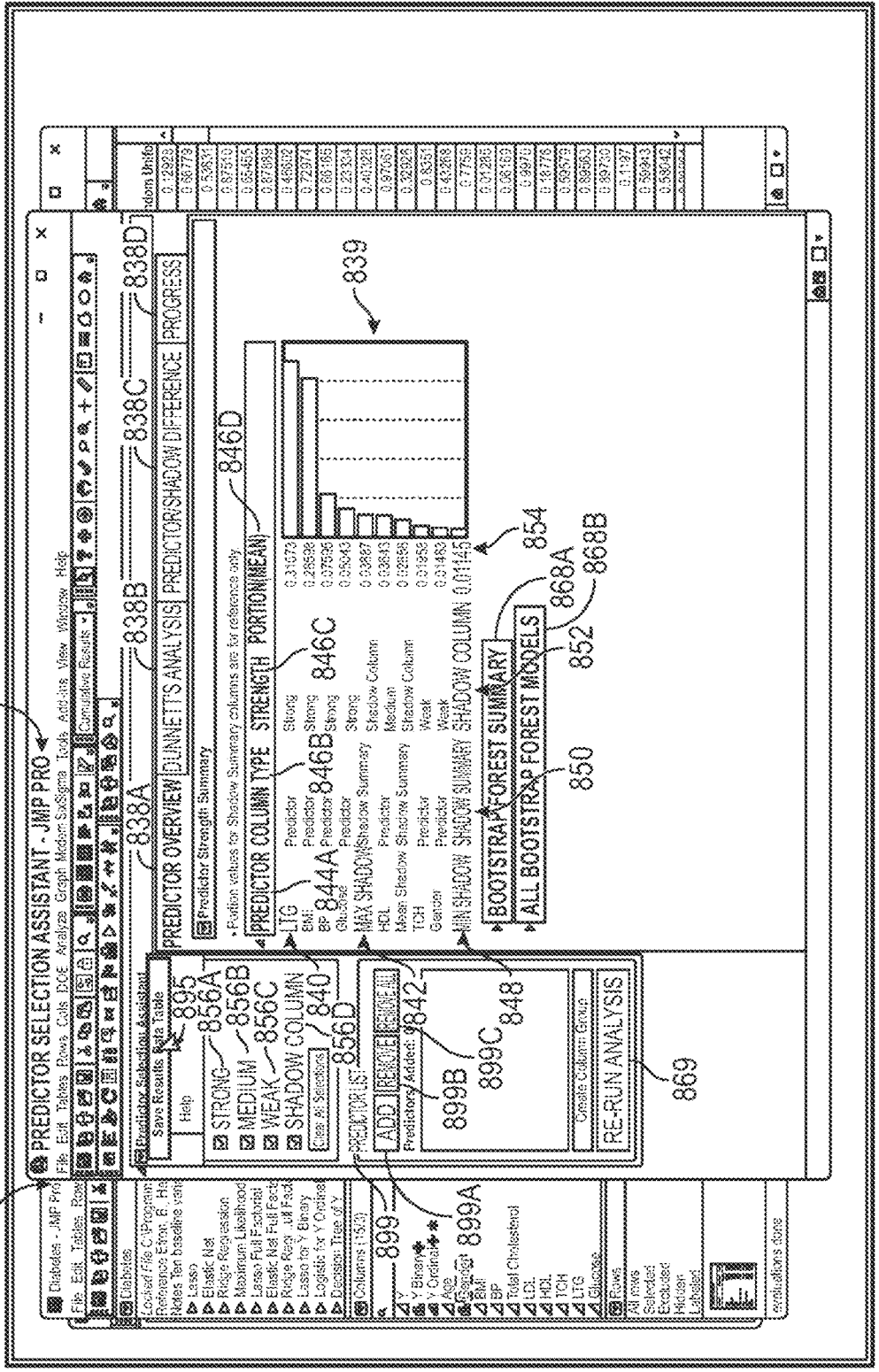

In a non-limiting example, FIG. 8P may depict a resulting user interface view after executing a predictor strength assessment on the subset of the initial set of predictor assessment variables indicated in the predictor selection list 887 of FIG. 8M. After re-executing the predictor strength assessment for the subset of the set of initial predictor variables, the distinct graphical representation 839 of FIG. 8C may be updated according to the form depicted in FIG. 8P. The distinct graphical representation of FIG. 8P may have fewer predictor strength rows 840 as compared to FIG. 8C (e.g., due to variable predictors corresponding to "Age" and "Total Cholesterol" having been filtered out). The variable IDs 844A and column type 846B may remain unchanged for each of the subset of the set of initial predictor variables. However, the portion value 846D for each predictor variable of the subset may differ and the strength classification 846C may also potentially differ (e.g., due to considering a different number of predictor variables when performing the model training). It should be noted that there may be examples where the variable IDs 844A may change between initial execution and re-execution of the predictor strength assessment without deviating from the scope of the present disclosure.

Figure 8Q:
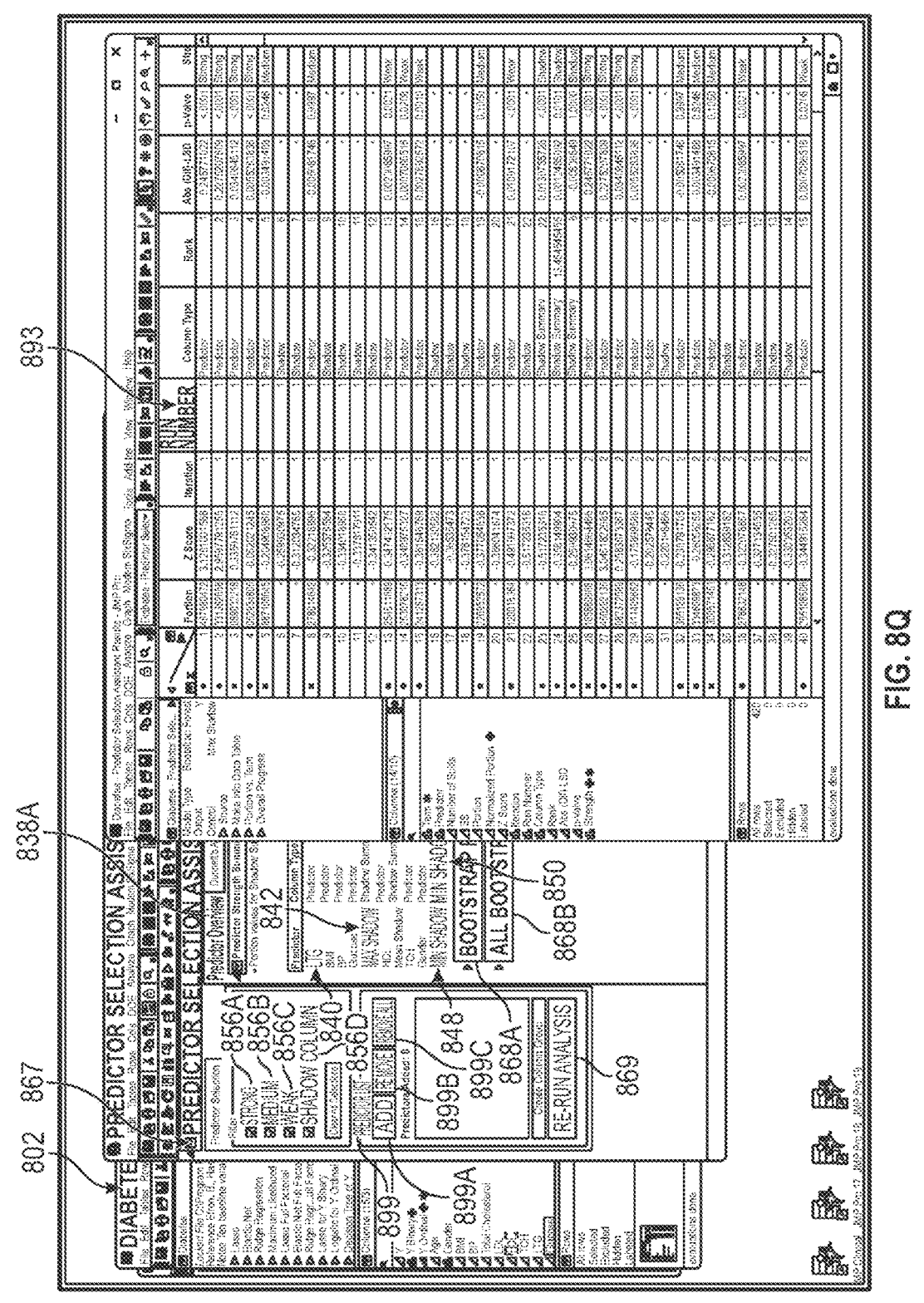

In some examples, user input provided to the graphical user interface 805 (e.g., to user interface control element 895 as depicted in FIG. 8P) may enable results of executing and/or re-executing a strength predictor assessment to a digital artifact (e.g., a data table). An example of such a digital artifact 893 may be depicted with reference to FIG. 8Q. The digital artifact 893 may include information related to predictor variables, their portion values (e.g., mean portion values), their column type, and their strength classifications. It should be noted that there may be examples where digital artifact 893 includes information about predictor variables per iteration or per round of training runs (e.g., may provide portion values, column type, strength classification information for the initial set of predictor variables trained in a first round of training runs and the subset of predictor variables trained in a second round of training runs). The digital artifact 893 may further include information such as a Z-score, an iteration number, a run number, a training round number, a rank (e.g., which predictor variable has the highest portion value), or a p-value, among other information. It should be noted that information about shadow columns may be included as well.

In some examples, updating the distinct graphical representation and/or the one or more other distinct graphical representations may include updating the progress view associated with the progress selectable object. For instance, a first number of training runs may be performed for the initial set of predictor variables and, after initiating the predictor strength assessment for the second set of predictor variables, a second set of training runs performed for the subset of the initial set of predictor variables. The newly computed portions values for the second set of training runs may be added to the progress view.

Each predictor variable in the progress view may be represented by a corresponding trend line. A first portion of the trend line for each predictor variable may correspond to the first number of training runs and a second, later portion of the trend line may correspond to the second number of training runs. In some examples, the first and second portions of each trend line may be visually distinguished using different colors, styles, or formats to indicate changes in predictor strength classification over time. For example, a first portion of a trend line may be rendered in a first color to indicate a "Strong" classification, while a second portion may switch to a second color to indicate a switch to a "Medium" classification. If a predictor variable from the initial set is not included in the subset, the respective trend line, when updated, may appear truncated over the second number of training runs.

In a non-limiting example, FIG. 8K may depict a progress view prior to execution of the predictor strength assessment for the subset of the set of initial predictor variables and FIGS. 8N and 8O may represent the progress view after execution of the predictor strength assessment (e.g., graphical representation 888 may be updated to become graphical representation 894). Graphical representation 894 may depict a first training round 884 and a second training round 898, where the first training round 884 may include training runs 886 (e.g., training runs 1 through 10) and second training round 898 may include training runs 896 (e.g., training runs 11 through 20). It should be noted that graphical representation 894 of FIGS. 8N and 8O may be filtered (e.g., via the filter panel) to show trend lines for only a portion of the subset of predictor variables (e.g., those with a strength classification of "Medium" or "Weak" or that are a "Shadow Column"), whereas the graphical representation 888 of FIG. 8K may depict trend lines for all predictor variables of the initial set of predictor variables.

In some examples, the distinct graphical representation may include a set of predictor strength legend items and a set of graphical elements corresponding to the initial set of predictor variables. The term "predictor strength legend item" may refer to a visual indicator displayed within a graphical user interface that represents a specific strength classification (e.g., "Strong", "Medium", "Weak"). The term "graphical element" may refer to a visual object (e.g., a row, a dot, a bar, a line) that represents data associated with a predictor variable. In examples in which the graphical representation includes the set of predictor strength legend items and the set of graphical elements, the system or service implementing method 700, upon receiving a user input selecting a respective predictor strength legend item, may visually emphasize a subset of the initial set of predictor variables that correspond to the selected predictor strength legend item and may visually de-emphasize the remainder of the predictor variables. Visual emphasis may include increasing the contrast, saturation, brightness, or scale of the associated graphical elements, while de-emphasis may include reducing opacity, graying out, or filtering non-matching elements from the display.

In a non-limiting example, FIG. 8O may depict an example of a progress view in which a predictor strength legend item (e.g., predictor strength legend item 897, corresponding to a "Weak" predictor strength categorization) has received a user input. The graphical elements corresponding to the predictor strength legend item (e.g., trends lines for any predictor variable with a "Weak" predictor strength categorization) may be emphasized and any graphical elements associated with other predictor strength legend items (e.g., trend lines associated with a "Shadow Column" or a "Medium" predictor strength categorization) may be de-emphasized.

Figure 9A:
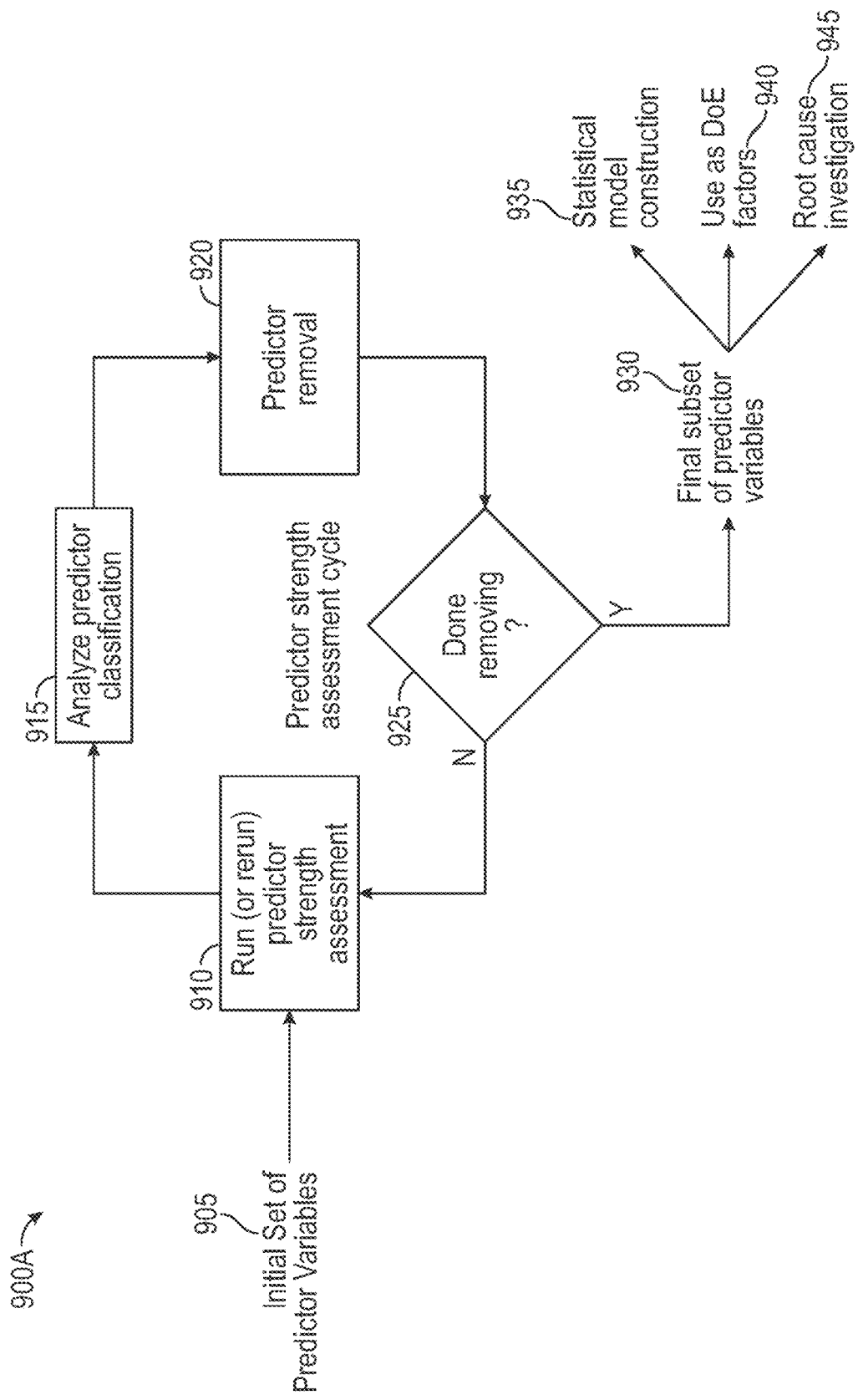
FIG. 9A illustrates an example predictor strength assessment procedure for enabling interactive predictor strength assessment and refinement according to at least one embodiment of the present technology.
Figure 9B:
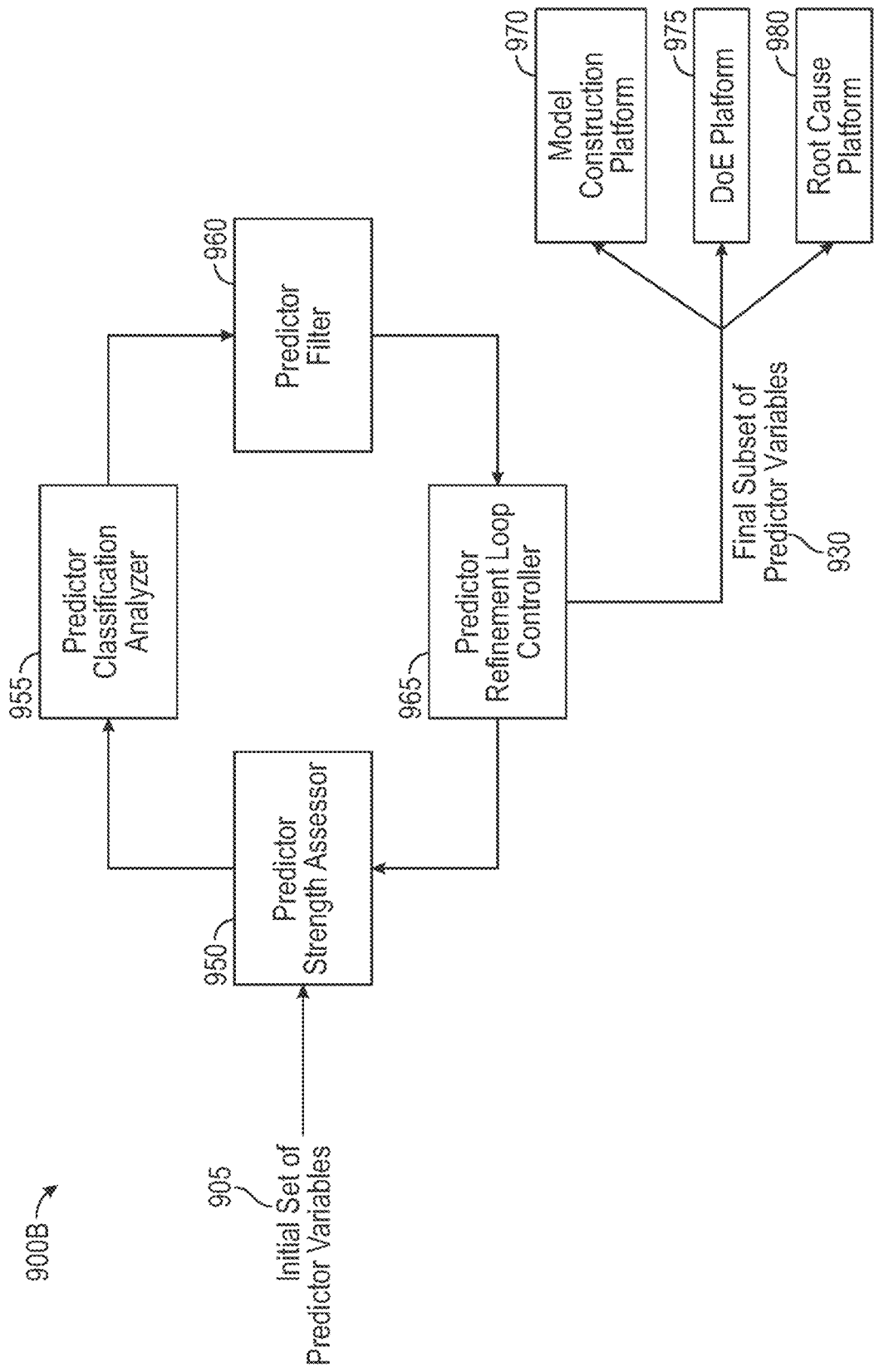
FIG. 9B illustrates an example system for performing a predictor strength assessment procedure according to at least one embodiment of the present technology.

FIG. 9A may depict a procedure for performing a predictor strength assessment according to the techniques described herein and FIG. 9B may depict a system with computational system blocks (e.g., computer modules, computer platforms, computer services, computer clusters, computer processors) specially configured to perform particular computing operations associated with the procedure depicted in FIG. 9A. For instance, a system may receive an initial set of predictor variables 905 (e.g., via user configuration, as depicted in FIGS. 8A and/or 8B). The system may run, at 910, a predictor strength assessment on the initial set of predictor variables 905 and may provide results of the predictor strength assessment (e.g., predictor variable contributions, predictor strength classification values) to 915. In some examples, 910 may be performed by a predictor strength assessor 950 that receives the initial set of predictor variables 905 and provides results of the predictor strength assessment to predictor classification analyzer 955.

At 915, the system may enable analysis of predictor classification (e.g., via display of the predictor variable contributions and/or predictor strength classification). User input at 915 that indicates particular predictor variables to retain may be provided to 920, where the system may remove any predictor variables from the initial set of predictor variables 905 not specified via the user input or may remove any predictor variables specified for removal via the user input. Alternatively, the system may retain predictor variables with particular predictor strength classification values (e.g., "Strong") or may filter out route predictor variables with particular predictor strength classification values (e.g., "Weak") unless otherwise specified via user input. In some examples, 915 may be performed by a predictor classification analyzer 955, which may be configured to receive results of the predictor strength assessment from a predictor strength assessor 950 and to provide user input to predictor filter 960. 920, meanwhile, may be performed by predictor filter 960, which may remove predictor variables from the initial set of predictor variables 905 and provide an updated set to predictor refinement loop controller 965.

At 925, the system may determine whether the updated set of predictor variables is the final subset of predictor variables 930. The system may perform the determination based on user input or based on predefined rules (e.g., the number of remaining predictor variables being below a threshold amount). If the system determines that the updated set of predictor variables is not the final subset, the system may perform 910, 915, and 920 on the updated set of predictor variables to generate a subset of the updated set of predictor variables. The system may continue to perform this process until the system determines that the resulting subset is the final subset of predictor variables 930. In some examples, 925 may be performed by a predictor refinement loop controller 965, which may be configured to receive an updated set of predictor variables from predictor filter 960, to provide the updated set to predictor strength assessor 950 for rerunning a predictor strength assessment on the updated set of predictor variables, and/or to output a final subset of predictor variables 930.

The system may provide the final subset of predictor variables 930 (e.g., via predictor refinement loop controller 965) to one or more of model construction platform 970, Design of Experiments (DoE) platform 975, or root cause platform 980. Each of model construction platform 970, DoE platform 975, and root cause platform 980 may be an example of an external system (e.g., a platform or application in communication with the system that generated the final subset of predictor variables). The system may provide the final subset of predictor variables to one or more of the platforms via an API (e.g., by transmitting a signal that encodes an indication of the final subset of predictor variables and that is formatted according to the API). Model construction platform 970, at 935, may use the final subset of predictor variables 930 to construct (e.g., build, train) a statistical model; DoE platform 975, at 940, may use the final subset of predictor variables 930 as experimental design factors; and root cause platform 980, at 945, may use the final subset of predictor variables 930 to perform root cause investigation.

It should be noted that generating the final subset of predictor variables 930 and providing them automatically to model construction platform 970, DoE platform 975, or root cause platform 980 may have advantages over other techniques (e.g., manually configuring the predictor variables at each of these platforms via user input). For instance, for the DoE platform 975, the selected predictor variables may be automatically mapped to corresponding factor fields within a DOE configuration interface or data structure such that user specification of design factors is programmatically pre-populated. Similarly, for machine learning platforms, the selected predictor variables may be automatically inserted as input features within a model training pipeline or configuration object, thus avoiding manual specification. Accordingly, providing the final set of predictor variables 930 in this manner may reduce the need for repetitive (or potentially erroneous) user input across multiple systems by enabling automated reuse of selected predictor variables.

It shall be noted that the system and methods of the embodiments and variations described herein can be embodied and/or implemented at least in part as a machine comprising a computer-readable medium storing computer-readable instructions. The instructions may be executed by computer-executable components integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, memory sticks (e.g., SD cards, USB flash drives), cloud-based services (e.g., cloud storage), magnetic storage devices, Solid-State Drives (SSDs), or any suitable device. The computer-executable component is preferably a general or application-specific processor, but any suitable dedicated hardware or hardware/firmware combination device can alternatively or additionally execute the instructions.

The systems and methods of the preferred embodiments may additionally, or alternatively, be implemented on an integrated data analytics software application and/or software architecture such as those offered by SAS Institute Inc. or JMP Statistical Discovery LLC of Cary, N.C., USA. Merely for illustration, the systems and methods of the preferred embodiments may be implemented using or integrated with one or more software tools such as JMPR, which is developed and provided by JMP Statistical Discovery LLC.

Although omitted for conciseness, the preferred embodiments include every combination and permutation of the implementations of the systems and methods described herein.

As a person skilled in the art will recognize from the previous detailed description and from the figures and claims, modifications and changes can be made to the embodiments of the disclosure without departing from the scope of the various described embodiments.

What is claimed is:

1. A computer-program product comprising a non-transitory machine-readable storage medium storing computer instructions that, when executed by one or more processors, perform operations comprising:
 generating a graphical user interface after performing a predictor strength assessment for an initial set of predictor variables in a dataset, wherein performing the predictor strength assessment for the initial set of predictor variables includes:
  adding, to the dataset, a set of shadow columns corresponding to the initial set of predictor variables,
  training a first model using the initial set of predictor variables and the set of shadow columns,
  computing a first plurality of portion values for the initial set of predictor variables and the set of shadow columns based on split events in the first model,
  training one or more additional models using the initial set of predictor variables and one or more updated sets of shadow columns generated based on the set of shadow columns, and
  computing one or more additional sets of portion values for the initial set of predictor variables and the one or more updated sets of shadow columns based on split events in the one or more additional models;
 displaying, via the graphical user interface, a plurality of selectable objects generated for the initial set of predictor variables in the dataset;
 displaying, concurrently with the plurality of selectable objects, the initial set of predictor variables in a distinct graphical representation associated with one of the plurality of selectable objects currently selected in the graphical user interface;
 receiving, via the graphical user interface, a plurality of inputs while the initial set of predictor variables are being displayed in the distinct graphical representation, wherein the plurality of inputs:
  select a subset of the initial set of predictor variables at the distinct graphical representation,
  add the subset of the initial set of predictor variables to a predictor selection list maintained in the graphical user interface, and
  initiate a predictor strength assessment for the subset of the initial set of predictor variables added to the predictor selection list; and
 in response to receiving the plurality of inputs, updating the distinct graphical representation and one or more other distinct graphical representations associated with the plurality of selectable objects based on the predictor strength assessment for the subset of the initial set of predictor variables.

2. The computer-program product according to claim 1, wherein the computer instructions, when executed by the one or more processors, perform operations further comprising:
 performing the predictor strength assessment for the initial set of predictor variables in response to receiving a plurality of second inputs.

3. The computer-program product according to claim 2, wherein performing the predictor strength assessment for the initial set of predictor variables includes:
 computing an initial set of predictor strength classifications for the initial set of predictor variables by at least using the first plurality of portion values and the one or more additional sets of portion values.

4. The computer-program product according to claim 3, wherein computing the initial set of predictor strength classifications for the initial set of predictor variables includes:
 computing a set of mean portion values for the initial set of predictor variables by pooling the first plurality of portion values and the one or more additional sets of portion values, and
 computing a predictive strength of the initial set of predictor variables by assessing the set of mean portion values against one or more predictor significance criteria.

5. The computer-program product according to claim 3, wherein computing the initial set of predictor strength classifications for the initial set of predictor variables includes:
 computing a set of mean portion values for the initial set of predictor variables by pooling the first plurality of portion values and the one or more additional sets of portion values,
 detecting, from the first plurality of portion values and the one or more additional sets of portion values, a maximum shadow column that has a maximum portion value among the set of shadow columns, and
 computing a predictive strength of the initial set of predictor variables by assessing the set of mean portion values against one or more quantile thresholds associated with the maximum shadow column.

6. The computer-program product according to claim 3, wherein computing the initial set of predictor strength classifications for the initial set of predictor variables includes:
 computing a plurality of comparison values by performing one or more pairwise comparisons between a respective predictor variable in the initial set of predictor variables and a respective shadow column in the set of shadow columns corresponding to the respective predictor variable, and
 computing a predictive strength of the initial set of predictor variables by assessing the plurality of comparison values against one or more predictor significance thresholds.

7. The computer-program product according to claim 3, wherein:
 the dataset includes a column corresponding to a respective predictor variable of the initial set of predictor variables,
 a respective shadow column of the set of shadow columns corresponds to the respective predictor variable and includes a randomized permutation of values in the column,
 a respective portion value of the first plurality of portion values represents a proportion of the split events in the first model that correspond to the respective predictor variable,
 a respective shadow column in the one or more updated sets of shadow columns includes a second randomized permutation of the values in the column, and
 the one or more additional sets of portion values includes a second portion value of the respective predictor variable that represents a proportion of the split events that correspond to the respective predictor variable in one of the one or more additional models.

8. The computer-program product according to claim 2, wherein the plurality of second inputs specify one or more of:
- a first column of the dataset as a response variable,
- a plurality of other columns of the dataset as the initial set of predictor variables,
- a target type of a decision tree model to train on the response variable and the initial set of predictor variables,
- a number of decision trees of the target type of the decision tree model to train on the response variable and the initial set of predictor variables,
- a number of random uniform columns to add to the dataset before training the number of decision trees of the decision tree model,
- a value for one or more configurable hyperparameters of the target type of the decision tree model, and
- a type of shadow column parameter to use in classifying a predictive strength of the initial set of predictor variables.

9. The computer-program product according to claim 8, wherein the type of shadow column parameter corresponds to one of:
- a max shadow column parameter that assesses a predictive strength of a respective predictor variable in the initial set of predictor variables by comparing a portion value of the respective predictor variable to a portion value of a shadow column of the dataset having a maximum portion value among the set of shadow columns in the dataset,
- a mean shadow column parameter that assess the predictive strength of the respective predictor variable by comparing the portion value of the respective predictor variable to a mean portion value of the set of shadow columns in the dataset, and
- a minimum shadow column parameter that assesses the predictive strength of the respective predictor variable by comparing the portion value of the respective predictor variable to a portion value of a shadow column of the dataset having a minimum portion value among the set of shadow columns in the dataset.

10. The computer-program product according to claim 1, wherein:
- the one of the plurality of selectable objects currently selected in the graphical user interface corresponds to a predictor overview selectable object, and
- the distinct graphical representation associated with the predictor overview selectable object includes a plurality of predictor strength rows and one or more shadow column rows corresponding to the initial set of predictor variables.

11. The computer-program product according to claim 10, wherein:
- the plurality of predictor strength rows and the one or more shadow column rows correspond to a respective column in the dataset, and
- a respective row of the plurality of predictor strength rows and the one or more shadow column rows includes one or more of:
- a name of a predictor variable associated with the respective column,
- a type of the respective column in the dataset,
- a strength classification of the predictor variable associated with the respective column, and
- a mean portion value of the predictor variable associated with the respective column.

12. The computer-program product according to claim 1, wherein the computer instructions, when executed by the one or more processors, perform operations comprising:
- displaying the dataset concurrently with the distinct graphical representation associated with the one of the plurality of selectable objects currently selected in the graphical user interface; and
- in response to the plurality of inputs selecting the subset of the initial set of predictor variables at the distinct graphical representation, visually highlighting a subset of columns in the dataset that correspond to the subset of the initial set of predictor variables.

13. The computer-program product according to claim 1, wherein:
- the one of the plurality of selectable objects currently selected in the graphical user interface corresponds to a one-way control-based selectable object, and
- the distinct graphical representation associated with the one-way control-based selectable object displays results of a one-way analysis between the initial set of predictor variables and a respective shadow column of the dataset.

14. The computer-program product according to claim 13, wherein displaying the results of the one-way analysis between the initial set of predictor variables and the respective shadow column of the dataset includes displaying:
- a y-axis that includes a range of portion values,
- an x-axis that includes the initial set of predictor variables and one or more shadow columns in the dataset, including the respective shadow column of the dataset,
- a set of box plot graphical markers representing a distribution of portion values for the initial set of predictor variables and the one or more shadow columns in the dataset, and
- a reference band spanning a second range of portion values for the respective shadow column of the dataset.

15. The computer-program product according to claim 14, wherein a respective box plot graphical marker of the set of box plot graphical markers represents the distribution of portion values for a respective predictor variable of the initial set of predictor variables and visually indicates one or more of:
- a minimum portion value for the respective predictor variable across a set of trained decision trees,
- a first quartile portion value for the respective predictor variable across the set of trained decision trees corresponding to a 25th percentile of portion values for the respective predictor variable,
- a second quartile portion value for the respective predictor variable across the set of trained decision trees corresponding to a 50th percentile of portion values for the respective predictor variable,
- a third quartile portion value for the respective predictor variable across the set of trained decision trees corresponding to a 75th percentile of portion values for the respective predictor variable, and
- a maximum portion value for the respective predictor variable across the set of trained decision trees.

16. The computer-program product according to claim 14, wherein:
- the respective shadow column has a maximum portion value among a set of trained decision trees, and
- a respective box plot graphical marker of the set of box plot graphical markers represents the distribution of portion values for a respective predictor variable and is displayed with visual emphasis indicating that:

the respective predictor variable is a strong predictor when at least a portion value of the respective predictor variable is greater than a first quartile value of the respective shadow column corresponding to a 75th percentile of portion values for the respective shadow column, the respective predictor variable is a medium predictor when at least the portion value of the respective predictor variable is between a second quartile value of the respective shadow column and the first quartile value of the respective shadow column, wherein the second quartile value corresponds to a 25th percentile of portion values for the respective shadow column, and the respective predictor variable is a weak predictor when at least the portion value of the respective predictor variable is less than the second quartile value of the respective shadow column.

17. The computer-program product according to claim 1, wherein:

the graphical user interface includes a filter selection panel comprising a plurality of selected filter options, and the computer instructions, when executed by the one or more processors, perform operations comprising:

receiving, via the filter selection panel, one or more second inputs for changing the plurality of selected filter options to include a first respective filter option associated with a first predictor category and exclude a second respective filter option associated with a second predictor category, and in response to receiving the one or more second inputs:

ceasing displaying, in the distinct graphical representation, a second subset of predictor variables that are associated with the second predictor category, and adding, to the distinct graphical representation, a third subset of predictor variables that are associated with the first predictor category.

18. The computer-program product according to claim 17, wherein the computer instructions, when executed by the one or more processors, perform operations further comprising:

in response to receiving the one or more second inputs:

rescaling the distinct graphical representation based at least on ceasing display of the second subset of predictor variables in the distinct graphical representation.

19. The computer-program product according to claim 1, wherein:

the plurality of selectable objects correspond to a plurality of selectable tabs, the one of the plurality of selectable objects correspond to a respective selectable tab of the plurality of selectable tabs, the graphical user interface includes a plurality of tab containers associated with the plurality of selectable tabs, and a respective tab container associated with the respective selectable tab includes:

the distinct graphical representation, and one or more expandable sections configured to display data underpinning the distinct graphical representation.

20. The computer-program product according to claim 1, wherein:

the one of the plurality of selectable objects currently selected in the graphical user interface corresponds to a predictor-to-shadow difference selectable object, and the distinct graphical representation associated with the predictor-to-shadow difference selectable object includes:

a plurality of predictor variable-to-shadow comparison rows, and a dot plot representing differences between the initial set of predictor variables and a plurality of shadow columns corresponding to the initial set of predictor variables.

21. The computer-program product according to claim 20, wherein a respective predictor variable-to-shadow comparison row of the plurality of predictor variable-to-shadow comparison rows corresponds to a respective predictor variable of the initial set of predictor variables and includes one or more of:

a name of the respective predictor variable, a name of a shadow column in the dataset corresponding to the respective predictor variable, a strength classification of the respective predictor variable, a significance score that represents whether a difference between a portion value of the respective predictor variable and a portion value of the shadow column is statistically significant, and a difference value indicating a magnitude of the difference between the portion value of the respective predictor variable and the portion value of the shadow column.

22. The computer-program product according to claim 21, wherein the strength classification of the respective predictor variable corresponds to:

a strong predictor classification when the significance score is less than a pre-defined threshold and the portion value of the respective predictor variable is greater than a first quartile of a max shadow column of the dataset, wherein the first quartile corresponds to a 75th percentile of portion values of the max shadow column, a medium predictor classification when the significance score is greater than the pre-defined threshold and the portion value of the respective predictor variable is between a second quartile and the first quartile of the max shadow column of the dataset, wherein the second quartile corresponds to a 25th percentile of portion values of the max shadow column, and a weak predictor classification when the significance score is less than the pre-defined threshold and the portion value of the respective predictor variable is less than the second quartile of the max shadow column of the dataset.

23. The computer-program product according to claim 1, wherein the computer instructions, when executed by the one or more processors, perform operations further comprising:

receiving, via the graphical user interface, a second input for transitioning to a second selectable object of the plurality of selectable objects, and in response to receiving the second input:

ceasing displaying the distinct graphical representation associated with the one of the plurality of selectable objects currently selected in the graphical user interface, and beginning display of a distinct graphical representation associated with the second selectable object.

24. The computer-program product according to claim 1, wherein:

the one of the plurality of selectable objects currently selected in the graphical user interface corresponds to a progress selectable object, and the distinct graphical representation associated with the progress selectable object displays a portion value of the initial set of predictor variables across a first number of training runs.

25. The computer-program product according to claim 24, wherein:

the first number of training runs are performed in response to receiving a request to perform the predictor strength assessment for the initial set of predictor variables, a second number of training runs are performed in response to performing the predictor strength assessment for the subset of the initial set of predictor variables, and updating the distinct graphical representation in response to receiving the plurality of inputs includes:

maintaining display of the portion value of the initial set of predictor variables across the first number of training runs, and adding, to the distinct graphical representation, a portion value of the subset of the initial set of predictor variables across the second number of training iterations.

26. The computer-program product according to claim 25, wherein:

the distinct graphical representation corresponds to a line graph and includes a plurality of trend lines corresponding to the initial set of predictor variables, and a respective trend line of the plurality of trend lines corresponds to a respective predictor variable of the initial set of predictor variables and includes:

a first portion representing changes in the portion value of the respective predictor variable across the first number of training runs, and a second portion representing changes in the portion value of the respective predictor variable across the second number of training runs.

27. The computer-program product according to claim 26, wherein:

the first portion of the respective trend line has a first color to indicate that the respective predictor variable has a first strength across the first number of training runs, and the second portion of the respective trend line has a second color, different from the first color, to indicate that the respective predictor variable has a second strength across the second number of training runs.

28. The computer-program product according to claim 26, wherein:

the respective trend line includes the second portion when the respective predictor variable is included in the subset of the initial set of predictor variables, and the respective trend line does not include the second portion when the respective predictor variable is not included in the subset of the initial set of predictor variables.

29. A computer-implemented method, comprising:

generating a graphical user interface after performing a predictor strength assessment for an initial set of predictor variables in a dataset, wherein performing the predictor strength assessment for the initial set of predictor variables includes:

adding, to the dataset, a set of shadow columns corresponding to the initial set of predictor variables, training a first model using the initial set of predictor variables and the set of shadow columns, computing a first plurality of portion values for the initial set of predictor variables and the set of shadow columns based on split events in the first model, training one or more additional models using the initial set of predictor variables and one or more updated sets of shadow columns generated based on the set of shadow columns, and computing one or more additional sets of portion values for the initial set of predictor variables and the one or more updated sets of shadow columns based on split events in the one or more additional models;

displaying, via the graphical user interface, a plurality of selectable objects generated for the initial set of predictor variables in the dataset;

displaying, concurrently with the plurality of selectable objects, the initial set of predictor variables in a distinct graphical representation associated with one of the plurality of selectable objects currently selected in the graphical user interface;

receiving, via the graphical user interface, a plurality of inputs while the initial set of predictor variables are being displayed in the distinct graphical representation, wherein the plurality of inputs:

select a subset of the initial set of predictor variables at the distinct graphical representation, add the subset of the initial set of predictor variables to a predictor selection list maintained in the graphical user interface, and initiate a predictor strength assessment for the subset of the initial set of predictor variables added to the predictor selection list; and in response to receiving the plurality of inputs, updating the distinct graphical representation and one or more other distinct graphical representations associated with the plurality of selectable objects based on the predictor strength assessment for the subset of the initial set of predictor variables.

30. A computer-implemented system comprising:

one or more processors;

a memory; and a computer-readable medium operably coupled to the one or more processors, the computer-readable medium having computer-readable instructions stored thereon that, when executed by the one or more processors, cause a computing device to perform operations comprising:

generating a graphical user interface after performing a predictor strength assessment for an initial set of predictor variables in a dataset, wherein performing the predictor strength assessment for the initial set of predictor variables includes:

adding, to the dataset, a set of shadow columns corresponding to the initial set of predictor variables, training a first model using the initial set of predictor variables and the set of shadow columns, computing a first plurality of portion values for the initial set of predictor variables and the set of shadow columns based on split events in the first model, training one or more additional models using the initial set of predictor variables and one or more updated sets of shadow columns generated based on the set of shadow columns, and computing one or more additional sets of portion values for the initial set of predictor variables and the one or more updated sets of shadow columns based on split events in the one or more additional models;

displaying, via the graphical user interface, a plurality of selectable objects generated for the initial set of predictor variables in the dataset;

displaying, concurrently with the plurality of selectable objects, the initial set of predictor variables in a distinct graphical representation associated with one of the plurality of selectable objects currently selected in the graphical user interface;

receiving, via the graphical user interface, a plurality of inputs while the initial set of predictor variables are being displayed in the distinct graphical representation, wherein the plurality of inputs:

select a subset of the initial set of predictor variables at the distinct graphical representation, add the subset of the initial set of predictor variables to a predictor selection list maintained in the graphical user interface, and initiate a predictor strength assessment for the subset of the initial set of predictor variables added to the predictor selection list; and in response to receiving the plurality of inputs, updating the distinct graphical representation and one or more other distinct graphical representations associated with the plurality of selectable objects based on the predictor strength assessment for the subset of the initial set of predictor variables.

* * * * *